(12) United States Patent
Shin et al.

(10) Patent No.: US 10,042,470 B2
(45) Date of Patent: Aug. 7, 2018

(54) TOUCH SENSING METHOD, TOUCH SENSING CIRCUIT, AND TOUCH DISPLAY DEVICE

(71) Applicant: LG Display Co., Ltd., Seoul (KR)

(72) Inventors: MyungHo Shin, Paju-si (KR); SungUk Byun, Daegu (KR); YongWoo Choi, Goyang-si (KR); MinWoo Hwang, Gumi-si (KR); KiYong Kim, Goyang-si (KR); Youngho Kwon, Daegu (KR); Kyungjin Jang, Seoul (KR); JaeKyu Park, Gimpo-si (KR)

(73) Assignee: LG Display Co., LTD., Seoul (KR)

( * ) Notice: Subject to any disclaimer, the term of this patent is extended or adjusted under 35 U.S.C. 154(b) by 0 days.

(21) Appl. No.: 15/393,125

(22) Filed: Dec. 28, 2016

(65) Prior Publication Data
US 2017/0300165 A1    Oct. 19, 2017

(30) Foreign Application Priority Data

Apr. 15, 2016   (KR) .................. 10-2016-0046226
Dec. 26, 2016   (KR) .................. 10-2016-0179269

(51) Int. Cl.
G06F 3/041      (2006.01)
G09G 3/20       (2006.01)
G06F 3/044      (2006.01)

(52) U.S. Cl.
CPC ............ *G06F 3/0416* (2013.01); *G06F 3/044* (2013.01); *G06F 3/0412* (2013.01); *G09G 3/2092* (2013.01); *G06F 2203/04107* (2013.01); *G09G 2330/06* (2013.01)

(58) Field of Classification Search
CPC ...... G06F 3/041; G06F 3/0416; G06F 3/0412; G06F 3/044
See application file for complete search history.

(56) References Cited

U.S. PATENT DOCUMENTS

| 9,285,913 | B1 | 3/2016 | Kang et al. |
| 2006/0195714 | A1 | 8/2006 | Hanaki |
| 2007/0070049 | A1 | 3/2007 | Lee et al. |
| 2011/0084857 | A1* | 4/2011 | Marino ............... G06F 3/044 178/18.06 |
| 2013/0257767 | A1 | 10/2013 | Wu et al. |
| 2014/0055413 | A1* | 2/2014 | Krenik ............... G06F 3/044 345/174 |

(Continued)

FOREIGN PATENT DOCUMENTS

EP     2 261 766 A2    12/2010

OTHER PUBLICATIONS

European Extended Search Report, European Application No. 16207258.1, dated Jul. 3, 2017, pages.

*Primary Examiner* — Kevin M Nguyen
(74) *Attorney, Agent, or Firm* — Fenwick & West LLP

(57) ABSTRACT

A touch sensing method, a touch sensing circuit, and a touch display device perform multifrequency touch driving by varying the frequencies of touch driving signals when sensing a touch or a touched position by outputting pulse-type touch driving by which one or more touch electrodes among a number of touch electrodes disposed on a display panel are driven sequentially. Undesired parasitic capacitance that would otherwise be caused by touch driving signals is prevented from occurring, and EMI influence is reduced.

26 Claims, 47 Drawing Sheets

(56) References Cited

U.S. PATENT DOCUMENTS

| | | | |
|---|---|---|---|
| 2015/0077370 A1 | 3/2015 | Kim et al. | |
| 2015/0145822 A1* | 5/2015 | Katsuta | G06F 3/044 345/174 |
| 2015/0193082 A1* | 7/2015 | Ludden | G06F 3/044 345/174 |
| 2016/0202829 A1* | 7/2016 | Choi | G06F 3/044 345/174 |
| 2016/0313823 A1* | 10/2016 | Tan | G06F 3/044 |
| 2016/0328073 A1* | 11/2016 | Lai | G06F 3/044 |

\* cited by examiner

· Tdsm = Tdsn, Ttsm = Ttsn
· Tdsm + Ttsm = Tdsn + Ttsn

*FIG.42*

|  | TS1 | TS2 | TS3 | No. of Available Frequency Types |
|---|---|---|---|---|
| Available Frequency Set 1 | a | b | c | 3 |
| Available Frequency Set 2 | a | a | b | 2 |
| Available Frequency Set 3 | a | b | a | 2 |
| Available Frequency Set 4 | a | b | b | 2 |
| Available Frequency Set 5 | b | a | b | 2 |

*FIG.44*

|  | TS1 | TS2 | TS3 | TS4 | No. of Available Frequency Types |
|---|---|---|---|---|---|
| Available Frequency Set 1 | a | b | c | d | 4 |
| Available Frequency Set 2 | a | b | c | a | 3 |
| Available Frequency Set 3 | a | b | a | b | 2 |
| Available Frequency Set4 | a | a | b | b | 2 |
| Available Frequency Set 5 | a | a | a | b | 2 |
| Available Frequency Set 6 | a | a | b | a | 2 |

FIG.46

|  | TS1 | TS2 | TS3 | TS4 | TS5 | No. of Available Frequency Types |
|---|---|---|---|---|---|---|
| Available Frequency Set 1 | a | b | c | d | e | 5 |
| Available Frequency Set 2 | a | b | c | d | a | 4 |
| Available Frequency Set 3 | a | b | a | b | c | 3 |
| Available Frequency Set 4 | a | a | a | b | b | 2 |
| Available Frequency Set 5 | a | a | b | b | b | 2 |

TOUCH SENSING METHOD, TOUCH SENSING CIRCUIT, AND TOUCH DISPLAY DEVICE

CROSS REFERENCE TO RELATED APPLICATION

This application claims priority from Korean Patent Application No. 10-2016-0046226 filed on Apr. 15, 2016 and Korean Patent Application No. 10-2016-0179269 filed on Dec. 26, 2016, both of which are hereby incorporated by reference for all purposes as if fully set forth herein.

BACKGROUND

1. Field

The present disclosure relates to a touch sensing method, a touch sensing circuit, and a touch display device.

2. Description of Related Art

In response to the development of the information society, demand for a variety of display devices for displaying images is increasing. In this regard, a range of display devices, such as liquid crystal display (LCD) devices, plasma display panels (PDPs), and organic light-emitting display devices, have recently come into widespread use.

Many display devices provide touch-based user interfaces enabling users to intuitively and conveniently input data or instructions directly to devices, rather than using conventional input systems, such as buttons, a keyboard, or a mouse.

To provide such touch-based user interfaces, the ability to sense a touch made by a user and accurately detect touch coordinates (i.e. a touched position) is required.

In this regard, capacitive touch sensing is commonly used to sense a touch and touch coordinates using a number of touch electrodes disposed on a touch panel (i.e. a touch screen panel) as touch sensors, based on changes in capacitance between touch electrodes or between a touch electrode and a pointer, such as a finger.

Electrical devices, such as touch display devices, having a touch sensing function must satisfy a condition in which the level of electromagnetic interference (hereinafter referred to as "EMI") does not exceed a predetermined level.

However, conventional touch display devices may have a problem in which the level of EMI increases in response to touch driving signals being applied for touch sensing.

In particular, when touch driving signals applied to touch electrodes for touch sensing are pulse signals having a predetermined frequency, EMI influence may be more significant.

Such EMI influence may reduce system reliability in a touch display device, may have an effect on sensing voltages obtained during touch sensing, thereby reducing touch sensing performance, or may have an effect on other voltages required for display, thereby reducing display performance.

BRIEF SUMMARY

Various aspects of the present disclosure provide a touch sensing method, a touch sensing circuit, and a touch display device having reduced electromagnetic interference (EMI).

Also provided are a touch sensing method, a touch sensing circuit, and a touch display device in which parasitic capacitance is prevented from occurring while reducing EMI in touch sections.

Also provided are a touch sensing method, a touch sensing circuit, and a touch display device capable of performing touch driving based on multifrequency driving to reduce EMI.

According to an aspect of the present disclosure, a touch display device having two operation modes, including a display mode in which images are displayed and a touch mode in which touch sensing is performed, may include a display panel on which a number of data lines, a number of gate lines, and a number of subpixels, defined by the number of data lines and the number of gate lines, are disposed.

The touch display device may include: a number of touch electrodes disposed within the display panel; and a touch sensing circuit sensing a touch or a touched position by outputting a pulse-type touch driving signal by which one or more touch electrodes among the number of touch electrodes are driven sequentially.

The touch driving signal output by the touch sensing circuit is frequency-variable.

According to another aspect of the present disclosure, provided is a touch sensing method for a touch display device.

The touch sensing method may include outputting a pulse-type touch driving signal, by which one or more touch electrodes among a number of touch electrodes disposed within the display panel are driven sequentially, during one or more touch sections.

The touch sensing method may include sensing a touch or a touched position by detecting changes in capacitance in the number of touch electrodes.

The touch driving signal output during the one or more touch sections is frequency-variable.

According to further another aspect of the present disclosure, provided is a touch sensing circuit of a touch display device.

The touch sensing circuit may include a driver circuit outputting a pulse-type touch driving signal to sequentially drive one or more touch electrodes among a number of touch electrodes disposed in the display panel.

The touch sensing circuit may include a sensing circuit sensing a touch or a touched position by detecting changes in capacitance from the number of touch electrodes.

The touch driving signal output by the driver circuit is frequency-variable.

According to another aspect of the present disclosure, provided is a touch sensing circuit of a touch display device having two operation modes, including a display mode in which images are displayed and a touch mode in which touch sensing is performed.

The touch sensing circuit may output a pulse-type touch driving signal to sequentially drive one or more touch electrodes among a number of touch electrodes intended for touch sensing.

The output touch driving signal is frequency-variable.

A section during which the touch sensing is performed may include an idle period during which the touch driving signal is not output.

Lengths of the idle periods in the sections during which the touch sensing is performed may be equal to each other.

Lengths of the idle periods in the sections during which the touch sensing is performed may be different from each other.

When display sections for the display mode and touch sections for the touch mode are divided in time and alternate with each other, the touch driving signal output during each of the touch sections may have two or more frequencies.

When display sections for the display mode and touch sections for the touch mode are divided in time and alternate with each other, one or more display sections are present in each of a first touch section and a second touch section. A frequency of the touch driving signal output during the first touch section among the touch sections may differ from a frequency of the touch driving signal output during the second touch section among the touch sections.

When a single display section and a single touch section are present in a single display frame section, the touch driving signal output during the single touch section may have two or more frequencies.

When two or more display sections and two or more touch sections are present in a single display frame section, the touch driving signal output during each of the touch sections may have two or more frequencies.

When two or more display sections and two or more touch sections are present in a single display frame section, the touch driving signal output during one touch section among the touch sections may have a single frequency, and the touch driving signal output during the single display frame section may have two or more frequencies.

Lengths of two or more display sections for the display mode may be equal to each other.

Lengths of two or more touch sections for the touch mode may be equal to each other.

Lengths of two or more display sections for the display mode may be different from each other.

Lengths of two or more touch sections for the touch mode may be different from each other.

Two or more display sections for the display mode may include an mth display section and an nth display section, and two or more touch sections for the touch mode may include an mth touch section and an nth touch section. The mth touch section may follow the mth display section, and the nth touch section may follow the nth display section.

A total of a length of the mth display section and a length of the mth touch section may be equal to a total of a length of the nth display section and a length of the nth touch section.

When two or more display sections for the display mode and two or more touch sections for the touch mode are present in a single display frame section, lengths of the two or more display sections may be equal to each other.

When two or more display sections for the display mode and two or more touch sections for the touch mode are present in a single display frame section, at least one display section among the two or more display sections may have a different length of section from each of the remaining display sections.

When two or more display sections for the display mode and two or more touch sections for the touch mode are present in a single display frame section, lengths of the two or more touch sections may be equal to each other.

When two or more display sections for the display mode and two or more touch sections for the touch mode are present in a single display frame section, at least one touch section among the two or more touch sections may have a different length of section from each of the remaining touch sections.

When two or more display sections for the display mode and two or more touch sections for the touch mode are present in a single display frame section, the touch driving signal in at least one touch section among the two or more touch sections may have different number of pulses from the touch driving signal in each of the remaining touch sections.

When two or more display sections for the display mode and two or more touch sections for the touch mode are present in a single display frame section, a number of frequencies of the touch driving signal output during the single display frame section may be equal to or smaller than a number of the touch sections in the single display frame section.

When two or more display sections for the display mode and two or more touch sections for the touch mode are present in a single display frame section, the number of frequencies of the touch driving signal output during the single display frame section may be greater than a number of the touch sections in the single display frame section.

The touch driving signal may have a frequency pattern varying in a period corresponding to a single display frame section.

The touch driving signal may have a frequency pattern varying in a period corresponding to 1/M of a single display frame section.

In another embodiment, a driver circuit for driving a display device integrated with a touch screen is provided, in which the display device comprises a display panel including a plurality of data lines, a plurality of gate lines, and a plurality of touch electrodes, a plurality of pixels of the display device defined at intersections of the data lines and the gate lines. The driver circuit comprises a touch signal generator circuit to generate a touch driving signal at a plurality of frequencies including at least a first frequency and a second frequency different from the first frequency; and a touch driver circuit to: apply a common voltage to the touch electrodes to display an image on the pixels of the display device; and apply the touch driving signal to a first one of the touch electrodes at the first frequency during a first unit touch section and apply the touch driving signal to a second one of the touch electrodes at the second frequency during a second unit touch section, a frequency of the touch driving signal being substantially constant at the first frequency during the first unit touch section and at the second frequency during the second unit touch section.

In one embodiment, a first image is displayed on the entire display panel once during a first frame, and a second image is displayed on the entire display panel once during a second frame. The first frame includes a single first display period and single first touch period, and the second frame includes a single second display period and single second touch period. The first unit touch section is the first touch period, and the second unit touch section is the second touch period.

In another embodiment, an image is displayed on the entire display panel once during a frame. The frame includes a first display period, a first touch period subsequent to the first display period, a second display period subsequent to the first touch period, and a second touch period subsequent to the second display period. The first unit touch section is the first touch period, and the second unit touch section is the second touch period.

In one embodiment, the touch driver circuit applies a first load-free driving signal at the first frequency to a first data line corresponding to the first one of the touch electrodes during the first unit touch section, the first load-free driving signal identical to the first touch-driving signal; and the touch driver circuit applies a second load-free driving signal at the second frequency to a second data line corresponding to the second one of the touch electrodes during the second unit touch section, the second load-free driving signal identical to the second touch-driving signal.

In another embodiment, the touch driver circuit applies a first load-free driving signal at the first frequency to a first gate line corresponding to the first one of the touch electrodes during the first unit touch section, the first load-free driving signal identical to the first touch-driving signal; and the touch driver circuit applies a second load-free driving signal at the second frequency to a second gate line corresponding to the second one of the touch electrodes during the second unit touch section, the second load-free driving signal identical to the second touch-driving signal.

In still another embodiment, the touch driver circuit applies a first load-free driving signal at the first frequency to a third one of the touch electrodes corresponding to the first one of the touch electrodes during the first unit touch section, the first load-free driving signal identical to the first touch-driving signal; and the touch driver circuit applies a second load-free driving signal at the second frequency to a fourth one of the touch electrodes corresponding to the second one of the touch electrodes during the second unit touch section, the second load-free driving signal identical to the second touch-driving signal.

In another embodiment, a driver circuit for driving a display device integrated with a touch screen is provided, in which the display device comprises a display panel including a plurality of data lines, a plurality of gate lines, and a plurality of touch electrodes, a plurality of pixels of the display device defined at intersections of the plurality of the data lines and the plurality of gate lines. The driver circuit comprises a touch signal generator circuit to generate a touch driving signal at a plurality of frequencies including at least a first frequency and a second frequency different from the first frequency; and a touch driver circuit to: apply a common voltage to the touch electrodes to display an image on the pixels of the display device; and apply the touch driving signal to a first one of the touch electrodes at the first frequency and apply the touch driving signal to a second one of the touch electrodes at the second frequency, the first one of the touch electrodes and the second one of the touch electrodes at different locations on the display panel. According to another aspect of the present disclosure, provided is a touch sensing method, comprising: applying a pulse-type touch driving signal to at least one touch electrode among a number of touch electrodes disposed on a display panel during a first unit touch section and a second unit touch section, wherein the first and second unit touch sections are of substantially equal or substantially equal time duration; varying the frequency of the applied touch driving signal such that, in the first unit touch section, the touch driving signal has a plurality of pulses at a first frequency and, in the second unit touch section, the touch driving signal has a plurality of pulses at a second frequency that may be different from the first frequency, wherein a time duration between a first pulse and a last pulse in the first unit touch section may be different from a time duration between a first pulse and a last pulse in the second unit touch section, and wherein a first idle period between the last pulse in the first unit touch section and an end of the first unit touch section may be different from a second idle period between the last pulse in the second unit touch section and an end of the second unit touch section, and/or wherein a third idle period between the first pulse in the first unit touch section and a beginning of the first unit touch section may be different from a fourth idle period between the first pulse in the second unit touch section and a beginning of the second unit touch section. Herein, "substantially equal" may be understood as "equal within a predeterminable tolerance margin", e.g. within a tolerance margin of ±20%, e.g. within a tolerance margin of ±10%, e.g. within a tolerance margin of ±5%, e.g. within a tolerance margin of ±1%.

The first unit touch section may be included in a first touch section and the second unit touch section may be included in a second touch section, wherein the first and second touch sections are separated from one another by a display section.

The first touch section may be included in a first display frame section and the second touch section may be included in a second display frame section.

The first and second touch sections are included in one and the same display frame section.

The first and second unit touch sections are included in a single touch section.

The touch sensing method may comprise: applying a load-free driving signal to at least one data line among a number of data lines while applying the touch driving signal to the at least one touch electrode, wherein the load-free driving signal may be a signal that may be identical to the touch driving signal or a signal, the frequency and phase of which correspond to the frequency and phase of the touch driving signal; and/or applying a load-free driving signal to at least one gate line among a number of gate lines while applying the touch driving signal to the at least one touch electrode, wherein the load-free driving signal may be a signal that may be identical to the touch driving signal or a signal, the frequency and phase of which correspond to the frequency and phase of the touch driving signal; and/or applying a load-free driving signal to at least one other touch electrode among the number of touch electrodes, to which the touch driving signal may be not applied, while applying the touch driving signal to the at least one touch electrode, wherein the load-free driving signal may be a signal that may be identical to the touch driving signal or a signal, the frequency and phase of which correspond to the frequency and phase of the touch driving signal.

According to further another aspect of the present disclosure, provided may be a touch sensing circuit, configured to: apply a pulse-type touch driving signal to at least one touch electrode among a number of touch electrodes disposed on a display panel during a first unit touch section and a second unit touch section, wherein the first and second unit touch sections are of substantially equal time duration; vary the frequency of the applied touch driving signal such that, in the first unit touch section, the touch driving signal has a first frequency and, in the second unit touch section, the touch driving signal has a second frequency that may be different from the first frequency, wherein a time duration between the a first pulse and a last pulse in the first unit touch section may be different from a time duration between a first pulse and the a last pulse in the second unit touch section, and wherein a first idle period between the last pulse in the first unit touch section and an end of the first unit touch section may be different from a second idle period between the last pulse in the second unit touch section and an end of the second unit touch section, and/or wherein a third idle period between the first pulse in the first unit touch section and a beginning of the first unit touch section may be different from a fourth idle period between the first pulse in the second unit touch section and a beginning of the second unit touch section.

The first unit touch section may be included in a first touch section and the second unit touch section may be included in a second touch section, wherein the first and second touch sections are separated from one another by a display section.

The first touch section may be included in a first display frame section and the second touch section may be included in a second display frame section.

The first and second touch sections are included in one and the same display frame section.

The first and second unit touch sections are included in a single touch section.

The touch sensing circuit may comprise: a signal generating circuit configured to generate a touch driving signal having two or more frequencies; a driver circuit configured to apply the touch driving signal of the signal generating circuit to the at least one touch electrode; and a sensing circuit configured to detect the changes in capacitance from the number of touch electrodes.

The touch sensing circuit may comprise: a signal generating circuit configured to generate a touch driving signal having one frequency; a signal converting circuit configured to convert the touch driving signal of the signal generating circuit into a touch driving signal having another frequency; a driver circuit configured to apply the touch driving signal of the signal generating circuit or of the signal converting circuit to the at least one touch electrode; and a sensing circuit configured to detect the changes in capacitance from the number of touch electrodes.

According to further another aspect of the present disclosure, provided may be a touch display device, comprising: a display panel; a number of touch electrodes disposed on the display panel; and a touch sensing circuit electrically connected to the touch electrodes.

The touch display device may comprise: a number of data lines and configured to apply a load-free driving signal to at least one data line among the number of data lines while the touch sensing circuit applies the touch driving signal to the at least one touch electrode, wherein the load-free driving signal may be a signal that may be identical to the touch driving signal or a signal, the frequency and phase of which correspond to the frequency and phase of the touch driving signal; and/or further comprising a number of gate lines and configured to apply a load-free driving signal to at least one gate line among the number of gate lines while the touch sensing circuit applies the touch driving signal to the at least one touch electrode, wherein the load-free driving signal may be a signal that may be identical to the touch driving signal or a signal, the frequency and phase of which correspond to the frequency and phase of the touch driving signal; and/or further configured to apply a load-free driving signal to at least one other touch electrode among the number of touch electrodes, to which the touch driving signal may be not applied, while applying the touch driving signal to the at least one touch electrode, wherein the load-free driving signal may be a signal that may be identical to the touch driving signal or a signal, the frequency and phase of which correspond to the frequency and phase of the touch driving signal.

The touch display device may comprise: a first signal line electrically connecting the touch sensing circuit to a first touch electrode among the number of touch electrodes; a second signal line electrically connecting the touch sensing circuit to a second touch electrode among the number of touch electrodes; wherein the first signal line may be longer than the second signal line; wherein the touch sensing circuit may be configured to apply a touch driving signal to the first touch electrode via the first signal line and apply a touch driving signal to the second touch electrode via the second signal line, wherein the touch driving signal applied to the first touch electrode has a larger number of pulses than the touch driving signal applied to the second touch electrode.

According to the present disclosure as set forth above, the touch sensing method, the touch sensing circuit, and the touch display device can have reduced electromagnetic interference (EMI).

This can consequently prevent the degradation of system reliability, display performance, and touch sensing performance due to EMI.

In addition, according to the present disclosure, the touch sensing method, the touch sensing circuit, and the touch display device can prevent undesired parasitic capacitance from occurring while reducing EMI in touch sections.

Furthermore, according to the present disclosure, the touch sensing method, the touch sensing circuit, and the touch display device can perform touch driving based on multifrequency driving (frequency variation) to reduce EMI.

BRIEF DESCRIPTION OF THE DRAWINGS

The above and other objects, features and advantages of the present disclosure will be more clearly understood from the following detailed description when taken in conjunction with the accompanying drawings, in which:

FIG. 42 is a table illustrating frequency types available for touch sections in which single-frequency driving is performed when the touch display device according to exemplary embodiments operates as in FIG. 41 and multifrequency driving is applied in a single display frame;

FIG. 44 is a table illustrating frequency types available for touch sections in which single-frequency driving is performed when the touch display device according to exemplary embodiments operates as in FIG. 43 and multifrequency driving is applied in a single display frame;

FIG. 46 is a table illustrating frequency types available for touch sections in which single-frequency driving is performed when the touch display device according to exemplary embodiments operates as in FIG. 45 and multifrequency driving is applied in a single display frame.

DETAILED DESCRIPTION

Figure 1:
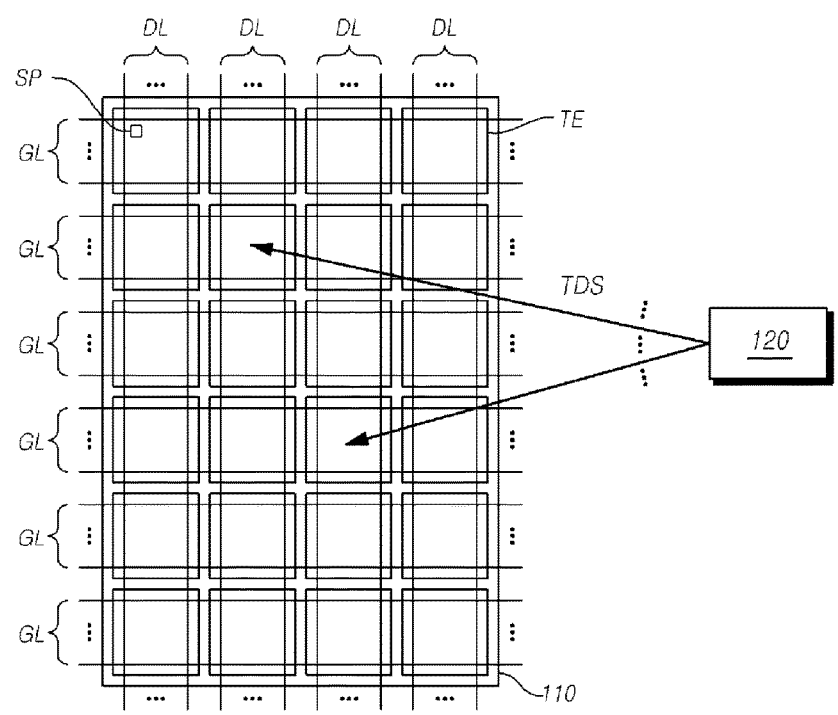
FIG. 1 is a schematic configuration view illustrating a touch display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

Figure 2:
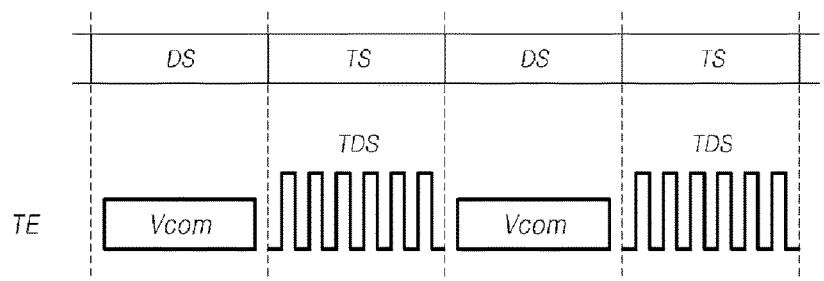
FIG. 2 is a schematic view illustrating signals applied to touch electrodes during display sections and touch sections in the touch display device according to exemplary embodiments.

FIG. 1 is a schematic configuration view illustrating a touch display device 100 according to exemplary embodiments, and FIG. 2 is a schematic view illustrating signals applied to touch electrodes during display sections DS and touch sections TS in the touch display device 100 according to exemplary embodiments.

The touch display device 100 according to exemplary embodiments includes a display panel 110 on which a number of data lines DL, a number of gate lines GL, and a number of subpixels SP, defined by the number of data lines DL and the number of gate lines GL, are disposed.

The touch display device 100 according to exemplary embodiments has two operation modes, i.e., a display mode in which images are displayed and a touch mode in which touch sensing is performed.

The touch display device 100 according to exemplary embodiments includes a data driver circuit (not shown) and a gate driver circuit (not shown) to operate in the display mode.

In the display sections DS in which the touch display device 100 according to exemplary embodiments operates in the display mode, the data driver circuit (not shown) operates the number of data lines DL and the gate driver circuit (not shown) operates the number of gate lines GL.

The touch display device 100 according to exemplary embodiments includes a touch sensing circuit 120 to operate in the touch mode.

In the touch sections TS in which the touch display device 100 according to exemplary embodiments operates in the touch mode, the touch sensing circuit 120 can sense a touch or a touched position by outputting pulse-type touch driving signals (e.g. pulse width modulation (PWM) signals) TDS by which one or more touch electrodes among a number of touch electrodes TE electrically connected thereto through signal lines are driven sequentially.

The touch sensing circuit 120 can sense a touch or a touched position by sequentially driving one or more touch electrodes TE among the number of touch electrodes TE and then detecting changes in capacitance in the touch electrodes TE based on signals received from the touch electrodes TE.

That is, the touch sensing circuit 120 can sense a touch or a touched position by self-capacitance-based touch sensing.

The number of touch electrodes TE acting as the touch sensors may be disposed on a touch panel (not shown) disposed separately outside of the display panel 110 or may be disposed within the display panel 110.

When the touch electrodes TE are disposed within the display panel 110, the number of touch electrodes TE may be in-cell or on-cell touch electrodes.

In addition, when the touch display device 100 according to exemplary embodiments operates in the display mode, a common voltage Vcom may be applied to all of the subpixels.

In this regard, common electrodes to which the common voltage Vcom is applied may be disposed on the display panel 110.

When the touch electrodes TE are disposed within the display panel 110, the number of touch electrodes TE can be used as common electrodes to which the common voltage Vcom is applied during the display sections DS.

When the touch display device 100 is a liquid crystal display (LCD) device, the common voltage Vcom is used to form potential differences with respect to pixel voltages (corresponding to data voltages) of the subpixels, thereby expressing gray scales of the subpixels.

When the number of touch electrodes TE are used as common electrodes as described above, as illustrated in FIG. 2, the number of touch electrodes TE of the touch display device 100 according to exemplary embodiments can act as common electrodes during the display sections DS while acting as touch sensors during the touch sections TS.

Referring to FIG. 2, the display sections DS and the touch sections TS may be defined by dividing a single display frame section by time division.

Figure 3:
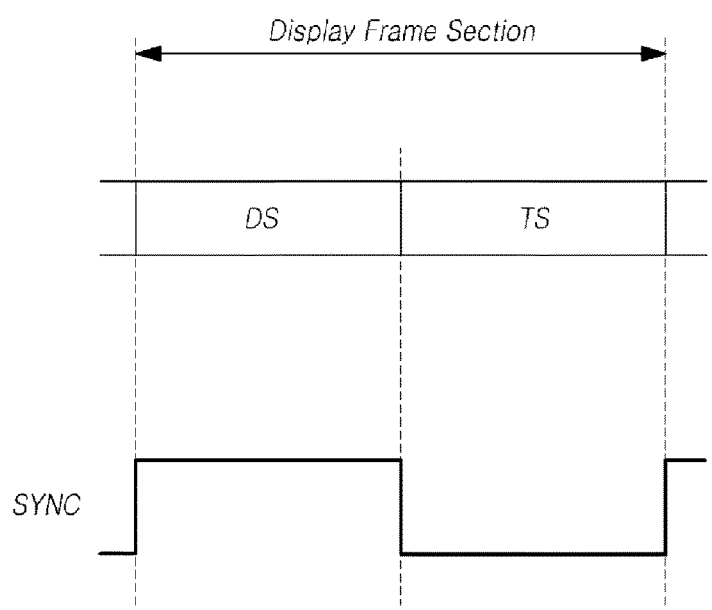
FIG. 3 is a schematic view illustrating a display section DS and a touch section in the V-sensing method of the touch display device according to exemplary embodiments.
Figure 4:
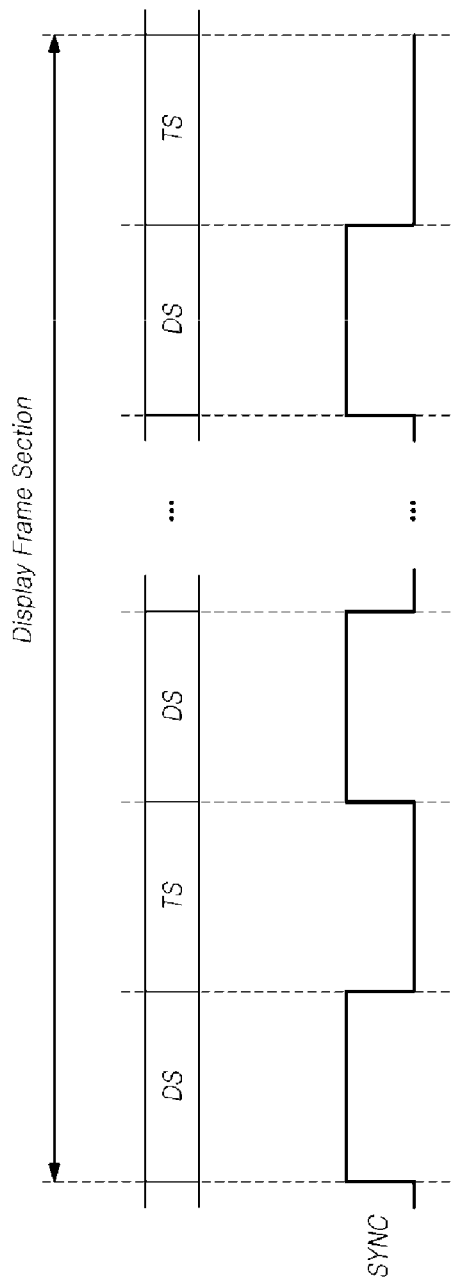
FIG. 4 is a schematic view illustrating a display section DS and a touch section in the H-sensing method of the touch display device according to exemplary embodiments.

Touch sensing may include a V-sensing method as illustrated in FIG. 3 and an H-sensing method as illustrated in FIG. 4, depending on how a single display frame section is divided into display sections DS and touch sections TS by time division.

FIG. 3 is a schematic view illustrating a display section DS and a touch section TS in the V-sensing method of the touch display device 100 according to exemplary embodiments, and FIG. 4 is a schematic view illustrating a display section DS and a touch section TS in the H-sensing method of the touch display device 100 according to exemplary embodiments.

Referring to FIG. 3, in the V-sensing method, a single display frame section is divided into a single display section DS and one or more touch sections TS by timing division.

During the single display section DS, the touch display device 100 performs display driving for a single display frame.

During the one or more touch sections TS, the touch display device 100 senses a touch or a touched position in the area of the single display frame.

Referring to FIG. 4, in the H-sensing method, a single display frame section is divided into two or more display sections DS and two or more touch sections TS.

During the two or more display sections DS, the touch display device 100 performs display driving for the single display frame.

During the two or more touch sections TS, the touch display device 100 senses a touch or a touched position in the area of the single display frame.

Referring to FIG. 3 and FIG. 4, the display sections DS and the touch sections TS can be defined by synchronization signals SYNC.

Such a synchronization signal SYNC can be generated by a control component, such as a timing controller, and can be delivered to a display driving circuit (e.g. a data driver circuit or a gate driver circuit) and a touch driving circuit (e.g. a touch sensing circuit 120).

Referring to FIG. 3 and FIG. 4, in the synchronization signal SYNC, one or more high level sections (or low level sections) correspond to the display sections DS, while one or more low level sections (or high level sections) correspond to the touch sections TS.

Figure 5:
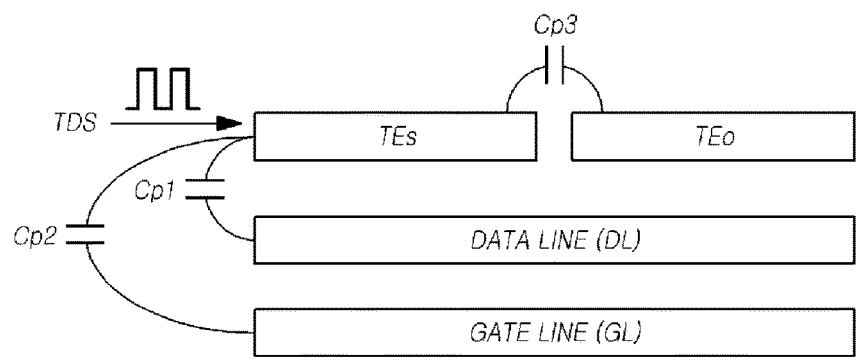
FIG. 5 is a schematic view illustrating parasitic capacitance formed in the touch display device according to exemplary embodiments.

FIG. 5 is a schematic view illustrating parasitic capacitance Cp1, Cp2, and Cp3 formed in the touch display device 100 according to exemplary embodiments.

Referring to FIG. 5, during a touch section TS, when a touch driving signal TDS is being applied to one or more touch electrodes TEs, each of the touch electrodes TEs to which the touch driving signal TDS is applied can form parasitic capacitance Cp1 together with a corresponding data line DL and can form parasitic capacitance Cp2 together with a corresponding gate line GL while forming parasitic capacitance Cp3 together with the other touch electrode TEo to which the touch driving signal TDS is not applied.

The parasitic capacitance Cp1, Cp2, and Cp3 formed during the touch section TS may act as loads during touch sensing, thereby reducing the accuracy of touch sensing.

Thus, when one or more touch electrodes among the number of touch electrodes TE are driven sequentially during the touch section TS, the touch display device 100 according to exemplary embodiments can perform load-free driving to reduce or remove the parasitic capacitance Cp1, Cp2, and Cp3 acting as loads during touch sensing.

Figure 6:
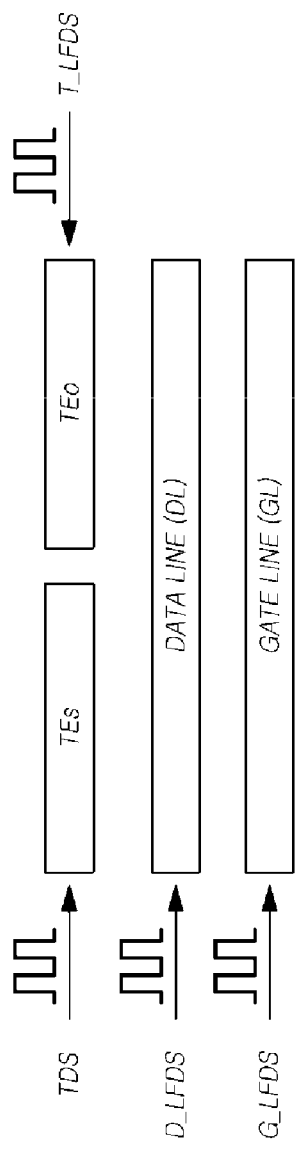
FIG. 6 is a schematic view illustrating load-free driving of the touch display device according to exemplary embodiments.

FIG. 6 is a schematic view illustrating load-free driving of the touch display device 100 according to exemplary embodiments.

Referring to FIG. 6, when a touch driving signal TDS is applied to one or more touch electrodes TEs during the touch section TS, the touch display device 100 according to exemplary embodiments can apply a load-free driving signal D_LFDS to the entirety of, or specific data lines among, the number of data lines DL.

The specific data lines among the number of data lines DL to which the load-free driving signal D_LFDS is applied may be data lines disposed in positions corresponding to the touch electrodes TEs to which the touch driving signal TDS is applied.

The load-free driving signal D_LFDS applied to the entirety of, or specific data lines among, the number of data lines DL may be identical to the touch driving signal TDS or may be a signal corresponding to the touch driving signal TDS.

When the load-free driving signal D_LFDS is a signal corresponding to the touch driving signal TDS, the frequency, phase, and amplitude of the load-free driving signal D_LFDS may be identical to the frequency, phase, and amplitude of the touch driving signal TDS.

Thus, no potential difference is formed between the touch electrode TEs to which the touch driving signal TDS is applied and the data line DL to which the load-free driving signal D_LFDS is applied, thereby preventing the parasitic capacitance Cp1 from occurring between the touch electrode TEs to which the touch driving signal TDS is applied and the data line DL to which the load-free driving signal D_LFDS is applied.

Referring to FIG. 6, when the touch driving signal TDS is applied to one or more touch electrodes TEs during the touch section TS, the touch display device 100 according to exemplary embodiments can apply a load-free driving signal G_LFDS to the entirety of, or specific gate lines among, the number of gate lines GL.

The specific gate lines among the number of gate lines GL to which the load-free driving signal G_LFDS is applied may be gate lines disposed in positions corresponding to the touch electrodes TEs to which the touch driving signal TDS is applied.

The load-free driving signal G_LFDS applied to the entirety of, or specific gate lines among, the number of gate lines GL may be identical to the touch driving signal TDS or may be a signal corresponding to the touch driving signal TDS.

When the load-free driving signal G_LFDS corresponds to the touch driving signal TDS, the frequency, phase, and amplitude of the load-free driving signal G_LFDS may be identical to the frequency, phase, and amplitude of the touch driving signal TDS.

Thus, no potential difference is formed between the touch electrode TEs to which the touch driving signal TDS is applied and the gate line GL to which the load-free driving signal G_LFDS is applied, thereby preventing the parasitic capacitance Cp2 from occurring between the touch electrode TEs to which the touch driving signal TDS is applied and the gate line GL to which the load-free driving signal G_LFDS is applied.

Referring to FIG. 6, when a touch driving signal TDS is applied to one or more touch electrodes TEs during the touch section TS, the touch display device 100 according to exemplary embodiments can apply a load-free driving signal T_LFDS to the other touch electrode TEo to which the touch driving signal TDS is not applied.

The other touch electrode TEo to which the load-free driving signal T_LFDS is applied may be a touch electrode TE disposed adjacent to the touch electrode TEs to which the touch driving signal TDS is applied or any of the remaining touch electrodes.

The load-free driving signal T_LFDS applied to the other touch electrode TEo may be identical to the touch driving signal TDS or may be a signal corresponding to the touch driving signal TDS.

When the load-free driving signal T_LFDS corresponds to the touch driving signal TDS, the frequency, phase, and amplitude of the load-free driving signal T_LFDS may be identical to the frequency, phase, and amplitude of the touch driving signal TDS.

Thus, no potential difference is formed between the touch electrode TEs to which the touch driving signal TDS is applied and the touch electrode TEo to which the load-free driving signal T_LFDS is applied, thereby preventing the parasitic capacitance Cp3 from occurring between the touch electrode TEs to which the touch driving signal TDS is applied and the touch electrode TEo to which the load-free driving signal T_LFDS is applied.

The load-free driving signals T_LFDS, D_LFDS, and G_LFDS may be completely identical to the touch driving signal TDS, or may be different from or similar to the touch driving signal TDS as long as the parasitic capacitance between a touch electrode TE that is touched and the other electrode can be removed or at least substantially reduced.

Herein, the load-free driving signals T_LFDS, D_LFDS, and G_LFDS are referred to as being completely identical to the touch driving signal TDS when the frequency, phase, and amplitude, and all other characteristics of the load-free driving signals T_LFDS, D_LFDS, and G_LFDS are identical to the frequency, phase, and amplitude, and all other characteristics of the touch driving signal TDS.

In addition, the load-free driving signals T_LFDS, D_LFDS, and G_LFDS may be referred to as being substantially identical to the touch driving signal TDS when the frequency, phase, and amplitude, and all other characteristics of the load-free driving signals T_LFDS, D_LFDS, and G_LFDS are at least substantially identical to that of the touch driving signal TDS. "Substantially identical" may be understood as "within a predeterminable tolerance margin", e.g. within a tolerance margin of ±20%, e.g. within a tolerance margin of ±10%, e.g. within a tolerance margin of ±5%, e.g. within a tolerance margin of ±1%.

Even in the case in which a load-free driving unit (e.g. the touch sensing circuit 120, the data driver circuit, and the gate driver circuit) outputs the load-free driving signals T_LFDS, D_LFDS, and G_LFDS completely identical to the touch driving signal TDS, the phase, voltage (amplitude), or signal waveform (signal shape) of load-free driving signals T_LFDS, D_LFDS, and G_LFDS actually applied to the other touch electrodes TE, data lines DL, or gate lines GL may differ from the phase, voltage (amplitude), or signal waveform (signal shape) of the touch driving signal TDS, depending on the characteristics of the panel, such as load and resistive capacitive delay.

As described above, the degree by which the output status of the load-free driving signal T_LFDS, D_LFDS, or G_LFDS differs from the status of the same signal that is actually applied may vary, according to the position of the panel.

Considering that the output status and the actually-applied status of the load-free driving signal are different from each other depending on the characteristics of the panel and the applied position as described above, the output status of the touch driving signal TDS or the load-free driving signal T_LFDS, D_LFDS, or G_LFDS may be adjusted before the signal is output such that the actually-applied status of the load-free driving signal T_LFDS, D_LFDS, or G_LFDS is identical or at least substantially identical to the actually-applied status of the touch driving signal TDS.

Thus, all of the phase, voltage (amplitude), and signal waveform (signal shape) of the load-free driving signals T_LFDS, D_LFDS, and G_LFDS output by the load-free driving circuit (e.g. the data driver circuit, the gate driver circuit, or the touch sensing circuit 120) may be identical to all of the phase, voltage (amplitude), and signal waveform (signal shape) of the touch driving signal TDS output by the touch sensing circuit 120. Alternatively, at least one of the phase, voltage (amplitude), and signal waveform (signal shape) of the load-free driving signals T_LFDS, D_LFDS, and G_LFDS may differ from at least one of the phase, voltage (amplitude), and signal waveform (signal shape) of the touch driving signal TDS, such that the actually-applied status of the load-free driving signals T_LFDS, D_LFDS, and G_LFDS is identical or at least substantially identical to the actually-applied status of the touch driving signal TDS.

When one or more touch electrodes among the number of touch electrodes TE are driven sequentially using the touch driving signal TDS in the form of a pulse (or the pulse-type touch driving signal TDS) of a single frequency (e.g. several tens of kHz to several hundreds of kHz) during the touch section TS, the touch display device 100 may form electromagnetic interface (EMI) in a harmonic frequency component depending on changes in the voltage level of the touch driving signal TDS.

In particular, when the touch display device 100 sequentially drives one or more touch electrodes among the number of touch electrodes TE using the pulse-type touch driving signal TDS having a single frequency (e.g. several tens of kHz to several hundreds of kHz) during the touch section TS while performing load-free driving on at least one of the remaining touch electrode TEo, data line DL, and gate line GL, EMI due to the touch driving signal may increase.

Figure 7:
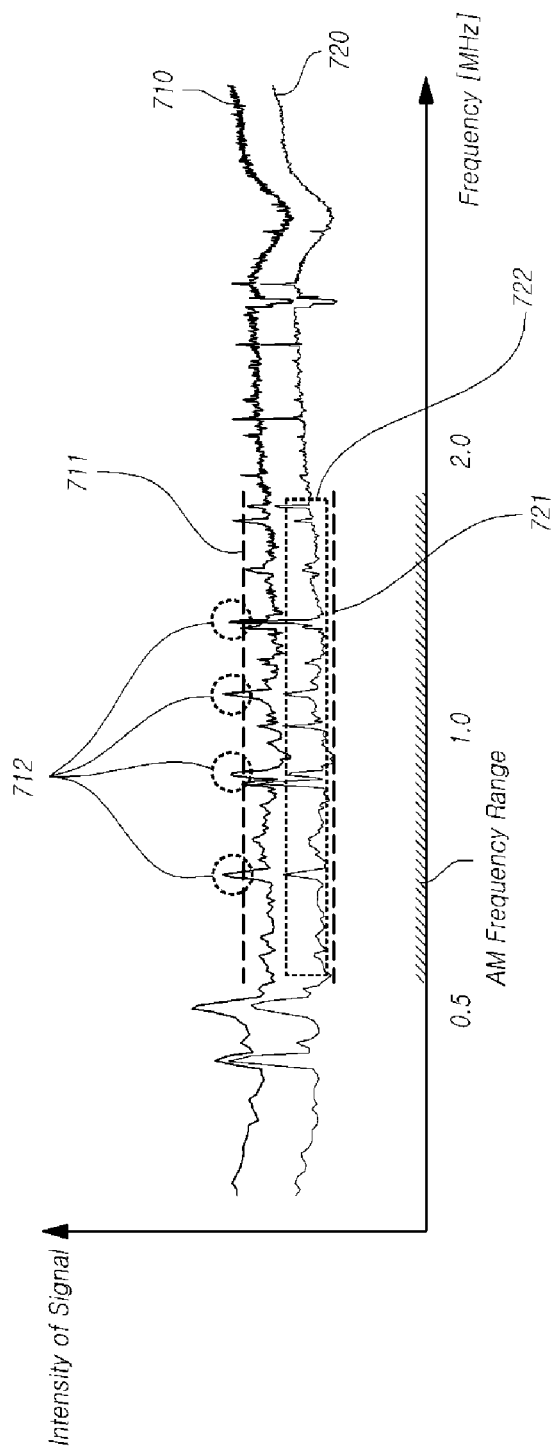
FIG. 7 is a graph illustrating EMI measured in the touch section in the touch display device according to exemplary embodiments.

FIG. 7 is a graph illustrating EMI measured in the touch section TS in the touch display device 100 according to exemplary embodiments.

Referring to FIG. 7, for example, when the touch display device 100 drives the touch electrode TE using the touch driving signal TDS having a single frequency of 100 kHz, the touch driving signal TDS may form EMI in an amplitude modulation (AM) frequency range (e.g. about 500 kHz to about 1,605 kHz).

FIG. 7 is a graph illustrating upper limits 710 and averages 720 of the intensity of EMI signals measured according to frequencies.

According to the result of measurements, it can be appreciated that specific points 712 of the upper limits 710 of measured EMI signals are higher than a reference upper limit 711, i.e. an upper limit satisfying EMI conditions in the AM frequency range.

In addition, according to the result of measurements, it can be appreciated that specific points 722 of the averages 720 of measured EMI signals are higher than a reference average 721, i.e. an average satisfying EMI conditions in the AM frequency range.

That is, according to the result of measurements, the upper limits 710 and the averages 720 of measured EMI signals may not satisfy EMI conditions in the AM frequency range.

Thus, the touch display device 100 according to exemplary embodiments can provide multifrequency driving to reduce EMI due to the touch driving signal TDS.

Figure 8:
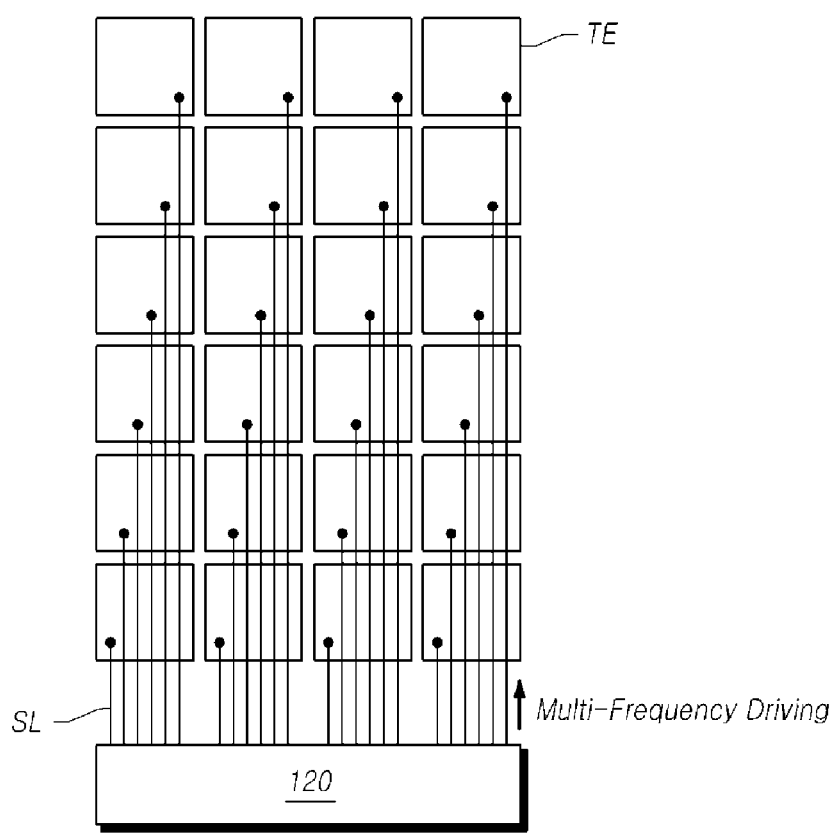
FIG. 8 is a schematic view illustrating an EMI-reducing multifrequency driving method of the touch display device according to exemplary embodiments.

FIG. 8 is a schematic view illustrating an EMI-reducing multifrequency driving method of the touch display device 100 according to exemplary embodiments.

Referring to FIG. 8, the touch sensing circuit 120 of the touch display device 100 according to exemplary embodiments drives touch electrodes TE using a touch driving signal TDS having two or more frequencies by varying the frequencies of the touch driving signals TDS.

The touch electrodes TE are electrically connected to the touch sensing circuit 120 by signal lines SL. Thus, the touch sensing circuit 120 applies a touch driving signal TDS to the touch electrodes TE through the signal lines SL.

This type of touch driving corresponds to a "multifrequency driving" method in which the touch driving signal TDS for driving the touch electrodes TE has two or more frequencies.

According to the multifrequency driving method, the frequency of the touch driving signal output by the touch sensing circuit 120 may vary.

As described above, according to the multifrequency driving method, variations in the frequency of the touch driving signal TDS output by the touch sensing circuit 120 cause EMI distribution, whereby EMI due to the touch driving signal TDS is reduced.

As described above, exemplary embodiments propose a touch sensing method, the touch sensing circuit 120, and the touch display device 100 performing touch driving using the multifrequency driving method and, in this regard, being able to reduce EMI.

Here, the multifrequency driving method is a touch driving method based on the frequency variation of a touch driving signal. The frequency of a touch driving signal may be varied by adjusting the length of a section in which a single frequency is used (i.e. a unit touch section, hereinafter "UTS") or by adjusting the number of pulses in a section in which a single frequency is used (i.e., in the unit touch section).

Hereinafter, the multifrequency driving method of driving the touch electrodes TE using the touch driving signal TDS having two or more frequencies based on frequency variation will be described in more detail.

Figure 9:
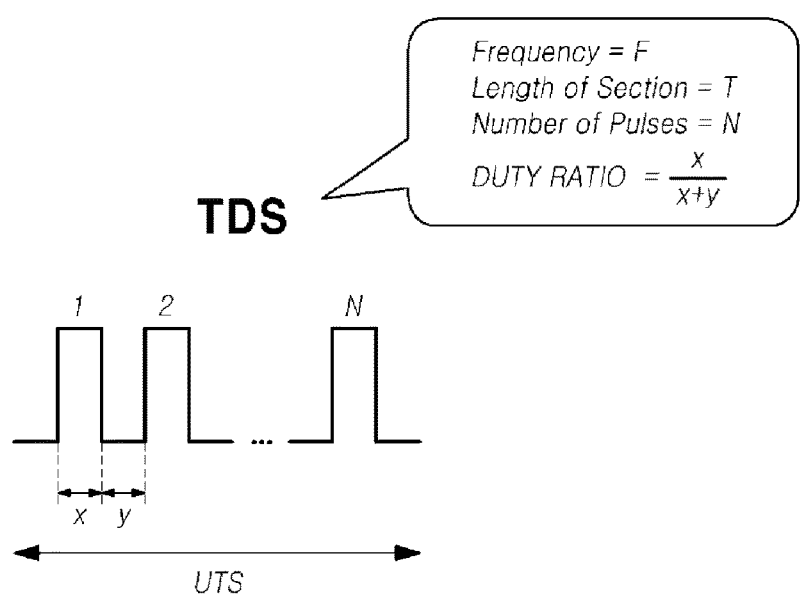
FIG. 9 is a schematic view illustrating the characteristics of a touch driving signal in a unit touch section, in which the touch driving signal is output with a single frequency, to explain the multifrequency driving characteristics of the touch display device according to exemplary embodiments.

FIG. 9 is a schematic view illustrating the characteristics of a touch driving signal TDS in a unit touch section UTS, in which the touch driving signal TDS is output with a single frequency, to explain the multifrequency driving characteristics of the touch display device 100 according to exemplary embodiments.

When multifrequency driving is performed on a touch electrode TE using a touch driving signal having two or more frequencies based on frequency variation, there is a section in which the touch electrode TE is driven using the touch driving signal TDS having a single frequency. This section is referred to as the unit touch section UTS.

FIG. 9 illustrates the touch driving signal TDS in the unit touch section UTS.

Referring to FIG. 9, the unit touch section UTS has a predetermined section length T. The pulse-type touch driving signal TDS output by the touch sensing circuit 120 in the unit touch section UTS has a predetermined frequency F and a predetermined number of pulses N.

In addition, the pulse-type touch driving signal TDS output by the touch sensing circuit 120 in the unit touch section UTS has a duty ratio defined by the length x of a high level section and the length y of a low level section.

The duty ratio of the touch driving signal TDS is x/(x+y), which may vary according to unit touch sections UTS (in other words, may vary from unit touch section UTS to unit touch section UTS) or may be identical over the entirety of the unit touch sections UTS.

Hereinafter, a case in which the duty ratio of the touch driving signal TDS is 50%, which is identical over the entirety of the unit touch sections UTS, will be explained. That is, it will be assumed that the length x of the high level section and the length y of the low level section of the touch driving signal are the same.

FIG. 10 to FIG. 13 are schematic views illustrating cases in which the touch display device 100 according to exemplary embodiments performs multifrequency driving by varying the frequencies of touch driving signals TDS according to touch sections TS, while FIG. 14 to FIG. 17 are schematic views illustrating cases in which the touch display device 100 according to exemplary embodiments performs multifrequency driving by varying the frequencies of touch driving signals TDS in touch sections TS.

The multifrequency driving method may vary depending on how the unit touch sections UTS are allocated.

As illustrated in FIG. 10 to FIG. 13, a single touch section may correspond to a single unit touch section UTS.

When a single unit touch section UTS is present in a single touch section TS, the frequency of a touch driving signal TDS is the same in the single touch section TS corresponding to the single unit touch section UTS, while the frequency of the touch driving signal TDS varies according to touch sections TS.

In contrast, as illustrated in FIG. 14 to FIG. 17, a singlet touch section TS may correspond to two or more unit touch sections UTS.

When two or more unit touch sections UTS are present in the single touch section TS as described above, the frequency of a touch driving signal TDS may vary according to the unit touch sections UTS in the single touch section TS.

According to multifrequency driving, when there are two or more unit touch sections UTS and in each of the unit touch sections a touch driving signal TDS having the same frequency is output, the frequency of the touch driving signal TDS output from one unit touch section UTS is different from the frequency of the touch driving signal TDS output from the other unit touch section UTS.

The frequency of the touch driving signal TDS output by each of the two or more unit touch sections UTS may be defined by the length T of the corresponding unit touch section and the number of pulses N of the touch driving signal TDS in the corresponding unit touch section UTS.

According to a first method for frequency variation, the two or more unit touch sections UTS may have the same length T, and the touch driving signal TDS may have different numbers of pulses N in the two or more unit touch sections UTS.

According to a second method for frequency variation, the two or more unit touch sections UTS may have different lengths T, and the touch driving signal TDS may have the same number of pulses N in the two or more unit touch sections UTS.

Hereinafter, the multifrequency driving method based on how the unit touch sections UTS are allocated will be described in more detail.

First referring to FIG. 10 to FIG. 13, the multifrequency driving method will be described with respect to the case in which a single touch section TS corresponds to a single unit touch section UTS.

Figure 10:
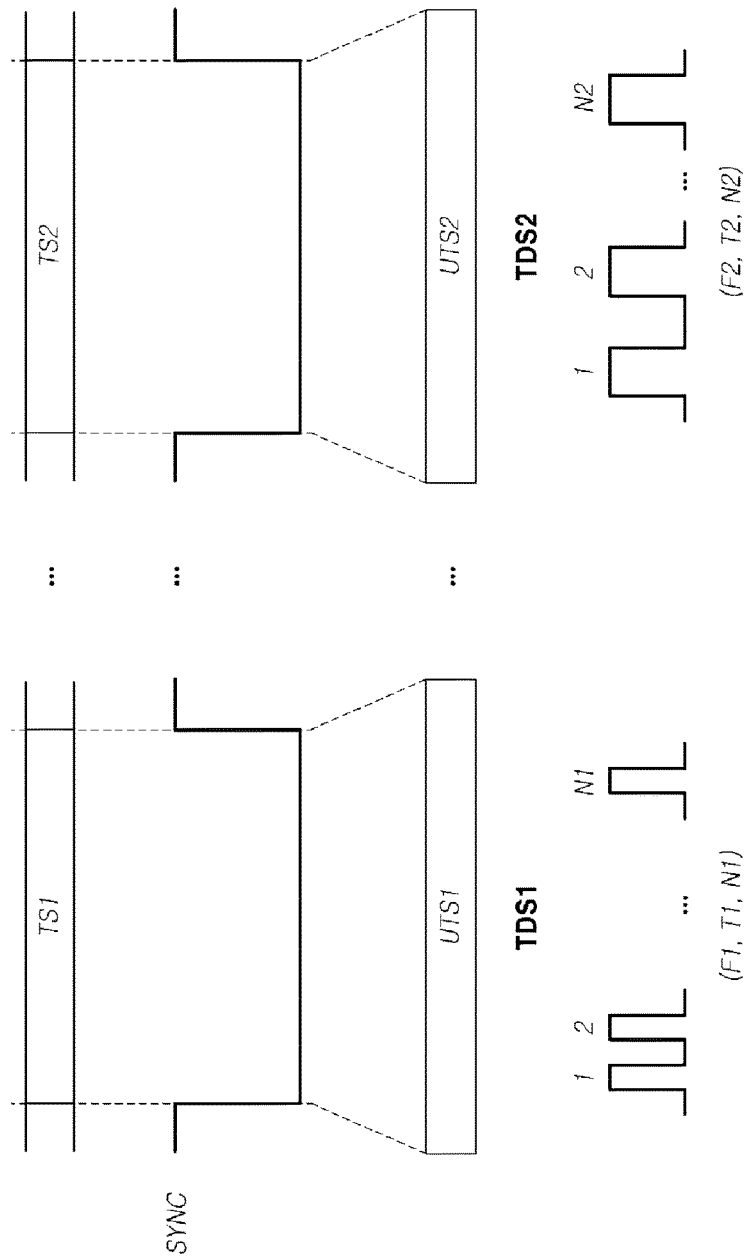
FIG. 10 is a schematic view illustrating a case in which the touch display device according to exemplary embodiments performs multifrequency driving by varying the frequencies of touch driving signals according to touch sections.

Referring to FIG. 10, a first unit touch section UTS1 in which a touch driving signal TDS1 having a first frequency is output corresponds to a first touch section TS1, while a second unit touch section UTS2 in which a touch driving signal TDS2 having a second frequency F2 is output corresponds to a second touch section TS2.

The first frequency F1 of the touch driving signal TDS1 in the first unit touch section UTS1 differs from the second frequency F2 of the touch driving signal TDS2 in the second unit touch section UTS2.

The first frequency F1 of the touch driving signal TDS1 in the first unit touch section UTS1 is defined in Formula 1 by the length T1 of the first unit touch section UTS1 and the number of pulses N1 of the first unit touch section UTS1.

$$F1 \propto N1/T1 \quad \text{[Formula 1]}$$

The second frequency F2 of the touch driving signal TDS2 in the second unit touch section UTS is defined in Formula 2 by the length T2 of the second unit touch section UTS2 and the number of pulses N2 of the second unit touch section UTS2.

$$F2 \propto N2/T2 \quad \text{[Formula 2]}$$

As described above, it is possible to efficiently vary the frequency F of the touch driving signal TDS in each unit touch section UTS by adjusting the number of pulses N of the touch driving signal TDS in each unit touch section UTS and the length T of each unit touch section UTS.

Figure 11:
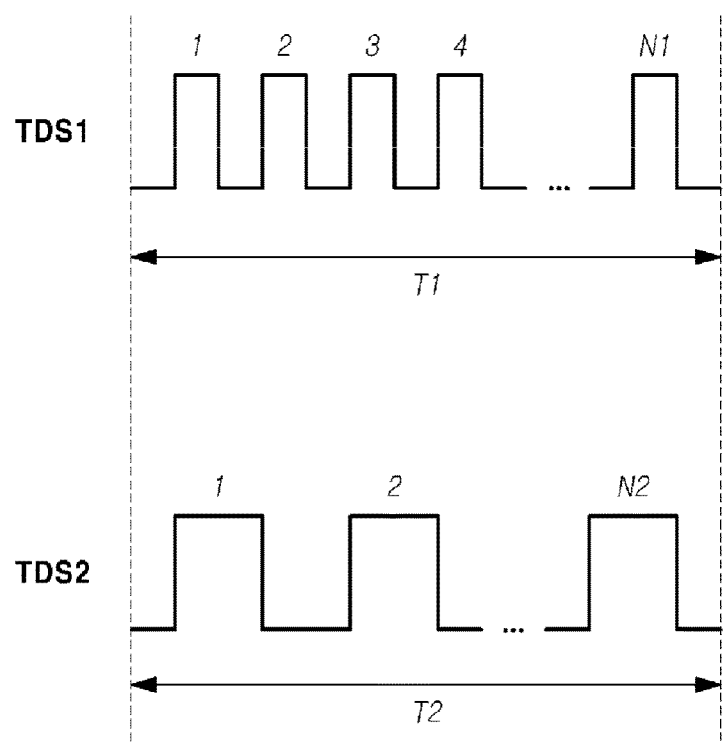
FIG. 11 is a schematic view illustrating a case in which the touch display device according to exemplary embodiments performs multifrequency driving by varying the frequencies of touch driving signals according to touch sections, in which the frequencies are varied based on the number of pulses in unit touch sections.

As illustrated in FIG. 11, it is possible to vary the frequency F of the touch driving signal TDS by adjusting the number of pulses N of the touch driving signal TDS in each unit touch section UTS.

According to the frequency variation method as described above, the length T1 of the first unit touch section UTS1 is equal or substantially equal to the length T2 of the second unit touch section UTS2, while the number of pulses N1 of the touch driving signal TDS1 in the first unit touch section UTS1 differs from the number of pulses N2 of the touch driving signal TDS2 in the second unit touch section UTS2. The term "substantially equal" may be understood as "equal within a predeterminable tolerance margin", e.g. within a tolerance margin of ±20%, e.g. within a tolerance margin of ±10%, e.g. within a tolerance margin of ±5%, e.g. within a tolerance margin of ±1%.

Referring to FIG. 11, the touch driving signal TDS2, the number of pulses N2 of which is smaller than the number of pulses N1 of the touch driving signal TDS1 in the first unit touch section UTS1, is output in the second unit touch section UTS2, the length T2 of which is equal to the length T1 of the first unit touch section UTS1, whereby the second frequency F2 of the touch driving signal TDS2 in the second unit touch section UTS2 is set to be lower than the first frequency F1 of the touch driving signal TDS1 in the first unit touch section UTS1.

As described above, according to the frequency variation method based on the number of pulses, the frequency components are evenly distributed in time, since the lengths T of the unit touch sections UTS are the same. Consequently, this can efficiently distribute EMI components, thereby reducing EMI.

Figure 12:
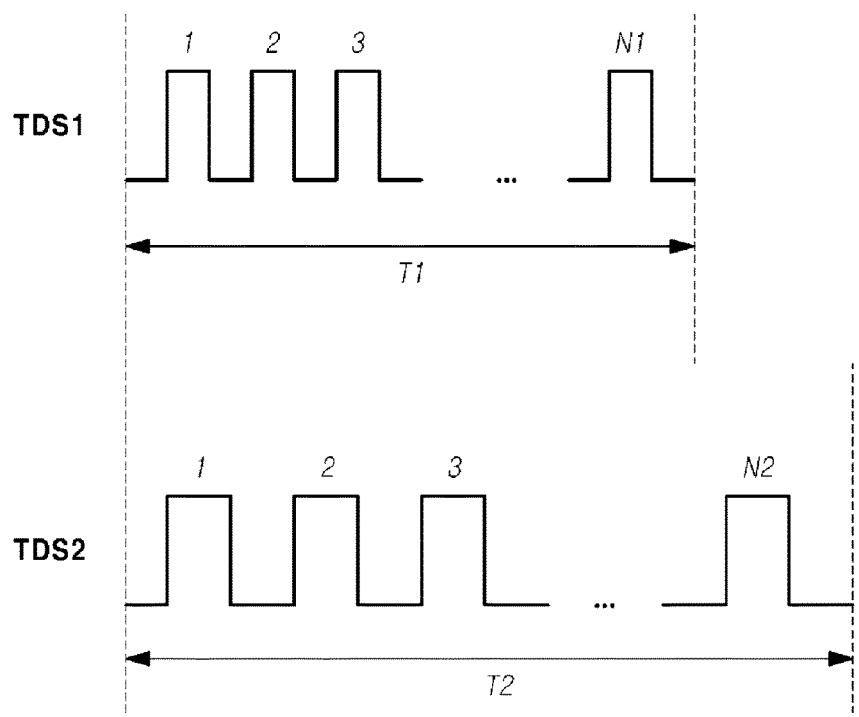
FIG. 12 is a schematic view illustrating a case in which the touch display device according to exemplary embodiments performs multifrequency driving by varying the frequencies of touch driving signals according to touch sections, in which the frequencies are varied based on the lengths of unit touch sections.

As illustrated in FIG. 12, it is possible to vary the frequency F of the touch driving signal TDS by adjusting the length T of the unit touch sections UTS.

According to the frequency variation method based on the length of unit touch sections, the number of pulses N1 of the touch driving signal TDS1 in the first unit touch section UTS1 is equal to the number of pulses N2 of the touch driving signal TDS2 in the second unit touch section UTS2, while the length T1 of the first unit touch section UTS1 differs from the length T2 of the second unit touch section UTS2.

Referring to FIG. 12, the touch driving signal TDS2, the number of pulses N2 of which is equal to the number of pulses N1 of the touch driving signal TDS1 in the first unit touch section UTS1, is output in the second unit touch section UTS2, the length T2 of which is longer than the length T1 of the first unit touch section UTS1, whereby the second frequency F2 of the touch driving signal TDS2 in the second unit touch section UTS2 is lower than the first frequency F1 of the touch driving signal TDS1 in the first unit touch section UTS1.

According to the frequency variation method based on the length of unit touch sections as described above, the numbers of pulses N of the unit touch sections UTS are the same, whereby pulse generation for frequency variation is advantageously facilitated.

In some embodiments, the multi-frequency driving method herein may be used to drive touch electrodes at different positions within the display panel with touch driving signals of different frequency. For example, a first touch electrode at a first position within the display panel may be driven by a first touch driving signal at a first frequency, and a second touch electrode at a second position within the display panel may be driven by a second touch driving signal at a second frequency different from the first frequency.

Figure 13:
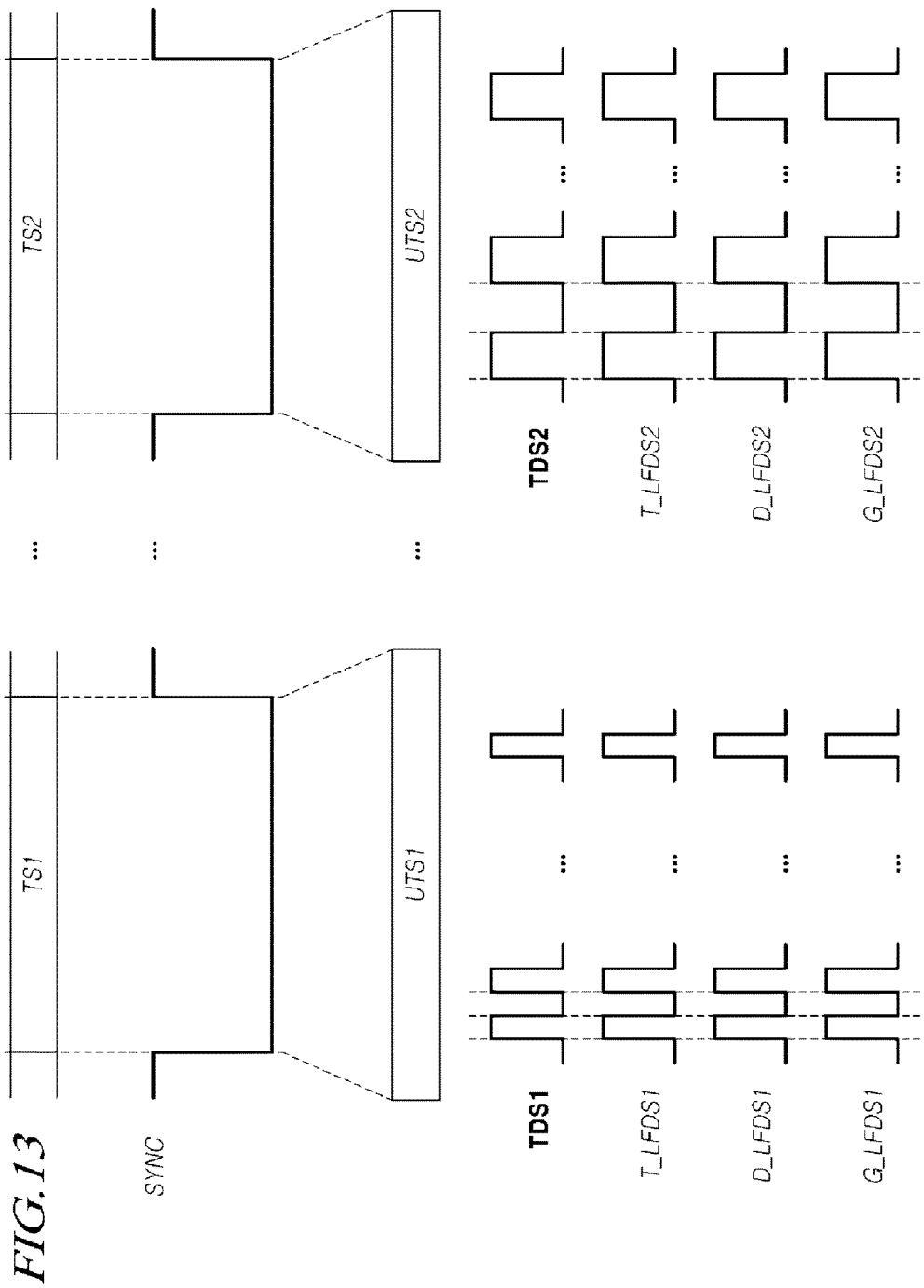
FIG. 13 is a schematic view illustrating a case in which the touch display device according to exemplary embodiments performs multifrequency driving by varying the frequencies of touch driving signals according to touch sections, in which load-free driving is performed.

FIG. 13 is a schematic view illustrating load-free driving (LFD) in the case in which the touch display device 100 according to exemplary embodiments performs multifrequency driving by varying the frequencies of the touch driving signals TDS according to touch sections TS.

When multifrequency driving is performed by varying the frequencies of the touch driving signals TDS according to the touch sections TS, a load-free driving signal D_LFDS can be applied to the entirety of, or specific data lines among, the number of data lines DL while a touch driving signal TDS is being applied to one or more touch electrodes among the number of touch electrodes TE.

The load-free driving signal D_LFDS applied to the entirety of, or specific data lines among, the number of data lines DL may be identical to the touch driving signal TDS or may be a signal, the frequency and phase of which correspond to the frequency and phase, respectively, of the touch driving signal TDS (for example, the frequency and phase of the load-free driving signal D_LFDS may be identical to the frequency and phase, respectively, of the touch driving signal TDS).

When the frequencies of the touch driving signals TDS vary from F1 to F2 according to multifrequency driving, the frequency of the load-free driving signal D_LFDS applied to the entirety of, or specific data lines among, the data lines DL, may vary from F1 to F2.

Referring to FIG. 13, the frequency of the load-free driving signal D_LFDS1 output to the data line DL in the first unit touch section UTS1 is determined depending on the first frequency F1 of the touch driving signal TDS1 output in the first unit touch section UTS1, while the frequency of the load-free driving signal D_LFDS2 output to the data line DL in the second unit touch section UTS2 is determined depending on the second frequency F2 of the touch driving signal TDS2 output in the second unit touch section UTS2.

Thus, even in the case in which multifrequency driving is performed, no potential difference is formed between the touch electrode TE to which the touch driving signal TDS is applied and the data line DL to which the load-free driving signal D_LFDS is applied, whereby parasitic capacitance Cp1 can be prevented from being formed between the touch electrode TE to which the touch driving signal TDS is applied and the data line DL to which the load-free driving signal D_LFDS is applied.

In addition, when multifrequency driving is performed by varying the frequencies of the touch driving signals TDS according to the touch sections TS, a load-free driving signal G_LFDS can be applied to the entirety of, or specific gate lines among, the number of gate lines GL while a touch driving signal TDS is being applied to one or more touch electrodes among the number of touch electrodes TE.

The load-free driving signal G_LFDS applied to the entirety of, or specific gate lines among, the gate lines GL may be identical to the touch driving signal TDS or may be a signal, the frequency and phase of which correspond to the frequency and phase, respectively, of the touch driving signal TDS (for example, the frequency and phase of the load-free driving signal G_LFDS may be identical to the frequency and phase, respectively, of the touch driving signal TDS).

When the frequency of the touch driving signal TDS varies due to multifrequency driving, the frequency of the load-free driving signal G_LFDS applied to the entirety of, or specific gate lines among, the gate lines GL may vary.

Referring to FIG. 13, the frequency of the load-free driving signal G_LFDS1 output to the gate line GL in the first unit touch section UTS1 is determined depending on the first frequency F1 of the touch driving signal TDS1 output in the first unit touch section UTS1, while the frequency of the load-free driving signal G_LFDS2 output to the gate line GL in the second unit touch section UTS2 is determined depending on the second frequency F2 of the touch driving signal TDS2 output in the second unit touch section UTS2.

Thus, even in the case in which multifrequency driving is performed, no potential difference is formed between the touch electrode TEs to which the touch driving signal TDS is applied and the gate line GL to which the load-free driving signal G_LFDS is applied, whereby parasitic capacitance Cp2 can be prevented from being formed between the touch electrode TEs to which the touch driving signal TDS is applied and the gate line GL.

In addition, when multifrequency driving is performed by varying the frequencies of the touch driving signals TDS according to the touch sections TS, while a touch driving signal TDS is being applied to one or more touch electrodes among the number of touch electrodes TE, a load-free driving signal T_LFDS can be applied to the entirety of, or specific touch electrodes among, the other touch electrodes TEo.

The load-free driving signal T_LFDS applied to the entirety of, or specific touch electrodes among, the number of touch electrodes TE may be identical to the touch driving signal TDS or may be a signal, the frequency and phase of which correspond to the frequency and phase of the touch driving signal TDS (for example, the frequency and phase of the load-free driving signal T_LFDS may be identical to the frequency and phase of the touch driving signal TDS).

When the frequencies of the touch driving signals TDS vary due to multifrequency driving, the frequency of the load-free driving signal T_LFDS applied to the entirety of, or specific touch electrodes among, the number of touch electrodes TE may vary.

Referring to FIG. 13, the frequency of the load-free driving signal T_LFDS1 output to the other touch electrode TE in the first unit touch section UTS1 is determined depending on the first frequency F1 of the touch driving signal TDS1 output in the first unit touch section UTS1, while the frequency of the load-free driving signal T_LFDS2 output to the other touch electrode TE in the second unit touch section UTS1 is determined depending on the second frequency F2 of the touch driving signal TDS2 output in the second unit touch section UTS2.

Thus, even in the case in which multifrequency driving is performed, no potential difference is formed between the touch electrode TEs to which the touch driving signal TDS is applied and the other touch electrode TEo to which the load-free driving signal T_LFDS is applied, whereby parasitic capacitance Cp3 can be prevented from being formed between the touch electrode TEs to which the touch driving signal TDS is applied and the other touch electrode TEo.

Hereinafter, the multifrequency driving method in the case in which a single touch section TS corresponds to two or more unit touch sections UTS will be described with reference to FIG. 14 to FIG. 17.

Hereinafter, a case in which a single touch section TS corresponds to three unit touch sections UTS1, UTS2, and UTS3 will be taken. In addition, in this case, the first frequency F1 of the touch driving signal TDS1 in the first unit touch section UTS1, the second frequency F2 of the touch driving signal TDS2 in the second unit touch section UTS2, and the third frequency F3 of the touch driving signal TDS3 in the third unit touch section UTS3 are assumed to be different from each other.

Figure 14:
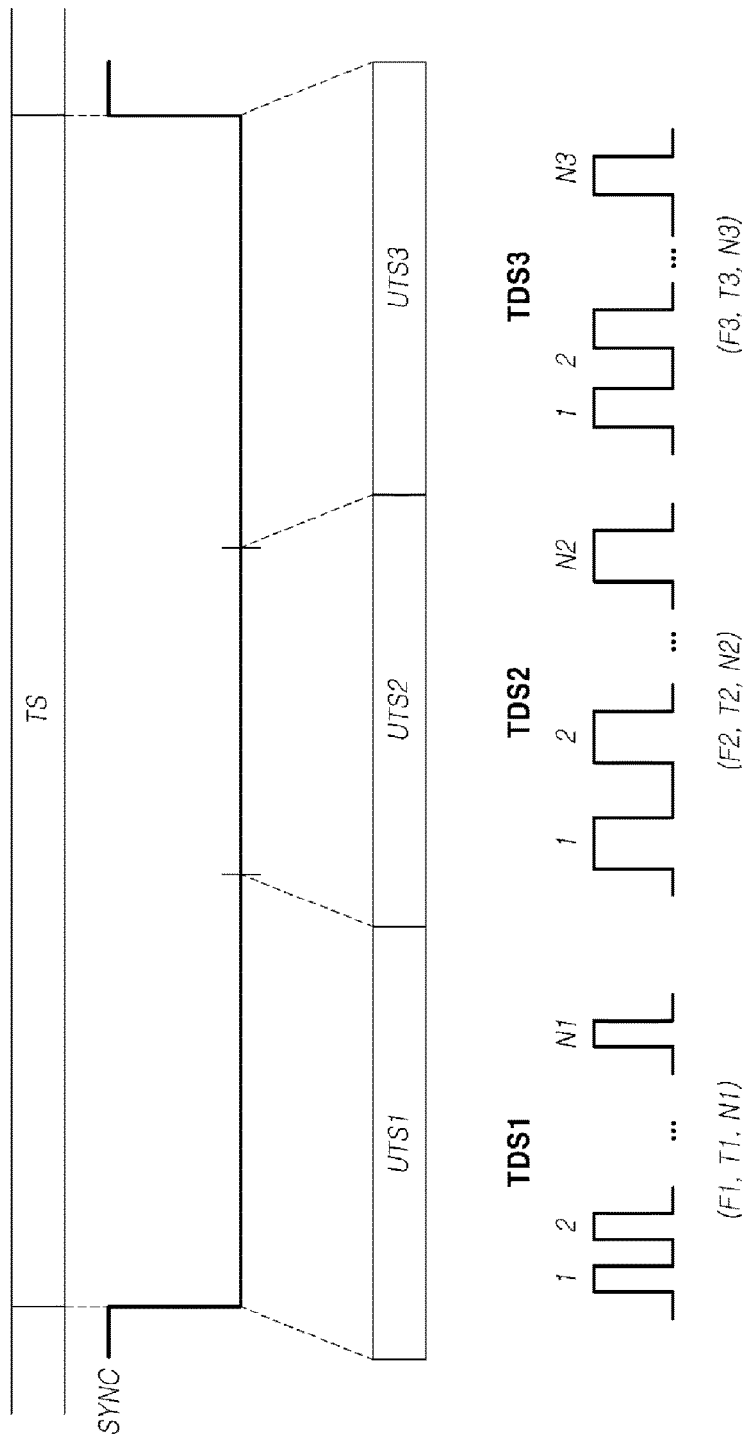
FIG. 14 is a schematic view illustrating a case in which the touch display device according to exemplary embodiments performs multifrequency driving by varying the frequencies of touch driving signals in touch sections.

Referring to FIG. 14, the first unit touch section UTS1 in which the touch driving signal TDS1 having the first frequency F1 is output, the second unit touch section UTS2 in which the touch driving signal TDS2 having the second frequency F2 is output, and the third unit touch section UTS3 in which the touch driving signal TDS3 having the third frequency F3 is output are present in the single touch section TS.

The first frequency F1 of the touch driving signal TDS1 in the first unit touch section UTS1, the second frequency F2 of the touch driving signal TDS2 in the second unit touch section UTS2, and the third frequency F3 of the touch driving signal TDS3 in the third unit touch section UTS3 are not equal.

That is, all of the first to third frequencies F1, F2, and F3 may be different from each other, or two frequencies (F1 and F2, F1 and F3, or F2 and F3) among the first to third frequencies F1, F2, and F3 may be equal, with the remaining frequency being different from the two frequencies.

The first frequency F1 of the touch driving signal TDS1 in the first unit touch section UTS1 may be defined by the length T1 of the first unit touch section UTS1 and the number of pulses N1 in the first unit touch section UTS1.

The second frequency F2 of the touch driving signal TDS2 in the second unit touch section UTS2 may be defined by the length T2 of the second unit touch section UTS2 and the number of pulses N2 in the second unit touch section UTS2.

The third frequency F3 of the touch driving signal TDS3 in the third unit touch section UTS3 may be defined by the length T3 of the third unit touch section UTS3 and the number of pulses N3 in the third unit touch section UTS3.

As described above, it is possible to efficiently vary the frequency F of the touch driving signal TDS in the unit touch sections UTS by adjusting the number of pulses N of the touch driving signal TDS in each unit touch section UTS and the length T of each unit touch section UTS.

Figure 15:
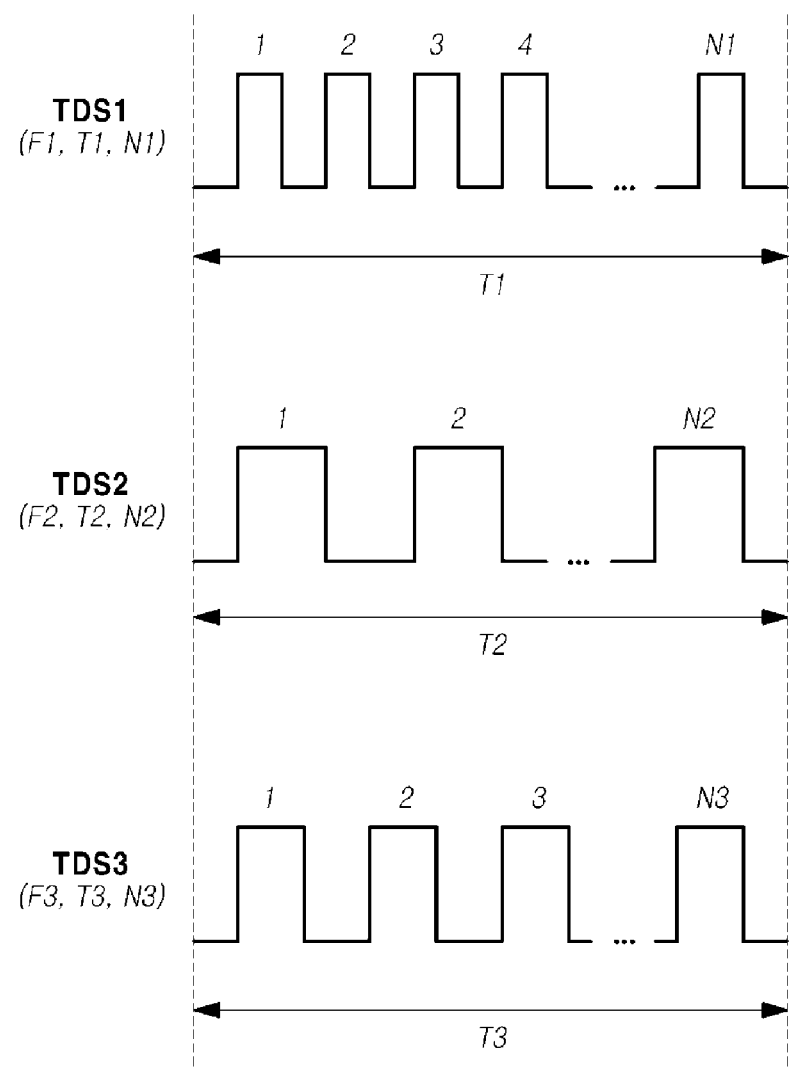
FIG. 15 is a schematic view illustrating a case in which the touch display device according to exemplary embodiments performs multifrequency driving by varying the frequencies of touch driving signals in touch sections, in which the frequencies are varied based on the number of pulses in unit touch sections.

As illustrated in FIG. 15, it is possible to vary the frequency F of the touch driving signal TDS by adjusting the number of pulses N of the touch driving signal TDS in each unit touch section UTS.

According to the frequency variation method based on the number of pulses, the length T1 of the first unit touch section UTS1, the length T2 of the second unit touch section UTS2, and the length T3 of the third unit touch section UTS3 may be equal.

However, the number of pulses N1 of the touch driving signal TDS1 in the first unit touch section UTS1, the number of pulses N2 of the touch driving signal TDS2 in the second unit touch section UTS2, and the number of pulses N3 of the touch driving signal TDS3 in the third unit touch section UTS3 are not equal.

That is, N1, N2, and N3 may be different from each other, or two numbers among N1, N2, and N3 may be equal, with the remaining number being different from the two numbers.

Referring to FIG. 15, the touch driving signal TDS2, the number of pulses N2 of which is smaller than the number of pulses N1 of the touch driving signal TDS1 in the first unit touch section UTS1, is output in the second unit touch section UTS2, the length T2 of which is equal to the length T1 of the first unit touch section UTS1, whereby the second frequency F2 of the touch driving signal TDS2 in the second unit touch section UTS2 can be lower than the first frequency F1 of the touch driving signal TDS1 in the first unit touch section UTS1.

In addition, the touch driving signal TDS3, the number of pulses N3 of which is smaller than the number of pulses N1 of the touch driving signal TDS1 in the first unit touch section UTS1 and greater than the number of pulses N2 of the touch driving signal TDS2 in the second unit touch section UTS2, is output in the third unit touch section UTS3, the length T3 of which is equal to the length T2 of the second unit touch section UTS2, whereby the third frequency F3 of the touch driving signal TDS3 in the third unit touch section UTS3 can be set to be higher than the second frequency F2 of the touch driving signal TDS2 in the second unit touch section UTS2 and lower than the first frequency F1 of the touch driving signal TDS1 in the first unit touch section UTS1.

As described above, according to the frequency variation method based on the number of pulses, the frequency components are evenly distributed in time, since the lengths T of the unit touch sections UTS are the same. Consequently, this can efficiently distribute EMI components, thereby reducing EMI.

Figure 16:
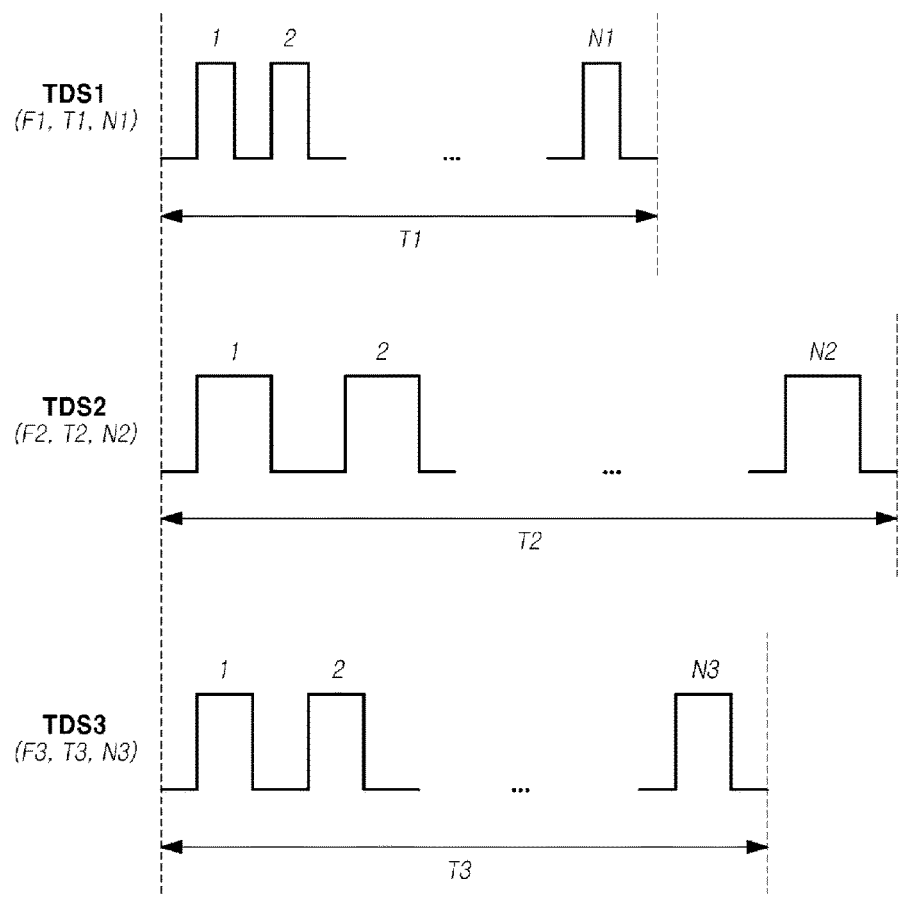
FIG. 16 is a schematic view illustrating a case in which the touch display device according to exemplary embodiments performs multifrequency driving by varying the frequencies of touch driving signals in touch sections, in which the frequencies are varied based on the lengths of unit touch sections.

In addition, as illustrated in FIG. 16, it is possible to vary the frequency F of the touch driving signal TDS by adjusting the length T of unit touch sections UTS.

According to the frequency variation method based on the length of unit touch sections, the number of pulses N1 of the touch driving signal TDS1 in the first unit touch section UTS1, the number of pulses N2 of the touch driving signal TDS2 in the second unit touch section UTS2, and the number of pulses N3 of the touch driving signal TDS3 in the third unit touch section UTS3 may be equal.

The length T1 of the first unit touch section UTS1, the length T2 of the second unit touch section UTS2, and the length T3 of the third unit touch section UTS3 may not be equal.

That is, T1, T2, and T3 may be different from each other, or two lengths among T1, T2, and T3 may be equal, with the remaining length being different from the two lengths.

Referring to FIG. 16, the touch driving signal TDS2, the number of pulses N2 of which is equal to the number of pulses N1 of the touch driving signal TDS1 in the first unit touch section UTS1, is output in the second unit touch section UTS2, the length T2 of which is longer than the length T1 of the first unit touch section UTS1, whereby the second frequency F2 of the touch driving signal TDS2 in the second unit touch section UTS2 is set to be lower than the first frequency F1 of the touch driving signal TDS1 in the first unit touch section UTS1.

In addition, the touch driving signal TDS3, the number of pulses N3 of which is equal to the number of pulses N2 of the touch driving signal TDS2 in the second unit touch section UTS1, is output in the third unit touch section UTS3, the length T3 of which is shorter than the length T2 of the second unit touch section UTS2 and longer than the length T1 of the first unit touch section UTS1, whereby the third frequency F3 of the touch driving signal TDS3 in the third unit touch section UTS3 is set to be higher than the second frequency F2 of the touch driving signal TDS2 in the second unit touch section UTS2 and lower than the first frequency F1 of the touch driving signal TDS1 in the first unit touch section UTS1.

According to the frequency variation method based on the length of unit touch sections as described above, the numbers of pulses N of the unit touch sections UTS are the same, whereby pulse generation for frequency variation is advantageously facilitated.

Figure 17:
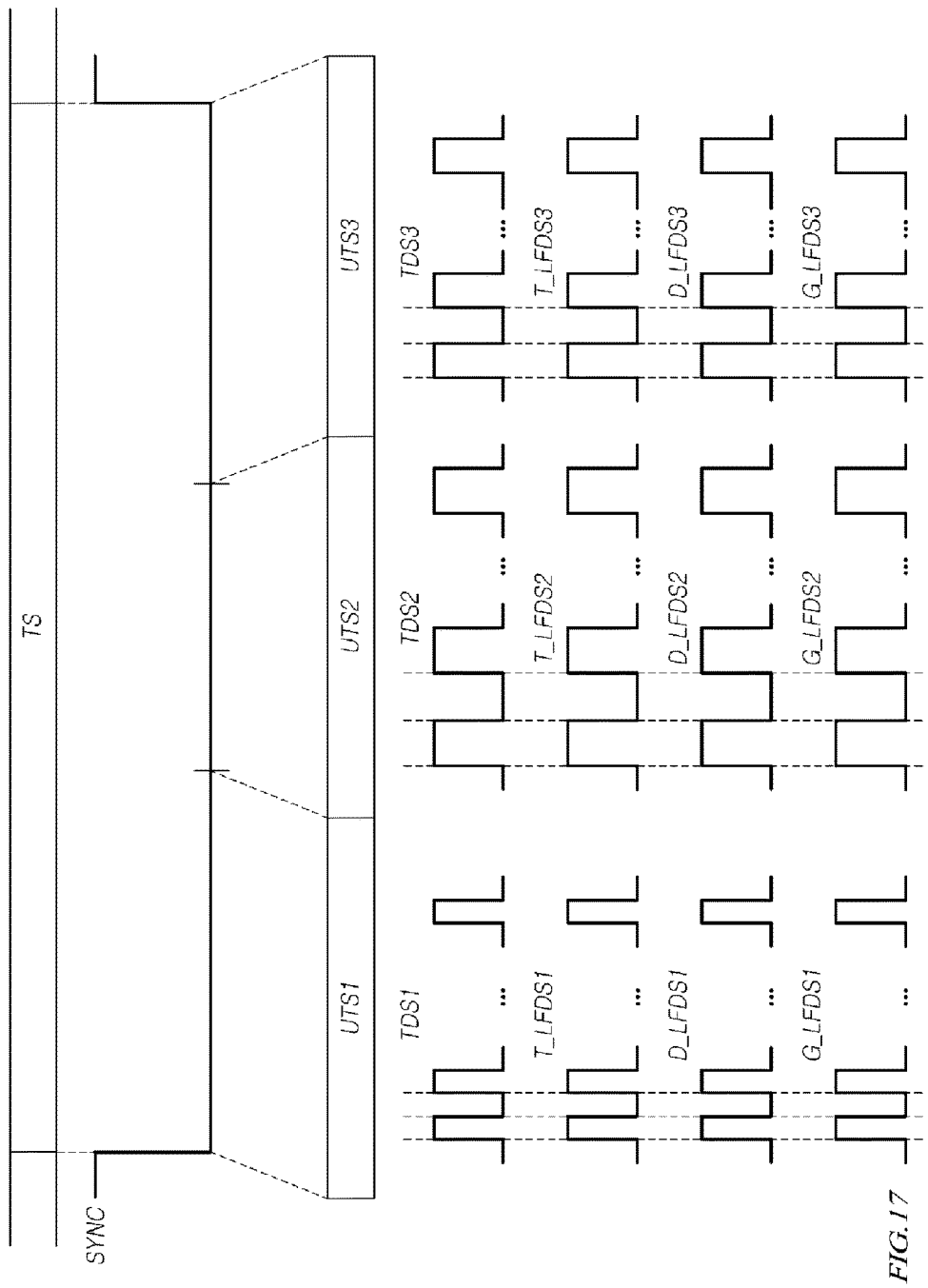
FIG. 17 is a schematic view illustrating a case in which the touch display device according to exemplary embodiments performs multifrequency driving by varying the frequencies of touch driving signals in touch sections, in which load-free driving is performed.

FIG. 17 is a schematic view illustrating load-free driving in the case in which the touch display device 100 according to exemplary embodiments performs multifrequency driving by varying the frequencies of touch driving signals TDS in a touch section.

In the case in which multifrequency driving is performed by varying the frequencies of the touch driving signals TDS according to unit touch sections UTS in a touch section TS, a load-free driving signal D_LFDS can be applied to the entirety of, or specific data lines among, the data lines DL while the touch driving signal TDS is being applied to one or more touch electrodes of the touch electrodes TE.

Here, the load-free driving signal D_LFDS applied to the entirety of, or specific data lines among, the data lines DL may be identical to the touch driving signal TDS or may be a signal, the frequency and phase of which correspond to the frequency and phase, respectively, of the touch driving signal TDS (for example, the frequency and phase of the load-free driving signal D_LFDS may be identical to the frequency and phase, respectively, of the touch driving signal TDS).

When the frequencies of the touch driving signals TDS vary in the sequence of F1, F2, to F3 according to multifrequency driving, the frequency of the load-free driving signal D_LFDS applied to the entirety of, or specific data lines among, the data lines DL may vary in the sequence of F1, F2, to F3.

Referring to FIG. 17, the frequency of the load-free driving signal D_LFDS1 output to the data line DL in the first unit touch section UTS1 is determined depending on the first frequency F1 of the touch driving signal TDS1 output in the first unit touch section UTS1, the frequency of the load-free driving signal D_LFDS2 output to the data line DL in the second unit touch section UTS2 is determined depending on the second frequency F2 of the touch driving signal TDS2 output in the second unit touch section UTS2, and the frequency of the load-free driving signal D_LFDS3 output to the data line DL in the third unit touch section UTS3 is determined depending on the third frequency F3 of the touch driving signal TDS3 output in the third unit touch section UTS3.

Thus, even in the case in which multifrequency driving is performed, no potential difference is formed between the touch electrode TE to which the touch driving signal TDS is applied and the data line DL to which the load-free driving signal D_LFDS is applied, whereby parasitic capacitance Cp1 can be prevented from being formed between the touch electrode TEs to which the touch driving signal TDS is applied and the data line DL to which the load-free driving signal D_LFDS is applied.

In addition, when multifrequency driving is performed by varying the frequencies of the touch driving signals TDS according to the unit touch sections UTS in the touch section TS, a load-free driving signal G_LFDS can be applied to the entirety of, or specific gate lines among, the gate lines GL while the touch driving signals TDS are being applied to one or more touch electrodes among the touch electrodes TE.

The load-free driving signal G_LFDS applied to the entirety of, or specific gate lines among, the gate lines GL may be identical to the touch driving signal TDS or may be a signal, the frequency and phase of which correspond to the frequency and phase, respectively, of the touch driving signal TDS (for example, the frequency and phase of the load-free driving signal G_LFDS may be identical to the frequency and phase, respectively, of the touch driving signal TDS).

When the frequencies of the touch driving signals TDS vary due to multifrequency driving, the frequency of the load-free driving signal G_LFDS applied to the entirety of, or specific gate lines among, the gate lines GL may vary.

Referring to FIG. 17, the frequency of the load-free driving signal G_LFDS1 output to the gate line GL in the first unit touch section UTS1 is determined depending on the first frequency F1 of the touch driving signal TDS1 output in the first unit touch section UTS1, the frequency of the load-free driving signal G_LFDS2 output to the gate line GL in the second unit touch section UTS2 is determined depending on the second frequency F2 of the touch driving signal TDS2 output in the second unit touch section UTS2, and the frequency of the load-free driving signal G_LFDS3 output to the gate line GL in the third unit touch section UTS3 is determined depending on the third frequency F3 of the touch driving signal TDS3 output in the third unit touch section UTS3.

Thus, even in the case in which multifrequency driving is performed, no potential difference is formed between the touch electrode TEs to which the touch driving signal TDS is applied and the gate line GL to which the load-free driving signal G_LFDS is applied, whereby parasitic capacitance Cp2 can be prevented from being formed between the touch electrode TEs to which the touch driving signal TDS is applied and the gate line GL to which the load-free driving signal G_LFDS is applied.

In addition, when multifrequency driving is performed by varying the frequencies of the touch driving signals TDS according to the unit touch sections UTS in the touch section TS, while a touch driving signal TDS is being applied to one or more touch electrodes among the touch electrodes TE, a load-free driving signal T_LFDS can be applied to the entirety of, or specific touch electrodes among, the other touch electrodes TE.

The load-free driving signal T_LFDS applied to the entirety of, or specific touch electrodes among, the touch electrodes TE may be identical to the touch driving signal TDS or may be a signal, the frequency and phase of which correspond to the frequency and phase, respectively, of the touch driving signal TDS (for example, the frequency and phase of the load-free driving signal T_LFDS may be identical to the frequency and phase, respectively, of the touch driving signal TDS).

When the frequencies of the touch driving signals TDS vary due to multifrequency driving, the frequency of the load-free driving signal T_LFDS applied to the entirety of, or specific touch electrodes among, the remaining touch electrodes TE may vary.

Referring to FIG. 17, the frequency of the load-free driving signal T_LFDS1 output to the other touch electrode TE in the first unit touch section UTS1 is determined depending on the first frequency F1 of the touch driving signal TDS1 output in the first unit touch section UTS1, the frequency of the load-free driving signal T_LFDS2 output to the other touch electrode TE in the second unit touch section UTS2 is determined depending on the second frequency F2 of the touch driving signal TDS2 output in the second unit touch section, and the frequency of the load-free driving signal T_LFDS3 output to the other touch electrode TE in the third unit touch section UTS3 is determined depending on the third frequency F3 of the touch driving signal TDS3 output in the third unit touch section.

Thus, even in the case in which multifrequency driving is performed, no potential difference is formed between the touch electrode TEs to which the touch driving signal TDS is applied and the other touch electrode TEo to which the load-free driving signal T_LFDS is applied, whereby parasitic capacitance Cp3 can be prevented from being formed between the touch electrode TEs to which the touch driving signal TDS is applied and the other touch electrode TEo to which the load-free driving signal T_LFDS is applied.

As described above, the display section DS for a display mode and the touch section TS for a touch mode can be divided in time.

The touch driving signals TDS having the same frequency may be output in two or more unit touch sections UTS.

The two or more unit touch sections UTS may be present in a single touch section TS or may be divided from each other to be present in different touch sections TS.

That is, the two or more unit touch sections UTS may be included in a single touch section TS. Alternatively, each of the unit touch sections UTS may correspond to a single touch section TS.

For example, as illustrated in FIG. 10, the first unit touch section UTS1 and the second unit touch section UTS2 may be divided from each other to be present in different touch sections TS1 and TS2. That is, the first unit touch section UTS1 corresponds to the first touch section TS1, while the second unit touch section UTS2 corresponds to the second touch section TS2.

As illustrated in FIG. 14, the first unit touch section UTS1 and the second unit touch section UTS2 are commonly present in a single touch section.

As described above, the unit touch sections UTS in which the touch electrodes TE are driven using touch driving signals TDS having a single frequency are allocated by different methods. It is thereby possible to adjust the periods in which the frequencies of the touch driving signals TDS vary and the lengths of the sections (the unit touch sections UTS) in which the frequencies of the touch driving signals TDS remain the same. This can consequently provide efficient multifrequency driving considering the performance of frequency-varying components, the performance of touch sensing, or the like.

The multifrequency driving method based on frequency variation according to touch sections described above with reference to FIG. 10 to FIG. 13 is applicable to both the V-sensing method illustrated in FIG. 3 and the H-sensing method illustrated in FIG. 4.

The multifrequency driving method based on frequency variation in a touch section described above with reference to FIG. 14 to FIG. 17 is applicable to both the V-sensing method illustrated in FIG. 3 and the H-sensing method illustrated in FIG. 4.

Figure 18:
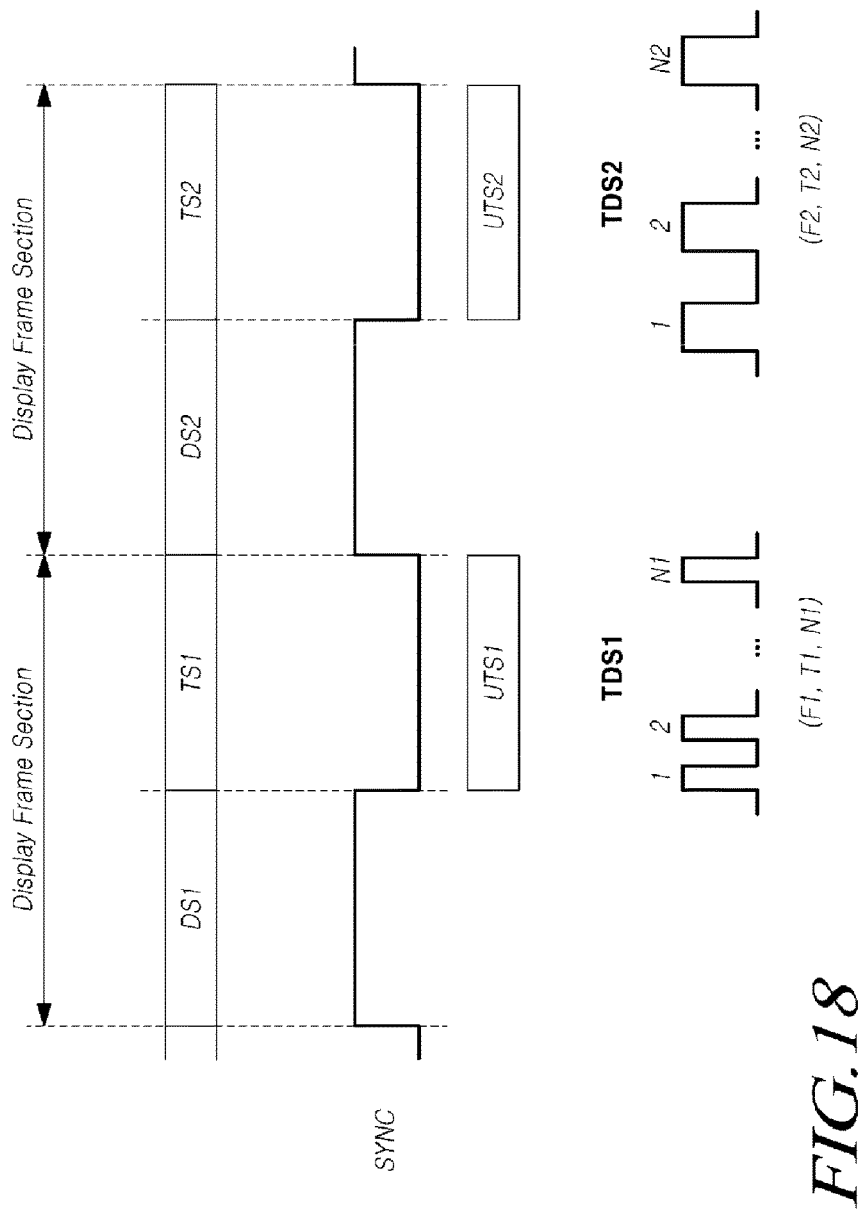
FIG. 18 and FIG. 19 are schematic views illustrating cases in which the touch display device according to exemplary embodiments performs multifrequency driving using a V-sensing method.
Figure 19:
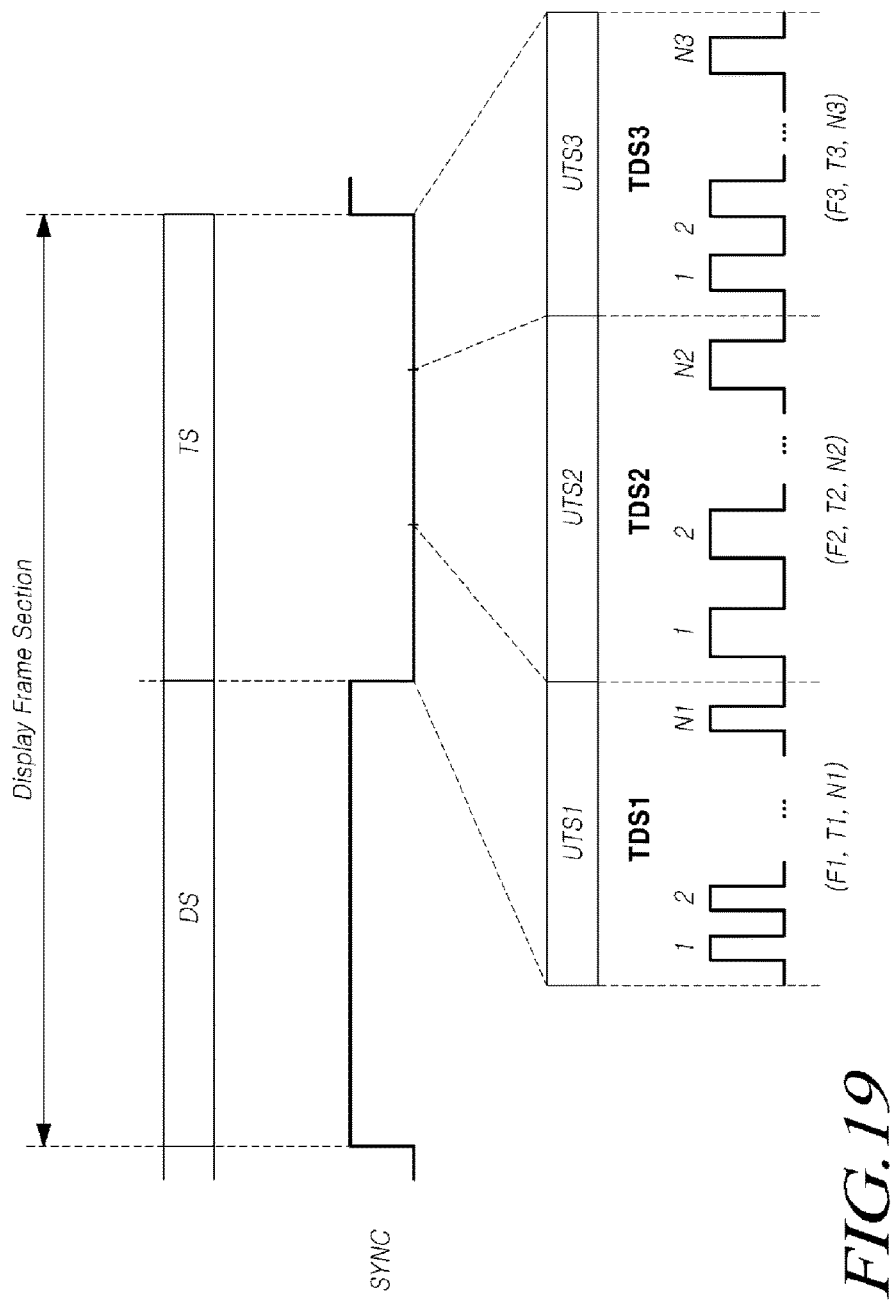

FIG. 18 is a schematic view illustrating a case in which the touch display device 100 according to exemplary embodiments performs multifrequency driving based on frequency variation according to touch sections (as illustrated in FIG. 10 to FIG. 13) using the V-sensing method, and FIG. 19 is a schematic view illustrating a case in which the touch display device 100 according to exemplary embodiments performs multifrequency driving based on frequency variation in a touch section (as illustrated in FIG. 14 to FIG. 17) using the V-sensing method.

Referring to FIG. 18 and FIG. 19, in the case in which touch driving and touch sensing are performed using the V-sensing method, a single display section DS and one or more touch sections TS may be present in a single display frame section.

The V-sensing method is also referred to as V-blank driving, since touch driving is performed in a section in which display driving is not performed.

As illustrated in FIG. 18, in the case in which a single touch section is present in a single display frame section, i.e. the touch sensing circuit 120 performs touch driving and sensing using the V-sensing method, when multifrequency driving is performed based on frequency variation according to touch sections, two or more unit touch sections UTS1 and UTS2 are divided from each other to be present in different touch sections TS1 and TS2.

As illustrated in FIG. 19, in the case in which a single touch section is present in a single display frame section, i.e., the touch sensing circuit 120 performs touch driving and sensing using the V-sensing method, when multifrequency driving is performed based on frequency variation in a touch section, two or more unit touch sections UTS1, UTS2, and UTS3 are present in a single touch section TS.

In other words, when the single touch section TS included in the single display frame section is divided into the three unit touch sections UTS1, UTS2, and UTS3, touch driving using a touch driving signal TDS1 having a first frequency F1 is performed in the first unit touch section UTS1, touch driving using a touch driving signal TDS2 having a second frequency F2 is performed in the second unit touch section UTS2, and touch driving using a touch driving signal TDS3 having a third frequency F3 is performed in the third unit touch section UTS3. Here, the three unit touch sections UTS1, UTS2, and UTS3 are present in the singe touch section TS.

According to multifrequency driving as described above, the touch display device 100 according to exemplary embodiments can have reduced EMI while performing touch driving and sensing using the V-sensing method in consideration of display performance and touch performance.

Figure 20:
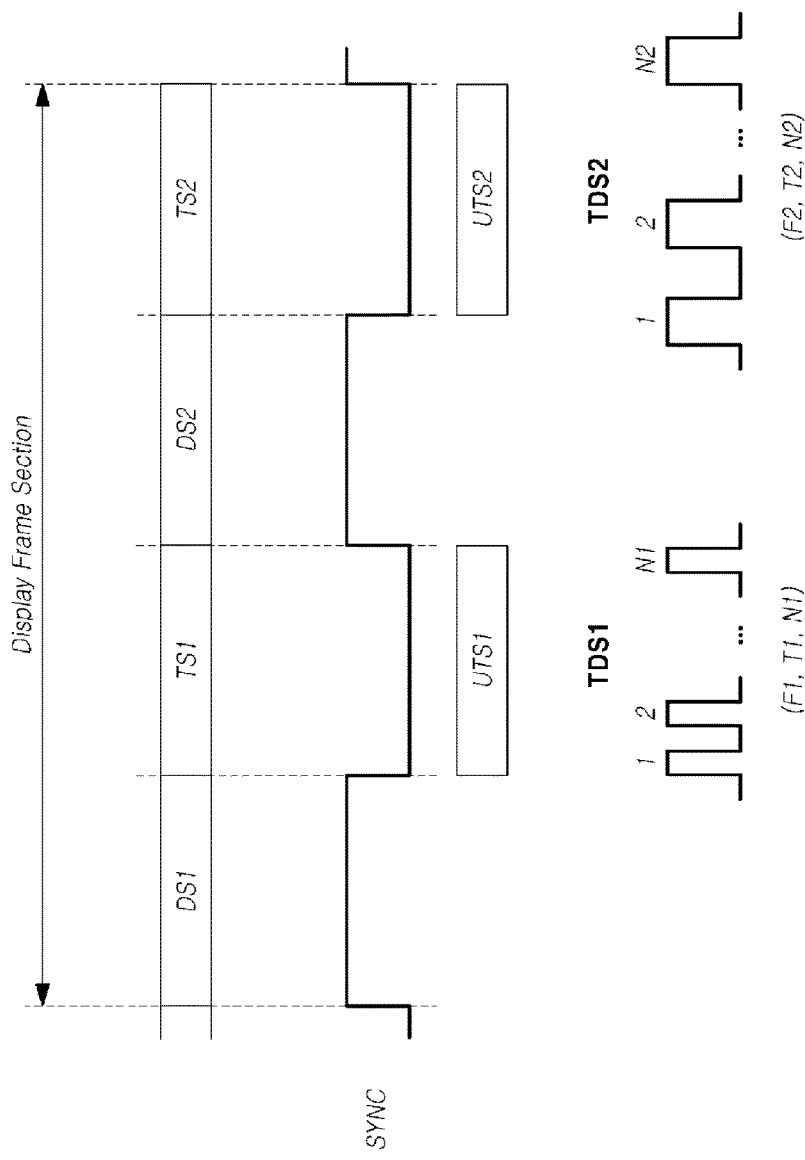
FIG. 20 and FIG. 21 are schematic views illustrating cases in which the touch display device according to exemplary embodiments performs multifrequency driving using an H-sensing method.
Figure 21:
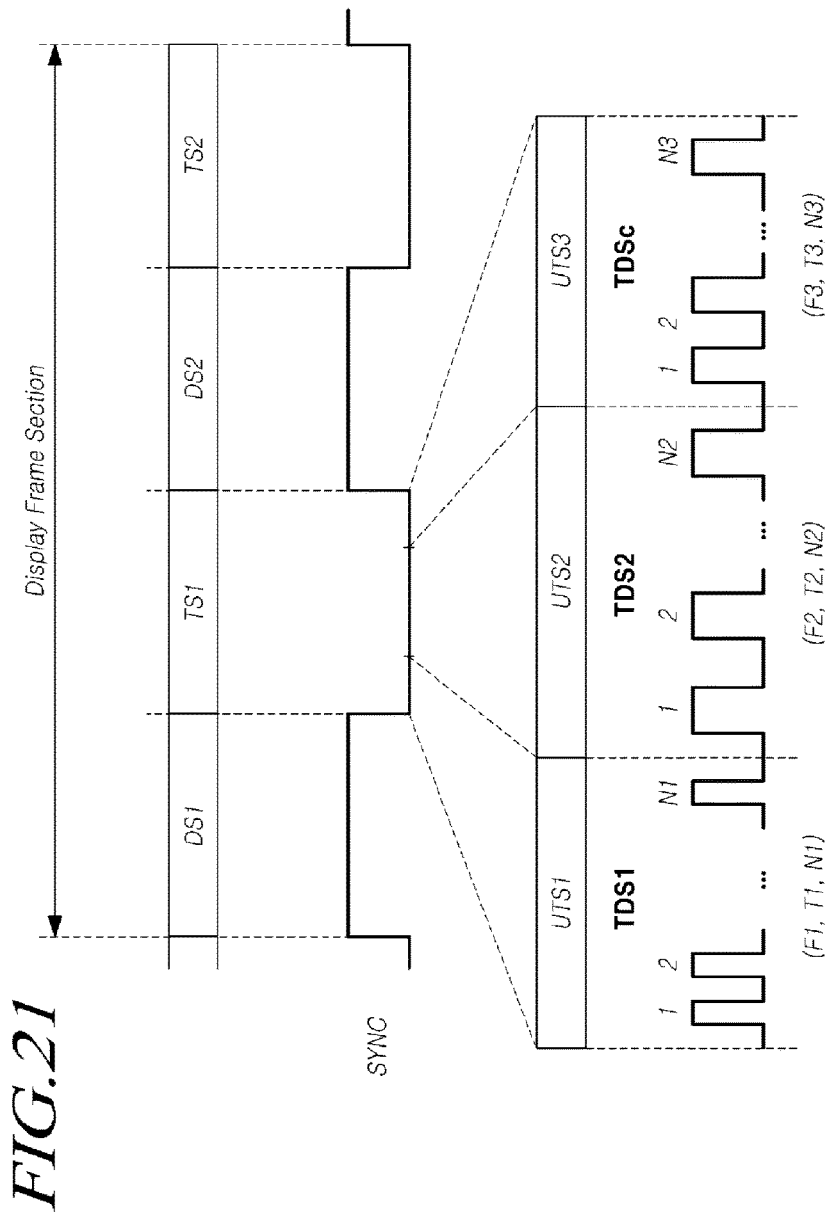

FIG. 20 and FIG. 21 are schematic views illustrating cases in which the touch display device 100 according to exemplary embodiments performs multifrequency driving using the H-sensing method.

Referring to FIG. 20, when the touch display device 100 according to exemplary embodiments performs touch driving and sensing using the H-sensing method, two or more display sections and two or more touch sections may be present in a single display frame section.

Here, when the frequencies of touch driving signals TDS vary according to touch sections TS, two or more unit touch sections UTS1 and UTS2 may be divided from each other to be present in two or more touch sections TS1 and TS2.

According to multifrequency driving as described above, the touch display device 100 according to exemplary embodiments can have reduced EMI influence while performing touch driving and sensing using the H-sensing method in consideration of display performance and touch performance.

Referring to FIG. 21, when the touch display device 100 according to exemplary embodiments performs touch driving and sensing using the H-sensing method, two or more display sections and two or more touch sections may be present in a single display frame section.

Here, when the frequencies of the touch driving signal TDS are varied in touch sections TS1, two or more unit touch sections UTS1, UTS2, and UTS3 may be present in each touch section TS1.

According to multifrequency driving as described above, the touch display device 100 according to exemplary embodiments can have further reduced EMI influence by further distributing the EMI influence while performing touch driving and sensing using the H-sensing method in consideration of display performance and touch performance.

Referring to FIG. 19 and FIG. 21, when the two or more unit touch sections UTS1, UTS2, and UTS3 are present in the single touch section, the total of lengths (T1+T2+T3) of the unit touch sections UTS1, UTS2, and UTS3 may be equal to or shorter than the length of the single touch section TS.

As described above, the touch display device 100 can efficiently provide multifrequency driving for reduced EMI while generally satisfying desired display and touch performance conditions.

The method of varying the frequency of the touch driving signal TDS for multifrequency driving may have the following examples.

It is possible to vary the frequency of the touch driving signal TDS by sequentially selecting available frequencies included in a predetermined available frequency list.

For higher frequency variability, the frequency of the touch driving signal TDS may be varied by selecting the available frequencies included in the predetermined available frequency list according to the predetermined sequence, in which the sequence of selection may be changed based on specific regulations.

For higher frequency variability, the frequency of the touch driving signal TDS may be varied by randomly selecting the available frequencies included in the predetermined available frequency list by frequency shuffling (i.e. random frequency selection). That is, the frequency of the touch driving signal TDS may be varied by shuffling of the available frequency list.

For more higher frequency variability, as another embodiment of the method of varying the frequency of the touch driving signal TDS, the frequency of the touch driving signal TDS may be varied by completely randomly determining the frequency without a predetermined available frequency list. That is, the frequency of the touch driving signal TDS may be randomly varied.

The range in which the frequency varies (i.e. the range from the minimum value to the maximum value) may be predetermined. A set of algorithm generating random information, such as a hash function, may be used.

According to the above-described plurality of frequency varying methods for improving frequency variability, it is possible to further reduce or remove EMI.

Embodiments of the touch driving signal TDS applied to the same touch electrode TE will be described as follows.

As an embodiment, a touch driving signal TDS having a first driving frequency may be applied to a first touch electrode TE or a first touch electrode group (including two or more touch electrodes) during a first unit touch section UTS1 of a first frame. During a first unit touch section UTS1 of a second frame, the touch driving signal TDS having the first driving frequency may be applied to the first touch electrode TE or the first touch electrode group. This driving method has the following advantages: Since a touch electrode or a touch electrode group formed in the same position is driven using a touch driving signal having the same characteristic (including the frequency) while being sensed, the touch driving signal is not varied depending on the position of the touch electrode. The influence of the touch driving signal can advantageously remain the same, whereby resultant touch raw data can be consistently maintained.

While the touch driving signal TDS having the first driving frequency is being applied to the first touch electrode TE or the first touch electrode group, a load-free driving signal T_LFDS having a first driving frequency may be applied to the other touch electrodes or the other touch electrode groups.

As another embodiment, a touch driving signal TDS having a first driving frequency may be applied to a first touch electrode TE or a first touch electrode group (including two or more touch electrodes) during a first unit touch section of a first frame. During a first unit touch section of a second frame, a touch driving signal TDS having a second driving frequency different from the first driving frequency may be applied to the first touch electrode or the first touch electrode group.

While the touch driving signal TDS having the first driving frequency is being applied to the first touch electrode TE or the first touch electrode group, a load-free driving signal T_LFDS having a first driving frequency may be applied to the other touch electrodes or the other touch electrode groups. In addition, while the touch driving signal TDS having the second driving frequency is being applied to the first touch electrode or the first touch electrode group, a load-free driving signal T_LFDS having a second driving frequency may be applied to the other touch electrodes or the other touch electrode groups. This driving method has the following advantages: Driving is performed using touch driving signals having different characteristics (including frequencies) over time while the touch electrode or the touch electrode group disposed in the same position is being sensed. It is thereby possible to minimize or remove the influence of mutual relations between the position of the touch electrode and the touch driving signal or the influence of specific noise resulting therefrom, thereby realizing the reliability of touch raw data that has been sensed.

Hereinafter, the method of sensing a touch by performing touch driving based on above-described multifrequency will be described again briefly.

Figure 22:
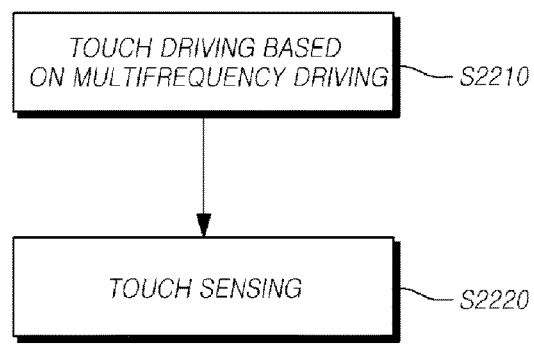
FIG. 22 is a flowchart illustrating a touch sensing method of the touch display device according to exemplary embodiment.

FIG. 22 is a flowchart illustrating a touch sensing method of the touch display device 100 according to exemplary embodiments.

The touch display device 100 according to exemplary embodiments includes the display panel 110 on which the number of data lines DL, the number of gate lines GL, and the number of subpixels SP, defined by the number of data lines DL and the number of gate lines GL, are disposed, and has two operation modes, i.e. a display mode in which images are displayed and a touch mode in which touch sensing is performed.

The touch sensing method of the touch display device 100 includes, in a single touch section or two or more touch sections in a single display frame section, touch driving step S2210 and touch sensing step S2220. The touch driving step S2210 is performed to output a pulse-type touch driving signal TDS to sequentially drive one or more touch electrodes TE among the number of touch electrodes TE disposed in the display panel 110. The touch sensing step S2220 is performed to sense a touch or a touched position by detecting changes in capacitance from the number of touch electrodes TE.

The touch driving steps S2210 may be a touch driving step based on multifrequency driving in which the output touch driving signal TDS has two or more frequencies.

That is, the frequency of the touch driving signal TDS output in the touch driving steps S2210 may vary.

According to the above-described touch sensing method, the frequency of the touch driving signal TDS output by the touch sensing circuit 120 is varied due to multifrequency driving. This can consequently distribute EMI, thereby reducing EMI influence due to the touch driving signal TDS.

Hereinafter, the touch sensing circuit 120 performing touch driving and sensing a touch based on above-described multifrequency will be described in more detail.

Figure 23:
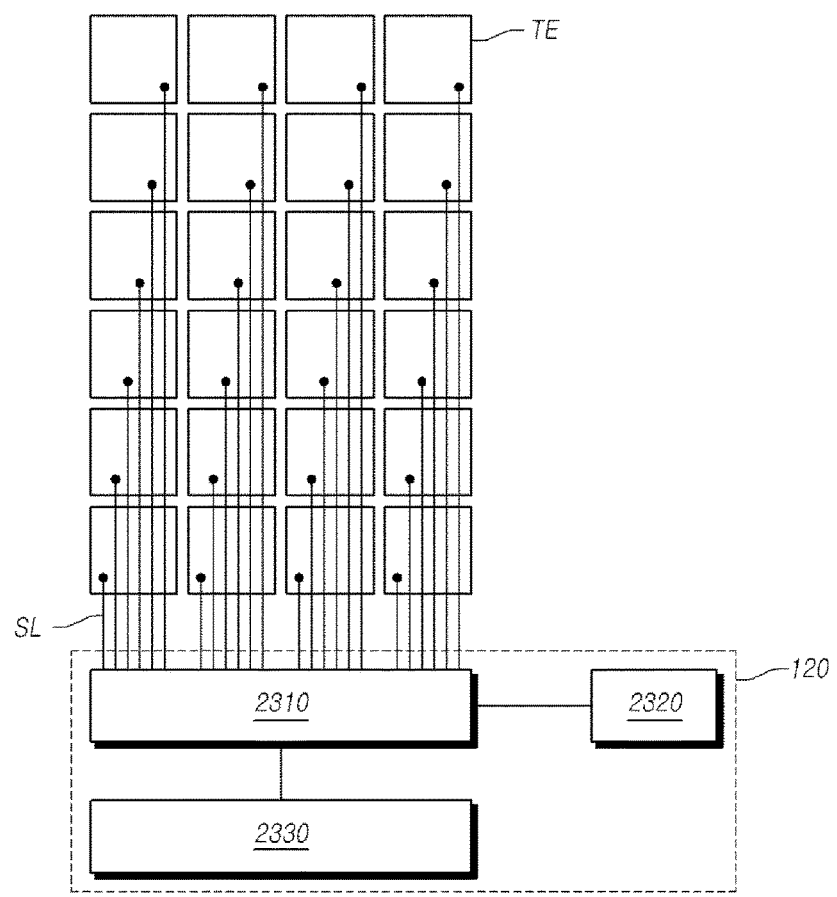
FIG. 23 and FIG. 24 are schematic views illustrating the touch sensing circuit of the touch display device according to exemplary embodiments.
Figure 24:
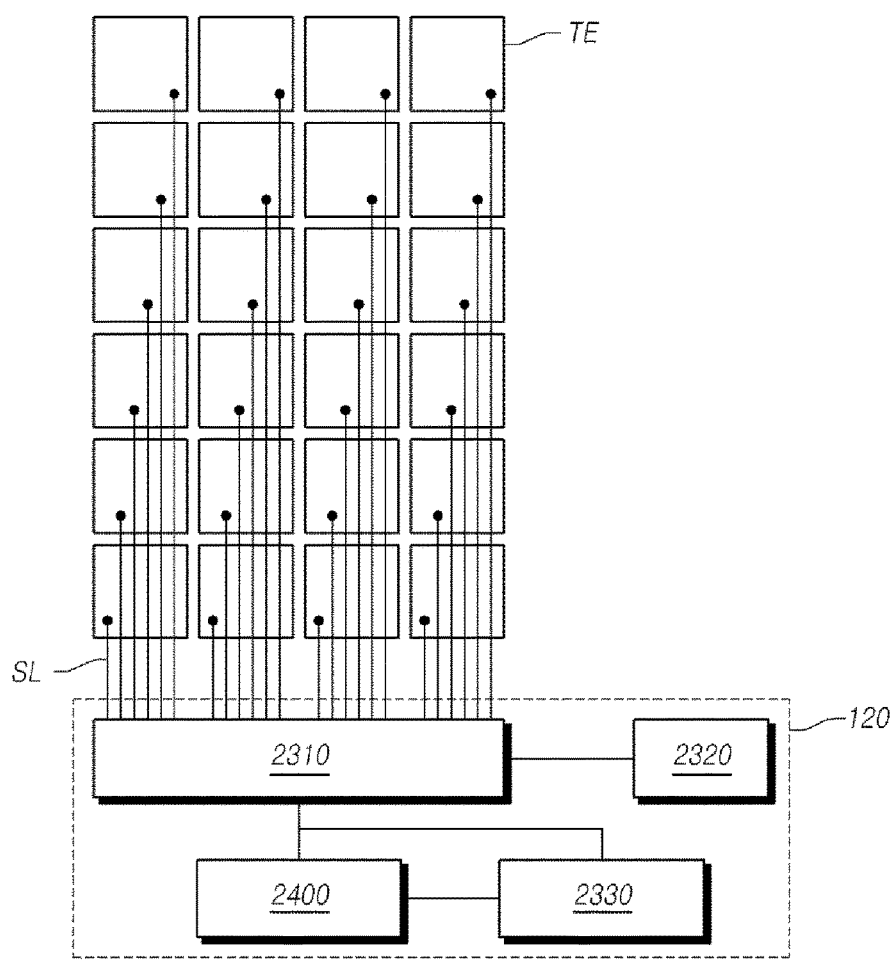

FIG. 23 and FIG. 24 are schematic views illustrating the touch sensing circuit 120 of the touch display device 100 according to exemplary embodiments.

Referring to FIG. 23 and FIG. 24, the touch display device 100 according to exemplary embodiments includes the display panel 110 on which the number of data lines DL, the number of gate lines GL, and the number of subpixels SP, defined by the number of data lines DL and the number of gate lines GL, are disposed, and has two operation modes, i.e. a display mode in which images are displayed and a touch mode in which touch sensing is performed.

Referring to FIG. 23 and FIG. 24, the touch sensing circuit 120 of the touch display device 100 includes a driver circuit 2310 and a sensing circuit 2320.

The driver circuit 2310 can output a pulse-type touch driving signal TDS to sequentially drive one or more touch electrodes among the number of touch electrodes TE disposed in the display panel 110.

The driver circuit 2310 can perform touch driving based on multifrequency driving.

Thus, the touch driving signal TDS output by the driver circuit 2310 may have two or more frequencies.

That is, the frequency of the touch driving signal TDS output by the driver circuit 2310 may vary.

The sensing circuit 2320 can sense a touch or a touched position by detecting changes in capacitance from the number of touch electrodes TE.

The touch sensing circuit 120 can vary the frequency of the touch driving signal TDS based on multifrequency driving. This can consequently distribute EMI, thereby reducing EMI influence due to the touch driving signal TDS.

Referring to FIG. 23, the touch sensing circuit 120 further includes a signal generating circuit 2330 to generate the touch driving signal TDS having two or more frequencies.

As described above, a single signal generating circuit 2330 can generate the touch driving signal TDS having two or more frequencies, so that multifrequency driving can be performed. Consequently, the number of signal-generating components can be reduced.

Referring to FIG. 24, the touch sensing circuit 120 further includes a signal generating circuit 2330 generating a touch driving signal TDS having one frequency among two or more frequencies and a signal converting circuit 2400 converting the touch driving signal TDS generated by the signal generating circuit 2330 into a touch driving signal TDS having a different frequency.

The signal converting circuit 2400 may be a frequency converter.

As described above, the signal generating circuit 2330 generates the touch driving signal TDS having one frequency (a base frequency), and the signal converting circuit 2400 generates the touch driving signal TDS having a different frequency, so that multifrequency driving can be performed. Although this configuration may increase the number of signal generating components, the addition of the signal converting circuit 2400 advantageously allows the existing signal generating circuit 2330 to be used.

The signal generating circuit 2330, the driver circuit 2310, and the sensing circuit 2320 may be embodied as separate integrated circuits (ICs) or separate parts.

In this case, the signal generating circuit 2330 may be implemented as power IC.

The driver circuit 2310 may be implemented as a read-out IC, including a multiplexer, an integrator, and an analog-to-digital converter. The driver circuit 2310 can output a common voltage to the touch electrodes TE in the display section while outputting a touch driving signal TDS to the touch electrodes TE in the touch section.

In addition, the driver circuit 2310 may be implemented as a combined IC including both a functional part of a read-out IC and a data driver (not shown) driving the data lines DL.

Furthermore, the sensing circuit 2320 may be implemented as a micro control unit (MCU).

In addition, two or more of the signal generating circuit 2330, the driver circuit 2310, and the sensing circuit 2320 may be included in a single IC.

For example, the signal generating circuit 2330 and the driver circuit 2310 may be included in a single IC or a single part.

In another example, all of the signal generating circuit 2330, the driver circuit 2310, and the sensing circuit 2320 may be included in a single IC or a single part.

Since the touch sensing circuit 120 is implemented as a various number of ICs or parts as described above, it is possible to provide the touch sensing circuit 120 suitable to medium and large display devices, small display devices, mobile devices, and so on.

Figure 25:
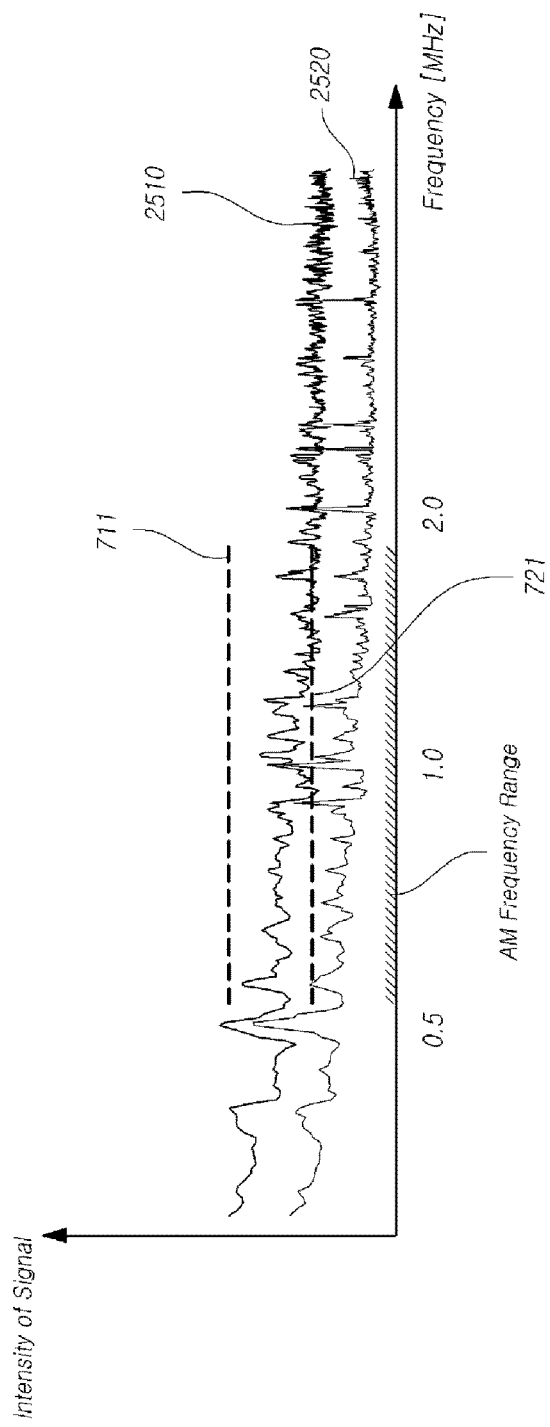
FIG. 25 is a graph illustrating reduced EMI in the touch display device according to exemplary embodiments.

FIG. 25 is a graph illustrating reduced EMI in the touch display device 100 according to exemplary embodiments.

Referring to FIG. 25, it can be appreciated that EMI that would otherwise occur in an AM frequency range (e.g. about 500 kHz to about 1,605 kHz) when the touch display device 100 drove touch electrodes TE using a touch driving signal TDS having a single frequency of 100 kHz was removed by multifrequency driving.

FIG. 25 is a graph illustrating upper limits 2510 and averages 2520 of the intensity of EMI signals measured according to frequencies.

According to the result of measurements, it can be appreciated that the points (i.e. the points 712 in FIG. 7 corresponding to EMI) higher than the reference upper limit 711, i.e. the upper limit satisfying EMI conditions in the AM frequency range, were removed from the upper limits 2510 of measured EMI signals.

In addition, according to the result of measurements, it can be appreciated that the points (i.e. the points 722 in FIG. 7 corresponding to EMI) higher than the reference average 721, i.e. the average satisfying EMI conditions in the AM frequency range, were removed from the averages 2520 of measured EMI signals.

That is, according to the result of measurements, the upper limits 2510 and the averages 2520 of measured EMI signals can satisfy EMI conditions in the AM frequency range.

As described above, the touch sensing method, the touch sensing circuit 120, and the touch display device 100 according to exemplary embodiments can have reduced EMI.

This can consequently prevent the degradation of system reliability, display performance, and touch sensing performance due to EMI.

Hereinafter, more specific embodiments of above-described multifrequency driving based on an H-sensing method will be described with reference to FIG. 26 to FIG. 46.

Prior to description, the above-mentioned driving environment will be discussed briefly.

When the display section for a display mode and the touch section for a touch mode are divided in time, i.e. when time division driving is performed, two or more unit touch sections using touch driving signals TDS having different frequencies may be included in a single touch section or may correspond to a single touch section.

In time division driving, a single display section and a single touch section may be present in a single display frame section, or two or more display sections and two or more touch sections may be present in a single display frame section.

When a single display section and a single touch section are present, the display panel 110 is referred to as being driven using the V-sensing method. When two or more display sections and two or more touch sections are present, the display panel 110 is referred to as being driven using the H-sensing method.

In driving using the V-sensing method, two or more unit touch sections using touch driving signals TDS having different frequencies may be included in a single touch section.

In driving using the H-sensing method, two or more unit touch sections using touch driving signals TDS having different frequencies may be included in a single touch section.

In driving using the H-sensing method, two or more unit touch sections using touch driving signals TDS having different frequencies may correspond to single touch sections, respectively. That is, the single unit touch section may be referred to as being identical to the single touch section.

Figure 26:
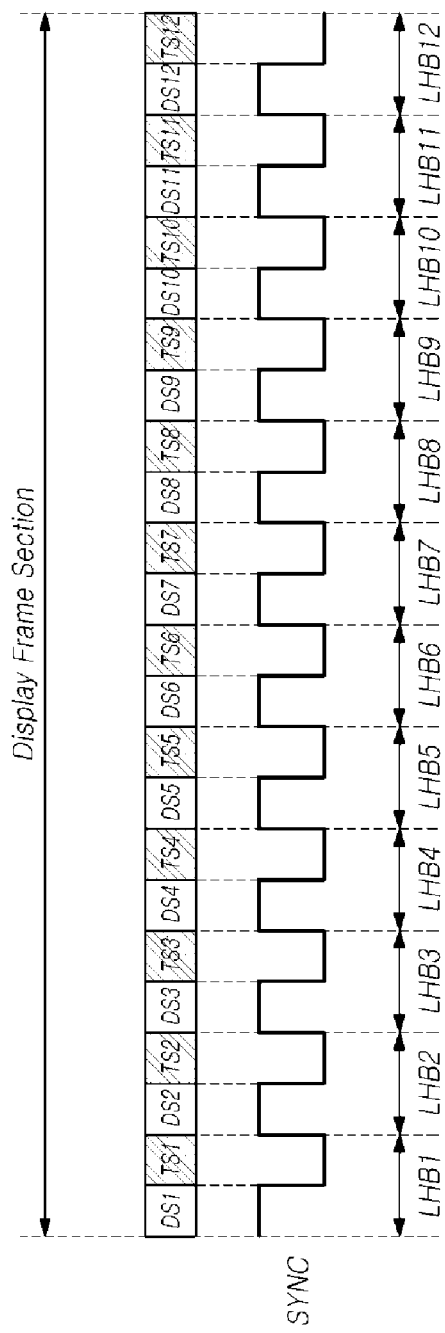
FIG. 26 is a schematic view illustrating an example in which the touch display device according to exemplary embodiments operates using an H-sensing method.

FIG. 26 is a schematic view illustrating an example in which the touch display device 100 according to exemplary embodiments operates using the H-sensing method.

FIG. 26 illustrates the waveform of a synchronization signal SYNC defining a display section and a touch section in a single display frame section.

Referring to FIG. 26, when the touch display device 100 according to exemplary embodiments operates using the H-sensing method, display driving and touch driving can be performed alternately in the single display frame section.

In the H-sensing operation illustrated in FIG. 26, the single display frame section includes twelve display sections DS1, DS2, . . . , and DS12 and twelve touch sections TS1, TS2, . . . , and TS12.

That is, the single display frame section sequentially includes a display section DS1, a touch section TS1, a display section DS2, a touch section TS2, . . . , a display section DS12, and a touch section TS12.

Referring to FIG. 26, after the elapse of the entirety of the twelve display sections DS1, DS2, . . . , and DS12 in the single display frame section, an image is displayed on the entire area of the screen.

Referring to FIG. 26, after the elapse of the entirety of the twelve touch sections TS1, TS2, . . . , and TS12 in the single display frame section, a touch sensing result for the entire area of the screen can be obtained at least one time.

That is, the single display frame section may be interpreted as including one or more touch frame sections.

In the example illustrated in FIG. 26, the display sections alternate with the touch sections. A section including a single display section and a single touch section is referred to as an LHB section.

That is, DS1 and TS1 are collectively referred to as section LHB1, DS2 and TS2 are collectively referred to as section LHB2, and DS3 and TS3 are collectively referred to as section LHB3.

In this manner, when the touch display device 100 according to exemplary embodiments operates in an alternating manner through the twelve display sections DS1, DS2, . . . , and DS12 and the twelve touch sections TS1, TS2, . . . , and TS12 in the single frame section, the single display frame section includes twelve LHB sections LHB1, LHB2, . . . , and LHB12. This type of driving is also referred to as 12-LHB driving.

When the touch display device 100 according to exemplary embodiments performs multifrequency driving using the H-sensing method, the multifrequency driving method in which touch sensing driving (touch driving) using touch driving signals TDS having several frequencies is performed may be applied in a single touch section or a single display frame section.

Figure 27:
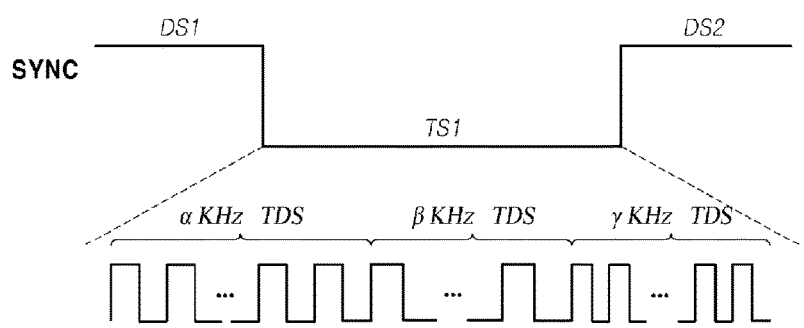
FIG. 27 is a schematic view illustrating an example in which multifrequency driving is applied in a single touch section when the touch display device according to exemplary embodiments performs multifrequency driving using an H-sensing method.
Figure 28:
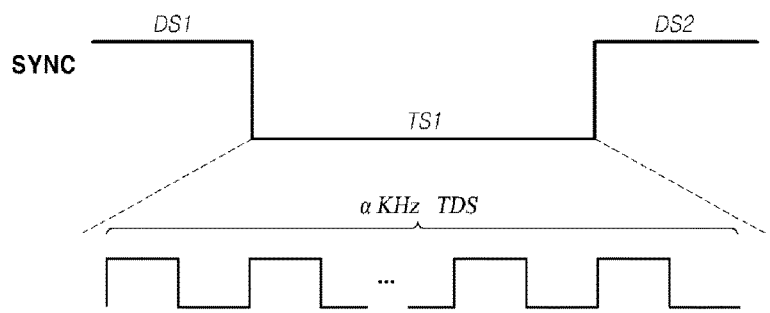
FIG. 28 is a schematic view illustrating an example in which a single-frequency driving is applied in a single touch section and multifrequency driving is applied in a single display frame section when the touch display device according to exemplary embodiments performs multifrequency driving using an H-sensing method.

FIG. 27 is a schematic view illustrating an example in which multifrequency driving is applied in a single touch section when the touch display device 100 according to exemplary embodiments performs multifrequency driving using the H-sensing method, and FIG. 28 is a schematic view illustrating an example in which a single-frequency driving is applied in a single touch section and multifrequency driving is applied in a single display frame section.

Referring to the example illustrated in FIG. 27, in multifrequency driving performed by the touch display device 100 according to exemplary embodiments using the H-sensing method, when multifrequency driving is applied in a single touch section TS1 performed between a display section DS1 and a display section DS2, a touch driving signal TDS used in the single touch section TS1 has three frequencies α kHz, β kHz, and γ kHz.

In multifrequency driving performed by the touch display device 100 according to exemplary embodiments using the H-sensing method, when multifrequency driving is applied in the single touch section TS1, the single touch section TS1 has three unit touch sections UTS. Here, the three unit touch sections UTS include a unit touch section in which the touch sensing circuit 120 outputs a touch driving signal TDS having a frequency of α kHz, a unit touch section in which the touch sensing circuit 120 outputs a touch driving signal TDS having a frequency of β kHz, and a unit touch section in which the touch sensing circuit 120 outputs a touch driving signal TDS having a frequency of γ kHz.

Although FIG. 27 illustrates a case in which the touch driving signal TDS used in the single touch section TS1 has three frequencies α kHz, β kHz, and γ kHz, the touch driving signal TDS used in the single touch section TS1 may have two frequencies or four or more frequencies.

As described above with reference to FIG. 27, in multifrequency driving applied in the single touch section, when two or more display sections DS1, DS2, and so on and two or more touch sections TS1, TS2, and so on are present in the single display frame section, the number of frequencies of the touch driving signal TDS output in the single display frame section may be equal to or less than the number of touch sections in the single display frame section or may exceed the number of touch sections in the single display frame section.

When the number of frequencies of the touch driving signal TDS is increased as described above, the EMI influence can be more significantly reduced, although touch driving may be complicated.

Referring to the example in FIG. 28, single-frequency driving using a touch driving signal TDS having a single frequency is applied in a single touch section. At the same time, multifrequency driving in which touch driving signals TDS having two or more frequencies are used in touch sections of a single display frame can be applied.

In this case, multifrequency driving is applied in a single display frame section.

Referring to the example in FIG. 28, a touch driving signal TDS in a single touch section TS1 performed between a display section DS1 and a display section DS2 has a single frequency of α kHz. That is, single-frequency driving is performed in the single touch section TS1.

However, in the other touch sections (i.e. one or more touch sections among the remaining touch sections TS2, TS3, . . . , and TS12), driving can be performed using a touch driving signal TDS, the frequency of which differs from the frequency α kHz of the touch driving signal TDS used in the touch section TS1.

As described above with reference to FIG. 28, in each touch section, driving (single-frequency driving) is performed using the touch driving signal TDS having a single frequency. In addition, driving (multifrequency driving) is performed using the touch driving signal TDS having two or more frequencies in the single display frame section including a number of touch sections TS1, TS2, and so on, i.e., multifrequency driving is applied in the single display frame section. In this case, the number of frequencies (i.e. the number of frequency types) of the touch driving signal TDS used in the single display frame may be equal to or smaller than the number of the touch sections.

That is, when two or more display sections DS1, DS2, and so on and two or more touch sections TS1, TS2, and so on are present in the single display frame section, the number of frequencies of the touch driving signal TDS output by the touch sensing circuit 120 in the single display frame section may be equal to or smaller than the number of the touch sections in the single display frame section.

This can advantageously reduce EMI influence while allowing touch driving to be efficiently performed.

Figure 29:
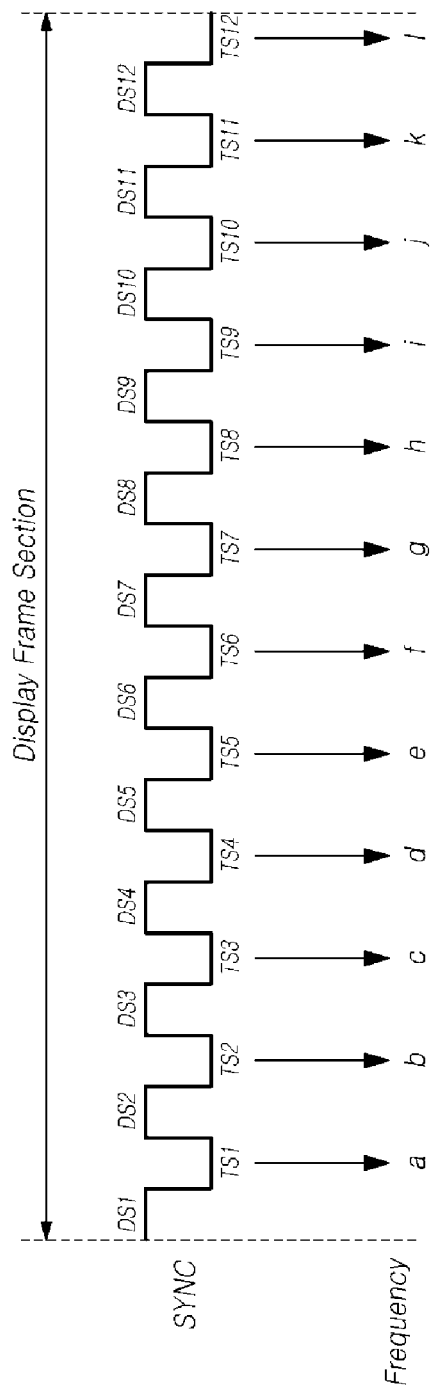
FIG. 29 is a schematic view illustrating an exemplary frequency pattern of a touch driving signal used in a single display frame section when the touch display device according to exemplary embodiments operates using an H-sensing method and performs multifrequency driving in the single display frame section.
Figure 30:
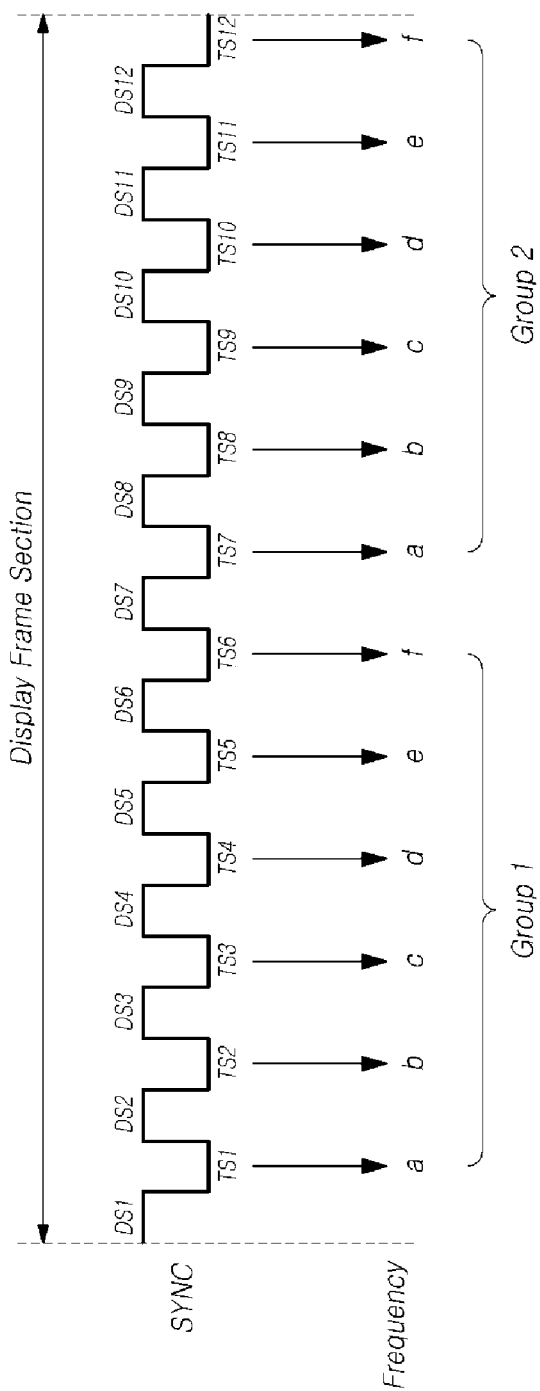
FIG. 30 is a schematic view illustrating another exemplary frequency pattern of a touch driving signal used in a single display frame section when the touch display device according to exemplary embodiments operates using an H-sensing method and performs multifrequency driving in the single display frame section.
Figure 31:
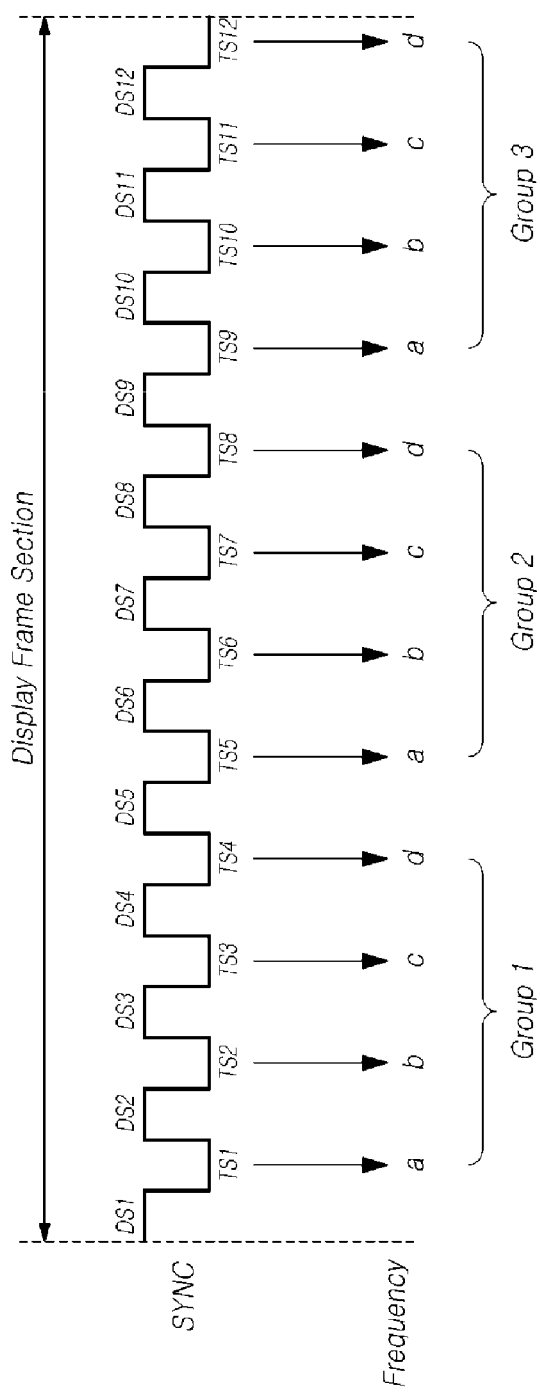
FIG. 31 is a schematic view illustrating further another exemplary frequency pattern of a touch driving signal used in a single display frame section when the touch display device according to exemplary embodiments operates using an H-sensing method and performs multifrequency driving in the single display frame section.

FIG. 29 to FIG. 31 are schematic views illustrating three exemplary frequency patterns of a touch driving signal TDS used in a single display frame section when the touch display device 100 according to exemplary embodiments operates using the H-sensing method and performs multifrequency driving in the single display frame section.

As illustrated in FIG. 29, in the case in which 12-LHB driving is performed by alternating twelve display sections DS1, DS2, . . . , and DS12 and twelve touch sections TS1, TS2, . . . , TS12 of a single display frame section and multifrequency driving is applied in the display frame section, touch driving signals TDS used in the twelve touch sections TS1, TS2, . . . , TS12 have a pattern of frequencies varying in a period corresponding to the display frame section or 1/M of the display frame section (where M is a natural number equal to or greater than 2).

That is, as illustrated in FIG. 29, the period in which the frequencies of the touch driving signals TDS vary (i.e. a period represented by the regularity of frequency changes) is the single display frame section.

Referring to the example illustrated in FIG. 29, in a single display frame section, the frequencies of the touch driving signal TDS used in the twelve touch sections TS1, TS2, . . . , and TS12 are a, b, c, d, e, f, g, h, i, j, k, and l.

In a second single display frame section, the frequencies of the touch driving signal TDS used in the twelve touch sections TS1, TS2, . . . , and TS12 are a, b, c, d, e, f, g, h, i, j, k, and l.

In a third single display frame section, the frequencies of the touch driving signal TDS used in the twelve touch sections TS1, TS2, . . . , and TS12 are a, b, c, d, e, f, g, h, i, j, k, and l.

Referring to FIG. 29, the frequencies a, b, c, d, e, f, g, h, i, j, k, l of the touch driving signal TDS may be different from each other. In this case, the number of types of frequencies used in the twelve touch sections TS1, TS2, . . . , and TS12 of the single display frame section is 12.

Alternatively, some of the frequencies a, b, c, d, e, f, g, h, i, j, k, l of the touch driving signal TDS may not be different from each other. In this case, the number of types of frequencies used in the twelve touch sections TS1, TS2, . . . , and TS12 of the single display frame section is smaller than 12.

As illustrated in FIG. 30 and FIG. 31, the period of the frequency pattern of the touch driving signal TDS corresponds to 1/M of a single display frame section (where M is a natural number equal to or greater than 2).

Referring to FIG. 30, the period of the frequency pattern of the touch driving signal TDS is ½ (M=2) of the single display frame section.

That is, in the twelve touch sections TS1, TS2, . . . , and TS12 of the single display frame section, the frequencies a, b, c, d, e, and f of the touch driving signal TDS are repeated regularly for every sixth touch section corresponding to ½ of the display section.

In the twelve touch sections TS1, TS2, . . . , and TS12 included in the single display frame section, the frequencies of the touch driving signal TDS used in the first six touch sections TS1, . . . , and TS6 are a, b, c, d, e, and f, and the frequencies of the touch driving signal TDS used in the second six touch sections TS7, . . . , and TS12 are a, b, c, d, e, and f.

Referring to FIG. 30, among the twelve touch sections TS1, TS2, . . . , and TS12 included in the single display frame section, the first six touch sections TS1, . . . , and TS6 are referred to as belonging to group 1, and the second six touch sections TS7, . . . , and TS12 are referred to as belonging to group 2. Here, the same frequencies are used repeatedly in group 1 and group 2.

Referring to FIG. 31, the period of the frequency pattern of the touch driving signal TDS is ⅓ (M=3) of the single display frame section.

That is, in the twelve touch sections TS1, TS2, . . . , and TS12 of the single display frame section, the frequencies a, b, c, and d of the touch driving signal TDS are repeated regularly for every fourth touch section corresponding to ⅓ of the display section.

In the twelve touch sections TS1, TS2, . . . , and TS12 included in the single display frame section, the frequencies of the touch driving signal TDS used in the first four touch sections TS1, . . . , and TS4 are a, b, c, and d, the frequencies of the touch driving signal TDS used in the second four touch sections TS5, . . . , and TS8 are a, b, c, and d, and the frequencies of the touch driving signal TDS used in the third four touch sections TS9, . . . , and TS12 are a, b, c, and d.

Referring to FIG. 31, among the twelve touch sections TS1, TS2, . . . , and TS12 included in the single display frame section, the first four touch sections TS1, . . . , and TS4 are referred to as belonging to group 1, the second four touch sections TS5, . . . , and TS8 are referred to as belonging to group 2, and the third four touch sections TS9, . . . , and TS12 are referred to as belonging to group 3. Here, the same frequencies are used repeatedly in group 1 to group 3.

Figure 32:
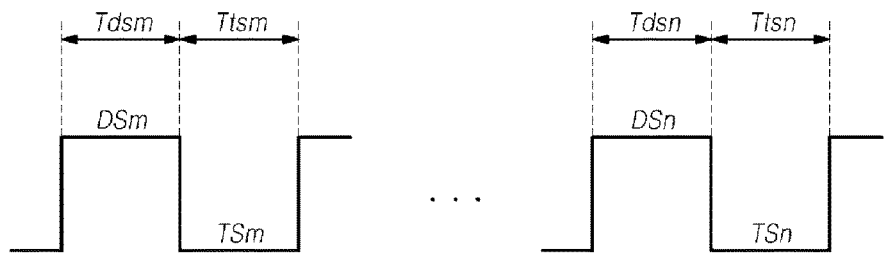
FIG. 32 is a schematic view illustrating the allocation of display sections and touch sections when the touch display device according to exemplary embodiments operates using an H-sensing method and multifrequency driving is applied in a single display frame section.
Figure 33:
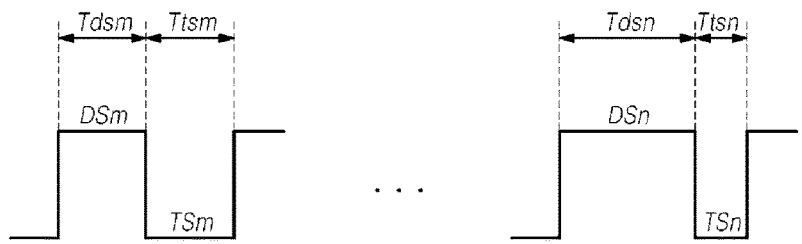
FIG. 33 is a schematic view illustrating another example of the allocation of display sections and touch sections when the touch display device according to exemplary embodiments operates using an H-sensing method and multifrequency driving is applied in a single display frame section.

FIG. 32 and FIG. 33 are schematic views illustrating the allocation of display sections and touch sections when the touch display device 100 according to exemplary embodiments operates using the H-sensing method and multifrequency driving is applied in a single display frame section.

FIG. 32 and FIG. 33 illustrate an mth LHB section LHBm (where m is a natural number equal to or greater than 1) and an nth LHB section LHBn (where n is a natural number greater than m) among a number of LHB sections (e.g. LHB1, LHB2, . . . , and LHB12 illustrated in FIG. 26) included in a single display frame section.

Referring to FIG. 32 and FIG. 33, the mth LHB section LHBm includes an mth display section DSm and an mth touch section TSm, while the nth LHB section LHBn includes an nth display section DSn and an nth touch section TSn.

Referring to FIG. 32 and FIG. 33, two or more display sections DSm and DSn of the single display frame section include the mth display section DSm and the nth display section DSn, while two or more touch sections TSm and TSn of the single display frame section include the mth touch section TSm and the nth touch section TSn.

The mth touch section TSm follows the mth display section DSm, and the nth touch section TSn follows the nth display section DSn.

Referring to FIG. 32, the lengths Tdsm and Tdsn of the two or more display sections DSm and DSn are the same. In addition, the lengths Ttsm and Ttsn of the two or more touch sections TSm and TSn are the same.

That is, the length Tdsm of the mth display section DSm is equal to the length Tdsn of the nth display section DSn, while the length Ttsm of the mth touch section TSm is equal to the length Ttsn of the nth touch section TSn.

Referring to FIG. 32, the lengths of the LHB sections are the same. That is, the total of the length Tdsm of the mth display section DSm and the length Ttsm of the mth touch section TSm is equal to the total of the length Tdsn of the nth display section DSn and the length Ttsn of the nth touch section TSn (Tdsm+Ttsm=Tdsn+Ttsn).

Referring to FIG. 33, the lengths Tdsm and Tdsn of the two or more display sections DSm and DSn are different from each other. In addition, the lengths Ttsm and Ttsn of the two or more touch sections TSm and TSn are different from each other.

That is, the length Tdsm of the mth display section DSm is different from the length Tdsn of the nth display section DSn, while the length Ttsm of the mth touch section TSm is different from the length Ttsn of the nth touch section TSn.

Referring to FIG. 33, even in the case in which the lengths Tdsm and Tdsn of the two or more display sections DSm and DSn are different from each other and the lengths Ttsm and Ttsn of the two or more touch sections TSm and TSn are different from each other, the lengths of the LHB sections are the same.

That is, the total of the length Tdsm of the mth display section DSm and the length Ttsm of the mth touch section TSm is equal to the total of the length Tdsn of the nth display section DSn and the length Ttsn of the nth touch section TSn (Tdsm+Ttsm=Tdsn+Ttsn).

The characteristics of the allocation and lengths of the sections as described above are summarized as follows.

As illustrated in FIG. 32, when the two or more display sections DSm and DSn and the two or more touch sections TSm and TSn are present in the single display frame section, the lengths Tdsm and Tdsn of the two or more display sections DSm and DSn are the same.

As illustrated in FIG. 33, when the two or more display sections DSm and DSn and the two or more touch sections TSm and TSn are present in the single display frame section, the length Tdsm of at least one display section DSm of the two or more display sections DSm and DSn differs from the length Tdsn of the other display section DSn.

As illustrated in FIG. 32, when the two or more display sections DSm and DSn and the two or more touch sections TSm and TSn are present in the single display frame section, the lengths Ttsm and Ttsn of the two or more touch sections TSm and TSn are the same.

As illustrated in FIG. 33, when the two or more display sections DSm and DSn and the two or more touch sections TSm and TSn are present in the single display frame section, the length Ttsm of at least one touch section TSm of the two or more touch sections TSm and TSn differs from the length Ttsn of the other touch section TSn.

Figure 34:
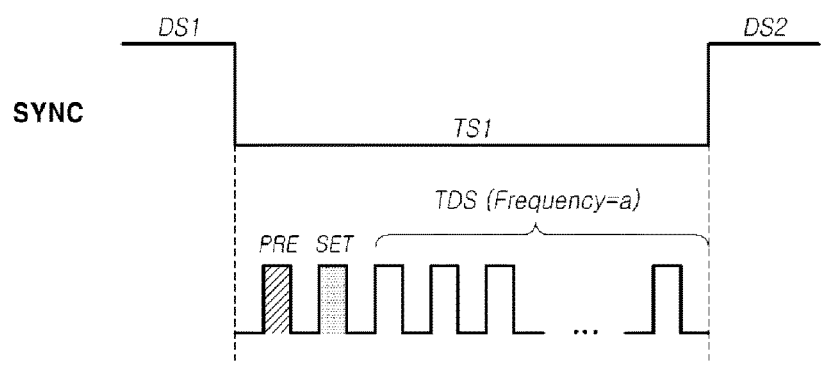
FIG. 34 is a schematic view illustrating a signal waveform applied to touch electrodes in a touch section TS1 in which single-frequency driving is performed when the touch display device according to exemplary embodiments operates using an H-sensing method and multifrequency driving is applied in a single display frame section.
Figure 35:
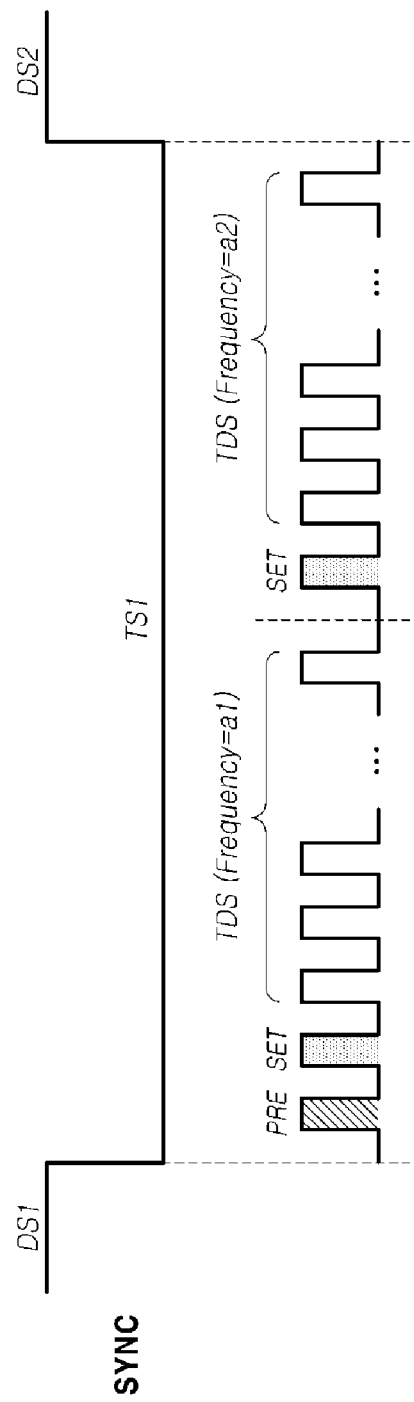
FIG. 35 is a schematic view illustrating a signal waveform applied to touch electrodes in a touch section in which multifrequency driving is performed when the touch display device according to exemplary embodiments operates using an H-sensing method and multifrequency driving is applied in the single touch section.

FIG. 34 is a schematic view illustrating a signal waveform applied to a touch electrode TE in a touch section TS1 in which single-frequency driving is performed when the touch display device 100 according to exemplary embodiments operates using the H-sensing method and multifrequency driving is applied in a single display frame section, and FIG. 35 is a schematic view illustrating a signal waveform applied to a touch electrode TE in a touch section TS1 in which multifrequency driving is performed when the touch display device 100 according to exemplary embodiments operates using the H-sensing method and multifrequency driving is applied in the single touch section TS1.

Referring to FIG. 34, when single-frequency driving is performed in the single touch section TS1 and multifrequency driving is applied in the single display frame section, the touch driving signal TDS having a predetermined frequency a is applied to at least one touch electrode TE.

In the touch section TS1, at least one pre-dummy pulse PRE and at least one setting pulse SET are applied before the touch driving signal TDS is applied.

A common voltage corresponding to a DV voltage is applied to the touch electrode TE in the display section DS1, while the pulse-type touch driving signal TDS is applied to the touch electrode TE in the touch section TS1. Here, the high-level voltage of the pulse-type touch driving signal TDS is higher than the common voltage.

Thus, at a start point of the touch section TS1 following the display section DS1, the touch electrode TE may fail to rapidly come into a voltage state corresponding to the touch driving signal TDS, due to the common voltage that has been applied in the display section DS1.

Then, an accurate sensing value may not be obtained in the touch section TS1, due to the influence of the previous display section DS1.

In other to overcome this problem, i.e. to make touch sensing reliable, the at least one pre-dummy pulse PRE may be applied in the touch section TS1 before the touch driving signal TDS is applied.

The at least one pre-dummy pulse PRE may be applied to at least one touch electrode TE at a start point of the touch section TS1 or directly before the touch section TS1.

In addition, before the touch driving signal TDS is applied in the touch section TS1, the at least one setting pulse SET is applied to at least one touch electrode TE.

Here, the at least one setting pulse SET may act to indicate the frequency of the subsequent touch driving signal TDS.

Thus, the at least one setting pulse SET and the pulses of the touch driving signal TDS have the same frequency.

The frequency of the at least one pre-dummy pulse PRE may be identical to or different from the frequency of the at least one setting pulse SET and the pulses of the touch driving signal TDS.

Referring to FIG. 35, when multifrequency driving is applied in the single touch section TS1, the touch driving signal TDS having two frequencies a1 and a2 is applied to at least one touch electrode TE in the single touch section TS1 in which multifrequency driving is performed.

That is, in the single touch section TS1, the touch driving signal TDS having the frequency a1 is applied to the at least one touch electrode TE and then the touch driving signal TDS having the frequency a2 is applied to the at least one touch electrode TE.

After the display section DS1, in the touch section TS1, at least one pre-dummy pulse PRE is applied to the at least one touch electrode TE before the application of the touch driving signal TDS having the frequency a1, such that the touch section TS1 is not influenced by the previous display section DS1.

The at least one pre-dummy pulse PRE may be applied to the at least one touch electrode TE at a start point of the touch section TS1 or directly before the touch section TS1.

In addition, in the touch section TS1, before the touch driving signal TDS having the frequency a1 is applied, the at least one setting pulse SET is applied to at least one touch electrode TE.

Here, the at least one setting pulse SET may act to indicate the frequency of the subsequent touch driving signal TDS.

In the touch section TS1, after the application of the touch driving signal TDS having the frequency a1, the at least one setting pulse SET is applied to the at least one touch electrode TE before the touch driving signal TDS having the frequency a2 is applied to the at least one touch electrode TE.

The at least one setting pulse SET applied to the at least one touch electrode TE before the touch driving signal TDS having the frequency a2 may act to indicate the frequency of the subsequent touch driving signal TDS.

Referring to FIG. 35, the frequency a1 and the frequency a2 may be identical to or different from each other.

Even in the case in which the frequencies a1 and a2 are identical to each other, the touch driving signal TDS having the frequency a1 and the touch driving signal TDS having the frequency a2 are distinguishable from each other due to the setting pulse SET present therebetween.

Figure 36A:
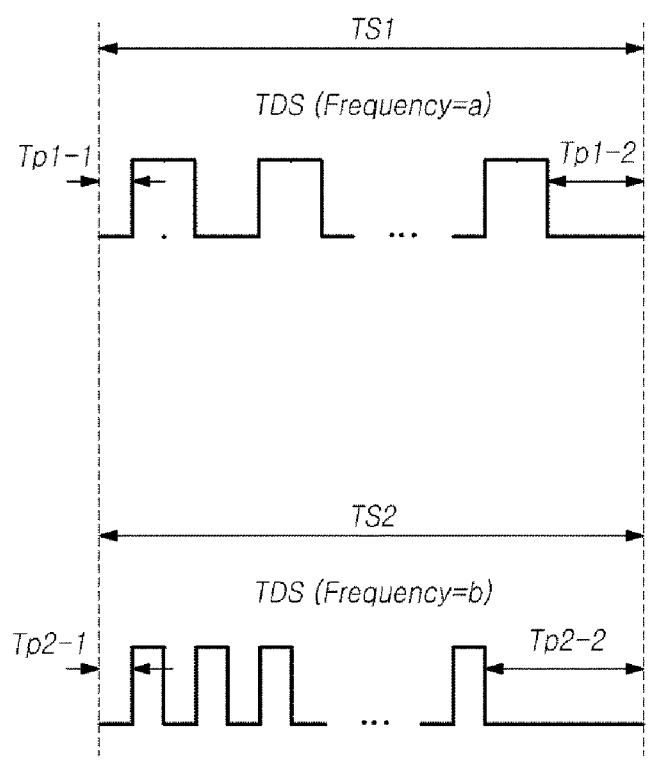
FIG. 36A is a schematic view illustrating pulse application periods and idle periods (i.e. periods in which pulses are not applied) in touch sections in which single-frequency driving is performed when the touch display device according to exemplary embodiments operates using the H-sensing method and multifrequency driving is applied in a single display frame section.

FIG. 36A is a schematic view illustrating pulse application periods and idle periods (i.e. periods in which pulses are not applied) in touch sections in which single-frequency driving is performed when the touch display device 100 according to exemplary embodiments operates using the H-sensing method and multifrequency driving is applied in a single display frame section.

In a single touch section, a period in which pulses corresponding to touch driving signals TDS are actually output by the sensing circuit 120 may be equal to the length of the touch section, or as illustrated in FIG. 36A, may be shorter, e.g. significantly shorter, than the length of the touch section.

In the touch section, periods in which pulses corresponding to the touch driving signals TDS are not actually output by the touch sensing circuit 120 are referred to as idle periods Tp1-1, Tp1-2, Tp2-1 and Tp2-2.

The idle periods Tp1-1 and Tp2-1 may be identical to or different from each other. The idle periods Tp1-2 and Tp2-2 may be identical to or different from each other.

Referring to FIG. 36A, a touch driving signal TDS in a first touch section TS1 located between two display sections includes two or more pulses (i.e. a first pulse, . . . , and a last pulse), which are driven in a first frequency a.

A touch driving signal TDS in a second touch section TS2 located between different two display sections includes two or more pulses (i.e. a first pulse, . . . , and a last pulse), which are driven in a second frequency b.

The first idle period Tp1-1 and/or Tp1-2 is present in the first touch section TS1. The first idle period Tp1-2 is defined as a period between an end point of the last pulse of the touch driving signal TDS in the first touch section TS1 and an end point of the first touch section TS1. The first idle period Tp1-1 is defined as a period between a start point of the first touch section TS1 and a start point of the first pulse of the touch driving signal TDS in the first touch section TS1.

The second idle period Tp2-1 and/or Tp2-2 is present in the second touch section TS2. The second idle period Tp2-2 is defined as a period between an end point of the last pulse of the touch driving signal TDS in the second touch section TS2 and an end point of the second touch section TS2. The second idle period Tp2-1 is defined as a period between a start point of the second touch section TS2 and a start point of the first pulse of the touch driving signal TDS in the second touch section TS2.

The length of the first idle period Tp1-1 and the length of the second idle period Tp2-1 may be identical to or different from each other. The length of the first idle period Tp1-2 and the length of the second idle period Tp2-2 may be identical to or different from each other.

Figure 36B:
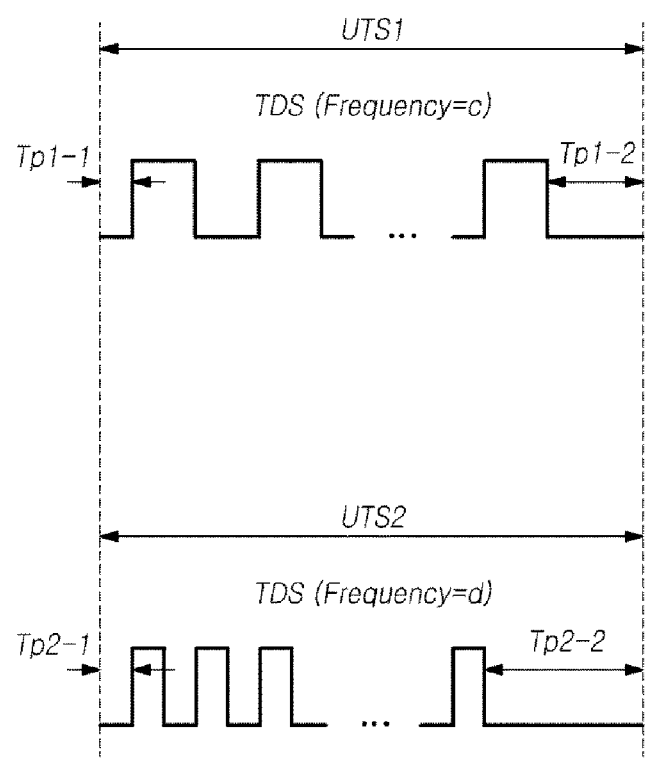
FIG. 36B is a schematic view illustrating pulse application periods and idle periods in two unit touch sections included in the same touch section or different touch sections when multifrequency driving is applied in a single display frame section in the touch display device according to exemplary embodiments.

Describing based on the concept of unit touch sections with reference to FIG. 36B, the idle periods Tp1-1, Tp1-2, Tp2-1 and Tp2-2, in which the touch driving signals TDS are not output, are present in two or more unit touch sections using the touch driving signals TDS having different frequencies.

The idle periods Tp1-1 and Tp2-1 in the two or more unit touch sections may be identical to or different from each other. The idle periods Tp1-2 and Tp2-2 in the two or more unit touch sections may be identical to or different from each other.

FIG. 36B is a schematic view illustrating pulse application periods and idle periods (i.e. periods in which pulses are not applied) in two unit touch sections UTS1 and UTS2 included in the same touch section or different touch sections when multifrequency driving is applied in a single display frame section in the touch display device 100 according to exemplary embodiments.

Referring to FIG. 36B, a touch driving signal TDS in the first unit touch section UTS1 includes two or more pulses (i.e. a first pulse, . . . , and a last pulse), which are driven in a first frequency c.

A touch driving signal TDS in the second unit touch section UTS2 includes two or more pulses (i.e. a first pulse, . . . , and a last pulse), which are driven in a second frequency d.

A first idle period Tp1-1 and/or Tp1-2 is present in the first unit touch section UTS1. The first idle period Tp1-2 is defined as a period between an end point of the last pulse of the touch driving signal TDS in the first unit touch section UTS1 and an end point of the first unit touch section UTS1. The first idle period Tp1-1 is defined as a period between a start point of the unit touch section UTS1 and a start point of the first pulse of the touch driving signal TDS in the first unit touch section UTS1.

A second idle period Tp2-1 and/or Tp2-2 is present in the second unit touch section UTS2. The second idle period Tp2-2 is defined as a period between an end point of the last pulse of the touch driving signal TDS in the second unit touch section UTS2 and an end point of the second unit touch section UTS2. The second idle period Tp2-1 is defined as a period between a start point of the second unit touch section UTS2 and a start point of the first pulse of the touch driving signal TDS in the second unit touch section UTS2.

The length of the first idle period Tp1-1 and the length of the second idle period Tp2-1 may be identical to or different from each other. The idle periods Tp1-2 and Tp2-2 in the two or more unit touch sections may be identical to or different from each other.

The term "unit touch section" used herein refers to a section in which the frequency of the touch driving signal TDS is the same. A single touch section may be comprised of a single unit touch section or two or more unit touch sections.

The idle periods in the touch sections as described above are available in a variety of ranges to improve display performance and efficiency and touch sensing performance and efficiency.

FIG. 37 to FIG. 40 are schematic views illustrating idle periods (i.e. periods in which pulses are not applied) in touch sections in which single-frequency driving is performed when the touch display device 100 according to exemplary embodiments operates using the H-sensing method and multifrequency driving is applied in a single display frame section.

Figure 37:
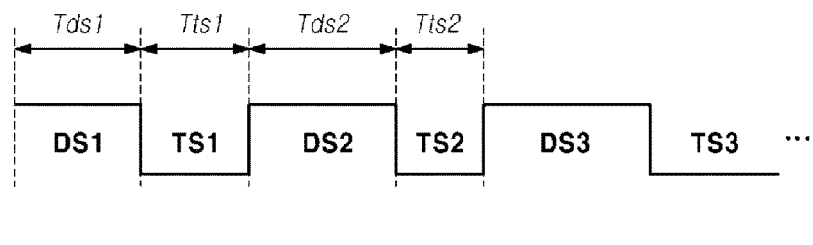
FIG. 37 is a schematic view illustrating an example of idle periods (i.e. periods in which pulses are not applied) in touch sections in which single-frequency driving is performed when the touch display device according to exemplary embodiments operates using an H-sensing method and multifrequency driving is applied in a single display frame section.
Figure 38:
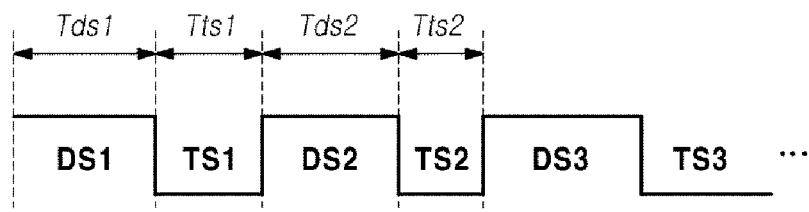
FIG. 38 is a schematic view illustrating another example of idle periods (i.e. periods in which pulses are not applied) in touch sections in which single-frequency driving is performed when the touch display device according to exemplary embodiments operates using an H-sensing method and multifrequency driving is applied in a single display frame section.
Figure 39:
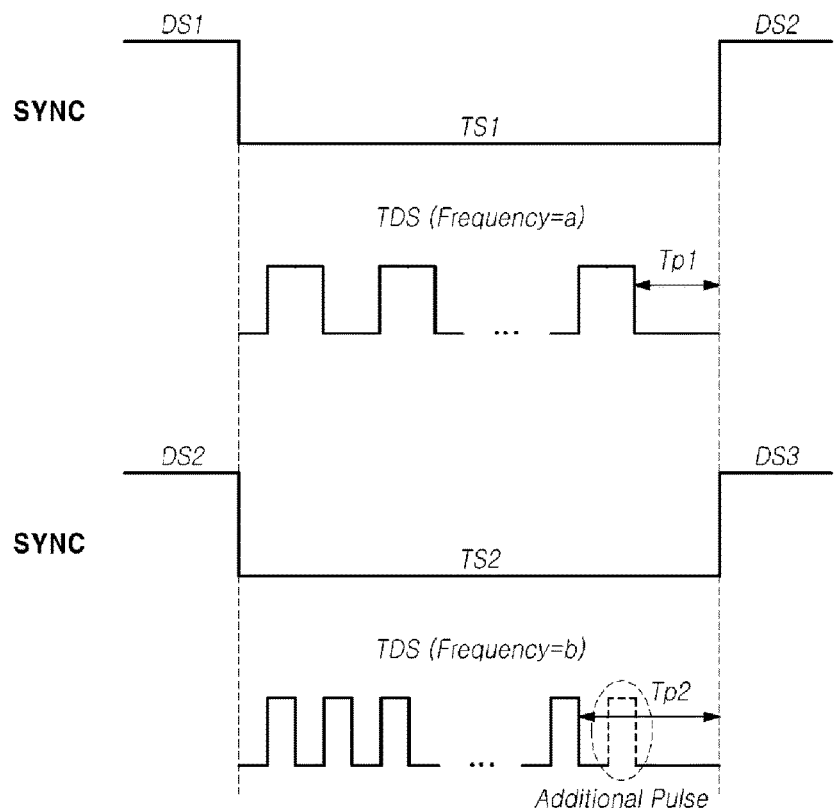
FIG. 39 and FIG. 40 are schematic views illustrating further another example of idle periods (i.e. periods in which pulses are not applied) in touch sections in which single-frequency driving is performed when the touch display device according to exemplary embodiments operates using an H-sensing method and multifrequency driving is applied in a single display frame section.
Figure 40:
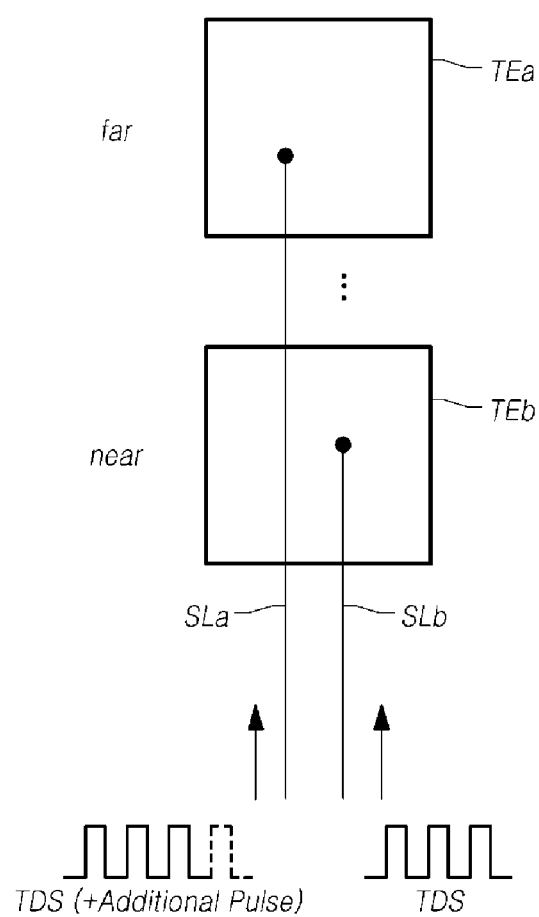

FIG. 37 illustrates a case in which idle periods in touch sections are used for display sections, while FIG. 38 to FIG. 40 illustrates cases in which idle periods in touch sections are used for touch sensing operation.

Referring to FIG. 37, idle periods Tp1, Tp2, and so on of touch sections TS1, TS2, and so on in which touch driving signals TDS are not output can be used for display driving.

Thus, the idle periods Tp1, Tp2, and so on of the touch sections TS1, TS2, and so on in which the touch driving signals TDS are not output are included in display sections DS2, DS3, and so on to increase the lengths of the display sections DS2, DS3, and so on.

When the idle periods of the touch sections are used for display driving, the operation of the high-definition display panel 110 can be facilitated, and display performance can be improved.

When the lengths of the idle periods Tp1, Tp2, and so on of the touch sections TS1, TS2, and so on in which the touch driving signals TDS are not output are equal to each other, the lengths of the display sections DS2, DS3, and so on increased by the lengths of the idle periods Tp1, Tp2, and so on can be equal to each other.

When the lengths of the idle periods Tp1, Tp2, and so on of the touch sections TS1, TS2, and so on in which the touch driving signals TDS are not output are different from each other, the lengths of the display sections DS2, DS3, and so on increased by the lengths of the idle periods Tp1, Tp2, and so on can be different from each other.

Thus, the lengths Tds1, Tds2, and so on of the display sections DS2, DS3, and so on may be different from each other.

Referring to FIG. 38, idle periods Tp1, Tp2, and so on of touch sections TS1, TS2, and so on in which touch driving signals TDS are not output can be used for functions related to the touch sensing operation. For example, The touch sensing operation may be a one or more of operation sections for processing touch raw data.

For example, the idle periods Tp1, Tp2, and so on of the touch sections TS1, TS2, and so on in which touch driving signals TDS are not output can be used as periods in which noises that would form touch sensing errors are measured.

Thus, the idle periods Tp1, Tp2, and so on in which touch driving signals TDS are not output can be removed from the touch sections TS1, TS2, and so on, and the lengths of the touch sections TS1, TS2, and so on can be reduced.

When the lengths of the idle periods Tp1, Tp2, and so on are different from each other, the lengths Tts1, Tts2, and so on of the touch sections TS1, TS2, and so on may be different from each other.

Referring to FIG. 39, the idle periods Tp1, Tp2, and so on of the touch sections TS1, TS2, and so on in which touch driving signals TDS are not output can be used to improve the accuracy of touch sensing.

In this case, the lengths Tts1, Tts2, and so on of the touch sections TS1, TS2, and so on may remain unchanged without being reduced.

Referring to FIG. 40, a touch electrode TEa positioned farther away from the touch sensing circuit 120 receives a touch driving signal TDS by a longer signal line SLa, while a touch electrode TEb positioned adjacent to the touch sensing circuit 120 receives a touch driving signal TDS by a shorter signal line SLb.

The length of the signal line acts as a load on signal transfer, thereby influencing the accuracy of sensing.

Since load is varied by the signal lines having different lengths, the rising time and the falling time of the touch driving signal TDS actually applied to the touch electrode TEa positioned farther away from the touch sensing circuit 120 are increased than the rising time and the falling time of the touch driving signal TDS actually applied to the touch electrode TEb positioned adjacent to the touch sensing circuit 120, whereby the signal waveform of the touch driving signal TDS applied to the farther touch electrode TEa may be significantly distorted.

This may consequently reduce the accuracy of sensing according to the touch electrode positions.

Thus, in consideration of the length from the touch sensing circuit 120 to the touch electrode TE (i.e. the length of the signal line), in the touch section TS2 in which the touch electrode TEa having a longer signal line is driven, the touch sensing circuit 120 can output at least one additional pulse in the idle period Tp2 in which the touch driving signal TDS is not output, the additional pulse acting as the touch driving signal TDS.

In the touch section TS2 in which the touch electrode TEa having the longer signal line is driven, the longer the signal transfer line to the touch electrode TEa (i.e. the distance to the touch electrode TEa from the touch sensing circuit 120 or the length of the signal line) is, the greater number of additional pulses the touch sensing circuit 120 can output in the idle period of the touch section in which the touch electrode TEa is driven.

Due to the additional pulses acting as the touch driving signals TDS, when two or more display sections for a display mode and two or more touch sections for a touch mode are present in a single display frame section, the number of pulses of the touch driving signals TDS in one or more touch sections of the two or more touch sections may differ from the number of pulses of the touch driving signals TDS in the other touch sections.

The multifrequency driving method based on 12-LHB driving has been described with reference to FIG. 26 to FIG. 40. The multifrequency driving method can be used not only for 12-LHB driving but also for the other types of LHB driving.

Figure 41:
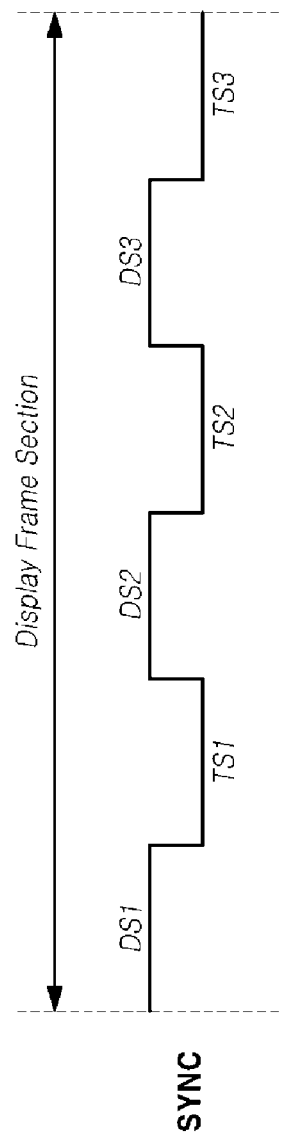
FIG. 41 is a schematic view illustrating another example in which the touch display device according to exemplary embodiments operates using an H-sensing method.

FIG. 41 is a schematic view illustrating another example in which the touch display device 100 according to exemplary embodiments operates using the H-sensing method, and FIG. 42 is a table illustrating frequency types available for touch sections in which single-frequency driving is performed when the touch display device 100 according to exemplary embodiments operates as in FIG. 41 and multifrequency driving is applied in a single display frame.

Referring to FIG. 41, when the touch display device 100 operates using the H-sensing method, 3-LHB driving can be performed in three display sections DS1, DS2, and DS3 and three touch sections TS1, TS2, and TS3 in a single display frame section.

In this case, as illustrated in FIG. 42, three or two frequencies of touch driving signals TDS are available for touch driving in the three touch sections TS1, TS2, and TS3 of the single display frame section.

In addition to the five sets of available frequencies illustrated in FIG. 42, greater number of available frequency sets can be formed by variously modifying the sequence of frequencies, the types of frequencies, and so on.

Figure 43:
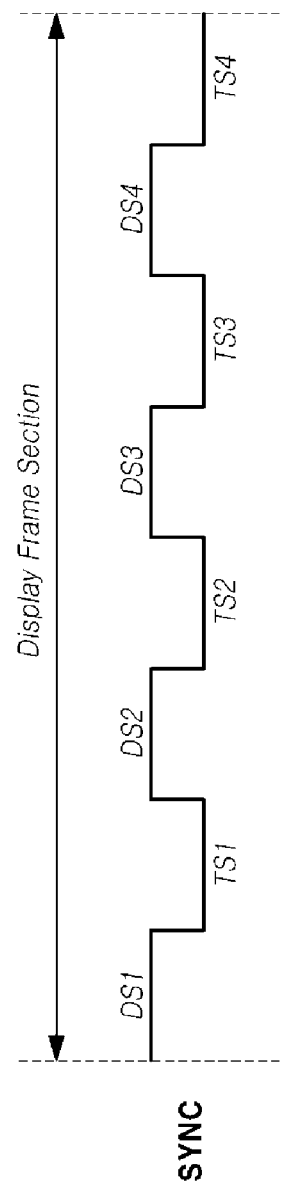
FIG. 43 is a schematic view illustrating further another example in which the touch display device according to exemplary embodiments operates using an H-sensing method.

FIG. 43 is a schematic view illustrating further another example in which the touch display device 100 according to exemplary embodiments operates using the H-sensing method, and FIG. 44 is a table illustrating frequency types available for touch sections in which single-frequency driving is performed when the touch display device 100 according to exemplary embodiments operates as in FIG. 43 and multifrequency driving is applied in a single display frame.

Referring to FIG. 43, when the touch display device 100 operates using the H-sensing method, 4-LHB driving can be performed in four display sections DS1, DS2, DS3, and DS4 and four touch sections TS1, TS2, TS3, and TS4 in a single display frame section.

In this case, as illustrated in FIG. 44, four, three, or two frequencies of touch driving signals TDS are available for touch driving in the four touch sections TS1, TS2, TS3, and TS4 of the single display frame section.

In addition to the five sets of available frequencies illustrated in FIG. 44, greater number of available frequency sets can be formed by variously modifying the sequence of frequencies, the types of frequencies, and so on.

Figure 45:
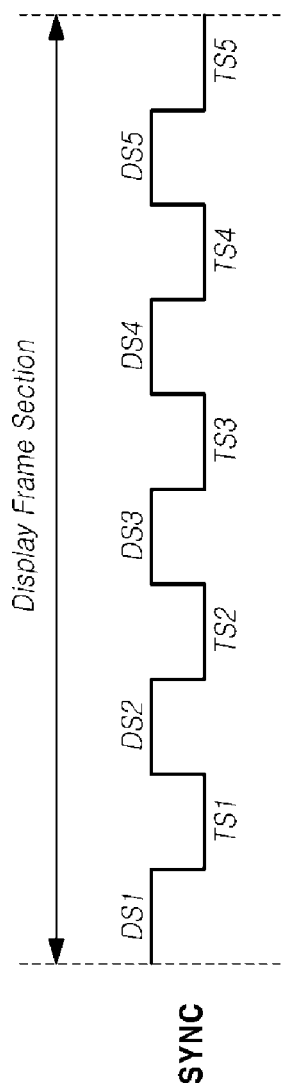
FIG. 45 is a schematic view illustrating still another example in which the touch display device according to exemplary embodiments operates using the H-sensing method.

FIG. 45 is a schematic view illustrating still another example in which the touch display device 100 according to exemplary embodiments operates using the H-sensing method, and FIG. 46 is a table illustrating frequency types available for touch sections in which single-frequency driving is performed when the touch display device 100 according to exemplary embodiments operates as in FIG. 45 and multifrequency driving is applied in a single display frame.

Referring to FIG. 45, when the touch display device 100 operates using the H-sensing method, 5-LHB driving can be performed in five display sections DS1, DS2, DS3, DS4, and DS5 and five touch sections TS1, TS2, TS3, TS4, TS5 in a single display frame section.

In this case, as illustrated in FIG. 46, five, four, three, or two frequencies of touch driving signals TDS are available for touch driving in the five touch sections TS1, TS2, TS3, TS4, TS5 of the single display frame section.

In addition to the five sets of available frequencies illustrated in FIG. 46, greater number of available frequency sets can be formed by variously modifying the sequence of frequencies, the types of frequencies, and so on.

According to the foregoing exemplary embodiments, the touch sensing method, the touch sensing circuit 120, and the touch display device 100 can prevent undesired parasitic capacitance from occurring while reducing EMI in touch sections.

In addition, according to the foregoing exemplary embodiments, the touch sensing method, the touch sensing circuit 120, and the touch display device 100 can perform touch driving based on multifrequency driving to reduce EMI.

The multifrequency driving method is a touch driving method based on the frequency variation of touch driving signals. Here, the frequency variation of the touch driving signals can be performed by adjusting the lengths of sections in which single frequencies are used (i.e. unit touch sections) or adjusting the numbers of pulses in the sections in which single frequencies are used.

The foregoing descriptions and the accompanying drawings have been presented in order to explain the certain principles of the present disclosure. A person skilled in the art to which the disclosure relates could make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

What is claimed is:

1. A driver circuit for driving a display device integrated with a touch screen, the display device comprising a display panel including a plurality of data lines, a plurality of gate lines, and a plurality of touch electrodes that are common electrodes and are disposed within the display panel, a plurality of pixels of the display device defined at intersections of the data lines and the gate lines, the driver circuit comprising:
 a touch signal generator circuit to generate a touch driving signal having a plurality of pulses, the touch driving signal having varying frequencies among a plurality of frequencies including at least a first frequency and a second frequency different from the first frequency; and
 a touch driver circuit to:
  apply a common voltage to the touch electrodes to display an image on the pixels of the display device;
  apply the touch driving signal having the pulses at the first frequency to a first one of the touch electrodes during a first unit touch time section and apply the touch driving signal having the pulses at the second frequency to a second one of the touch electrodes during a second unit touch time section different from the first unit touch time section, a frequency of the pulses of the touch driving signal being constant within a predetermined tolerance margin at the first frequency during the first unit touch time section and at the second frequency during the second unit touch time section.

2. The driver circuit of claim 1, wherein the first touch electrode is same as the second touch electrode.

3. The driver circuit of claim 1, wherein the first touch electrode is at a first position on the display panel and the second touch electrode is at a second position on the display panel different from the first position.

4. The driver circuit of claim 1, wherein:
 a first image is displayed on the entire display panel once during a first frame, and a second image is displayed on the entire display panel once during a second frame;
 the first frame includes a single first display period and single first touch period, and the second frame includes a single second display period and single second touch period; and
 the first unit touch time section is the first touch period, and the second unit touch time section is the second touch period.

5. The driver circuit of claim 1, wherein:
 an image is displayed on the entire display panel once during a frame;
 the frame includes a first display period, a first touch period subsequent to the first display period, a second display period subsequent to the first touch period, and a second touch period subsequent to the second display period; and
 the first unit touch time section is the first touch period, and the second unit touch time section is the second touch period.

6. The driver circuit of claim 1, wherein:
 the touch driver circuit applies a first load-free driving signal at the first frequency to a first data lines corresponding to the first one of the touch electrodes during the first unit touch time section, the first load-free driving signal identical to the first touch-driving signal; and
 the touch driver circuit applies a second load-free driving signal at the second frequency to a second data lines corresponding to the second one of the touch electrodes during the second unit touch time section, the second load-free driving signal identical to the second touch-driving signal.

7. The driver circuit of claim 1, wherein:
 the touch driver circuit applies a first load-free driving signal at the first frequency to a first gate lines corresponding to the first one of the touch electrodes during the first unit touch time section, the first load-free driving signal identical to the first touch-driving signal; and
 the touch driver circuit applies a second load-free driving signal at the second frequency to a second gate lines corresponding to the second one of the touch electrodes during the second unit touch time section, the second load-free driving signal identical to the second touch-driving signal.

8. The driver circuit of claim 1, wherein:
 the touch driver circuit applies a first load-free driving signal at the first frequency to a third one of the touch electrodes corresponding to the first one of the touch electrodes during the first unit touch time section, the first load-free driving signal identical to the first touch-driving signal; and
 the touch driver circuit applies a second load-free driving signal at the second frequency to a fourth one of the touch electrodes corresponding to the second one of the touch electrodes during the second unit touch time section, the second load-free driving signal identical to the second touch-driving signal.

9. The driver circuit of claim 5, wherein the first touch period includes a touch application period during which touch drive pulses are applied and a touch idle period during which touch drive pulses are not applied, the image being displayed on the pixels of the display device during the touch idle period.

10. The driver circuit of claim 5, wherein:
the first touch period includes a touch application period during which touch drive pulses are applied and a touch idle period during which touch drive pulses are not applied;
the first one of the touch electrodes is farther in position from the touch driver circuit than the second one of the touch electrodes;
a first number of touch pulses of the touch driving signal are applied to the first one of the touch electrodes during the first touch period;
a second number of touch pulses of the touch driving signal are applied to the second one of the touch electrodes during the second touch period, the second number of touch pulses fewer than the first number of touch pulses by a third number; and
the third number of touch pulses are applied to the first one of the touch electrodes during the touch idle period of the first touch period.

11. The driver circuit of claim 1, wherein the touch signal generator circuit selects the first frequency and the second frequency from a set of predetermined touch driving frequencies to generate the touch driving signal.

12. The driver circuit of claim 1, wherein the touch signal generator circuit randomly determines the first frequency and the second frequency to generate the touch driving signal.

13. A driver circuit for driving a display device integrated with a touch screen, the display device comprising a display panel including a plurality of data lines, a plurality of gate lines, and a plurality of touch electrodes that are common electrodes and are disposed within the display panel, a plurality of pixels of the display device defined at intersections of the plurality of the data lines and the plurality of gate lines, the driver circuit comprising:
a touch signal generator circuit to generate a touch driving signal having a plurality of pulses, the touch driving signal having varying frequencies among a plurality of frequencies including at least a first frequency and a second frequency different from the first frequency;
a touch driver circuit to:
apply a common voltage to the touch electrodes to display an image on the pixels of the display device;
apply the touch driving signal having the pulses at the first frequency to a first one of the touch electrodes during a first period and apply the touch driving signal having the pulses at the second frequency to a second one of the touch electrodes during a second period different from the first period, the first one of the touch electrodes and the second one of the touch electrodes at different locations on the display panel.

14. A display device integrated with a touch screen comprising:
a display panel including a plurality of data lines, a plurality of gate lines, and a plurality of touch electrodes that are common electrodes and are disposed within the display panel, a plurality of pixels of the display device defined at intersections of the data lines and the gate lines;
a touch signal generator circuit to generate a touch driving signal having a plurality of pulses, the touch driving signal having varying frequencies among a plurality of frequencies including at least a first frequency and a second frequency different from the first frequency; and
a touch driver circuit to:
apply a common voltage to the touch electrodes to display an image on the pixels of the display device;
apply the touch driving signal having the pulses at the first frequency to a first one of the touch electrodes during a first unit touch time section and apply the touch driving signal having the pulses at the second frequency to a second one of the touch electrodes during a second unit touch time section different from the first unit touch time section, a frequency of the pulses of the touch driving signal being constant within a predetermined tolerance margin at the first frequency during the first unit touch time section and at the second frequency during the second unit touch time section.

15. The display device of claim 14, wherein the first touch electrode is same as the second touch electrode.

16. The display device of claim 14, wherein the first touch electrode is at a first position on the display panel and the second touch electrode is at a second position on the display panel different from the first position.

17. The display device of claim 14, wherein:
a first image is displayed on the entire display panel once during a first frame, and a second image is displayed on the entire display panel once during a second frame;
the first frame includes a single first display period and single first touch period, and the second frame includes a single second display period and single second touch period; and
the first unit touch time section is the first touch period, and the second unit touch time section is the second touch period.

18. The display device of claim 14, wherein:
an image is displayed on the entire display panel once during a frame;
the frame includes a first display period, a first touch period subsequent to the first display period, a second display period subsequent to the first touch period, and a second touch period subsequent to the second display period; and
the first unit touch time section is the first touch period, and the second unit touch time section is the second touch period.

19. The display device of claim 14, wherein:
the touch driver circuit applies a first load-free driving signal at the first frequency to a first data lines corresponding to the first one of the touch electrodes during the first unit touch time section, the first load-free driving signal identical to the first touch-driving signal; and
the touch driver circuit applies a second load-free driving signal at the second frequency to a second data lines corresponding to the second one of the touch electrodes during the second unit touch time section, the second load-free driving signal identical to the second touch-driving signal.

20. The display device of claim 14, wherein:
the touch driver circuit applies a first load-free driving signal at the first frequency to a first gate lines corresponding to the first one of the touch electrodes during the first unit touch time section, the first load-free driving signal identical to the first touch-driving signal; and
the touch driver circuit applies a second load-free driving signal at the second frequency to a second gate lines corresponding to the second one of the touch electrodes during the second unit touch time section, the second load-free driving signal identical to the second touch-driving signal.

21. The display device of claim 14, wherein:
the touch driver circuit applies a first load-free driving signal at the first frequency to a third one of the touch electrodes corresponding to the first one of the touch electrodes during the first unit touch time section, the first load-free driving signal identical to the first touch-driving signal; and
the touch driver circuit applies a second load-free driving signal at the second frequency to a fourth one of the touch electrodes corresponding to the second one of the touch electrodes during the second unit touch time section, the second load-free driving signal identical to the second touch-driving signal.

22. The display device of claim 18, wherein the first touch period includes a touch application period during which touch drive pulses are applied and a touch idle period during which touch drive pulses are not applied, the image being displayed on the pixels of the display device during the touch idle period.

23. The display device of claim 18, wherein:
the first touch period includes a touch application period during which touch drive pulses are applied and a touch idle period during which touch drive pulses are not applied;
the first one of the touch electrodes is farther in position from the touch driver circuit than the second one of the touch electrodes;
a first number of touch pulses of the touch driving signal are applied to the first one of the touch electrodes during the first touch period;
a second number of touch pulses of the touch driving signal are applied to the second one of the touch electrodes during the second touch period, the second number of touch pulses fewer than the first number of touch pulses by a third number; and
the third number of touch pulses are applied to the first one of the touch electrodes during the touch idle period of the first touch period.

24. The display device of claim 14, wherein the touch signal generator circuit selects the first frequency and the second frequency from a set of predetermined touch driving frequencies to generate the touch driving signal.

25. The display device of claim 14, wherein the touch signal generator circuit randomly determines the first frequency and the second frequency to generate the touch driving signal.

26. A display device integrated with a touch screen comprising:
a display panel including a plurality of data lines, a plurality of gate lines, and a plurality of touch electrodes that are common electrodes and are disposed within the display panel, a plurality of pixels of the display device defined at intersections of the data lines and the gate lines;
a touch signal generator circuit to generate a touch driving signal having a plurality of pulses, the touch driving signal having varying frequencies among a plurality of frequencies including at least a first frequency and a second frequency different from the first frequency; and
a touch driver circuit to:
apply a common voltage to the touch electrodes to display an image on the pixels of the display device;
apply the touch driving signal having the pulses at the first frequency to a first one of the touch electrodes during a first period and apply the touch driving signal having the pulses at the second frequency to a second one of the touch electrodes during a second period different from the first period, the first one of the touch electrodes and the second one of the touch electrodes at different locations on the display panel.

* * * * *